United States Patent [19]

Sakai et al.

[11] Patent Number: 5,333,068
[45] Date of Patent: Jul. 26, 1994

[54] IMAGE PROCESSING SYSTEM

[75] Inventors: Masanori Sakai, Yokohama; Saburo Nakazato, Tokyo; Takayuki Komine, Fussa; Norio Nakajima, Hachioji; Tetsuya Ohnishi, Yokohama; Toshio Honma, Kawasaki; Yasutomo Suzuki, Yokohama; Toshihiro Kadowaki, Kawasaki, all of Japan

[73] Assignee: Canon Kabushiki Kaisha, Tokyo, Japan

[21] Appl. No.: 111,273

[22] Filed: Aug. 24, 1993

Related U.S. Application Data

[63] Continuation of Ser. No. 767,550, Sep. 27, 1991, abandoned, which is a continuation of Ser. No. 409,950, Sep. 20, 1989, abandoned.

[30] Foreign Application Priority Data

Sep. 20, 1988 [JP] Japan ................... 63-236997

[51] Int. Cl.$^5$ ............................. H04N 1/46
[52] U.S. Cl. ................... 358/500; 358/501; 358/505; 358/523
[58] Field of Search ............. 358/500, 501, 505, 523, 358/400, 401, 474, 296, 404, 444

[56] References Cited

U.S. PATENT DOCUMENTS

| | | | |
|---|---|---|---|
| 4,507,685 | 3/1985 | Kawamura | 358/78 |
| 4,532,558 | 7/1985 | Oota et al. | 358/906 |
| 4,597,018 | 6/1986 | Sonobe et al. | 358/269 |
| 4,655,577 | 4/1987 | Ikota | 358/296 |
| 4,668,986 | 5/1987 | Stansfield et al. | 358/80 |
| 4,669,864 | 6/1987 | Shoji et al. | 355/15 |
| 4,679,074 | 7/1987 | Sugiura et al. | 358/523 |
| 4,734,760 | 3/1988 | Futaki | 358/75 |
| 4,931,815 | 6/1990 | Sato et al. | 346/154 |
| 5,109,272 | 4/1992 | Kinoshita et al. | 358/75 |
| 5,113,249 | 5/1992 | Yosefi | 358/75 |

FOREIGN PATENT DOCUMENTS

| | | |
|---|---|---|
| 0105213 | 4/1984 | European Pat. Off. |
| 0204626 | 12/1986 | European Pat. Off. |
| 0269334 | 6/1988 | European Pat. Off. |
| 2364047 | 3/1975 | Fed. Rep. of Germany |
| 3439827 | 5/1985 | Fed. Rep. of Germany |
| 3603024 | 8/1986 | Fed. Rep. of Germany |
| 3712587 | 10/1987 | Fed. Rep. of Germany |
| 2151102 | 7/1985 | United Kingdom |

OTHER PUBLICATIONS

"High Resolution Elec. Still Camera With Two Mos Imagers", Aizawa, et al. 8087 IEEE Trans. on Consumer Elec. CE-31 (1985), Aug., No. 3, pp. 425-429.

*Primary Examiner*—Mark R. Powell
*Assistant Examiner*—Jerome Grant, II
*Attorney, Agent, or Firm*—Fitzpatrick, Cella, Harper & Scinto

[57] ABSTRACT

An image processing system including: a reproducing apparatus to reproduce a plurality of image signals recorded on a recording medium; and an image forming apparatus to form the image signals of a plurality of picture planes which were read out of the reproducing apparatus as a plurality of visible images. The reproducing apparatus and the image forming apparatus process the plurality of image signals, while communicating with each other via a wire. With this system, since the image recording and reproducing apparatus can be preferably controlled on the image forming apparatus side, the image forming apparatus can be provided in a portable small image recording and reproducing apparatus such as an electronic still camera which executes an electrophotographic image process.

20 Claims, 46 Drawing Sheets

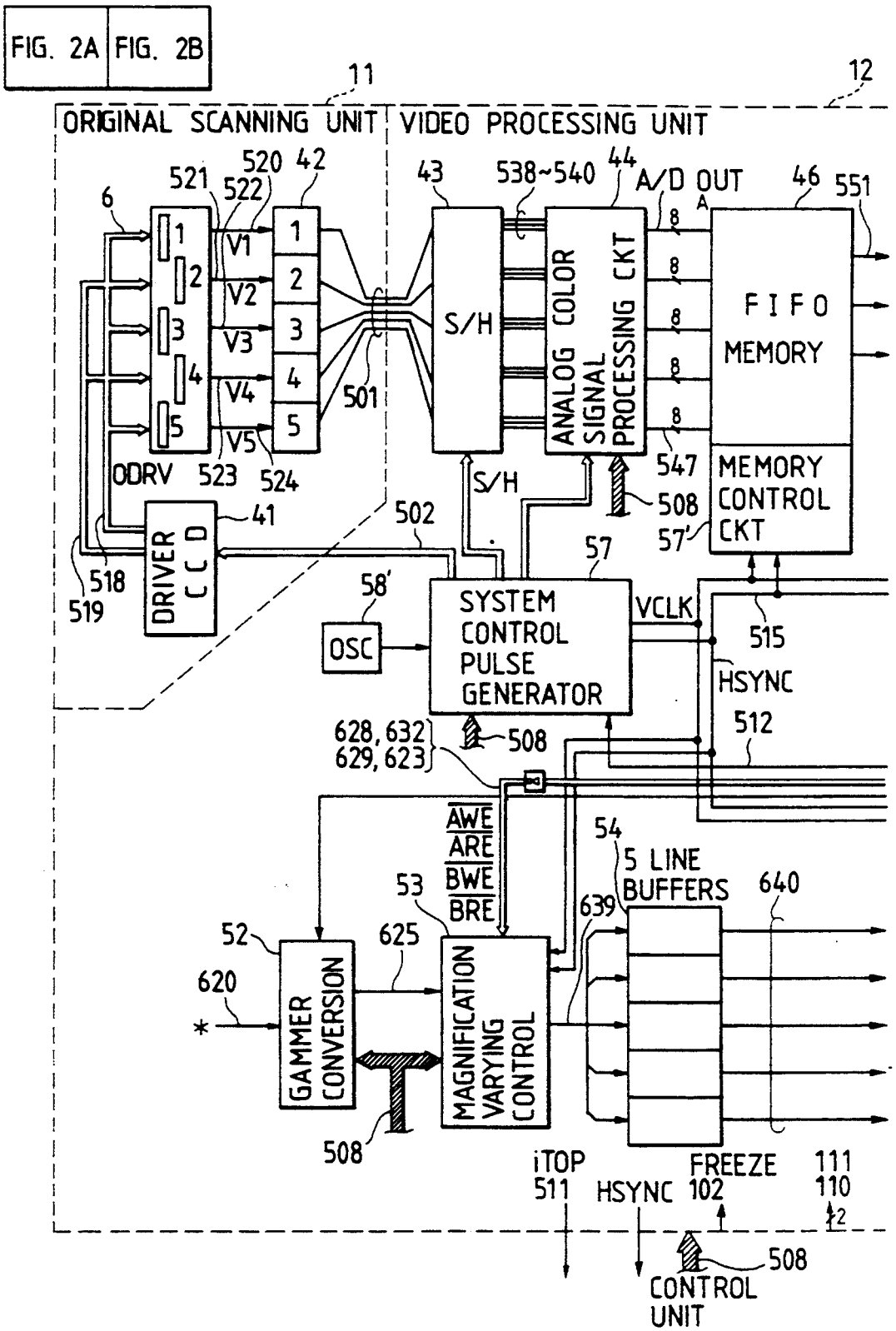

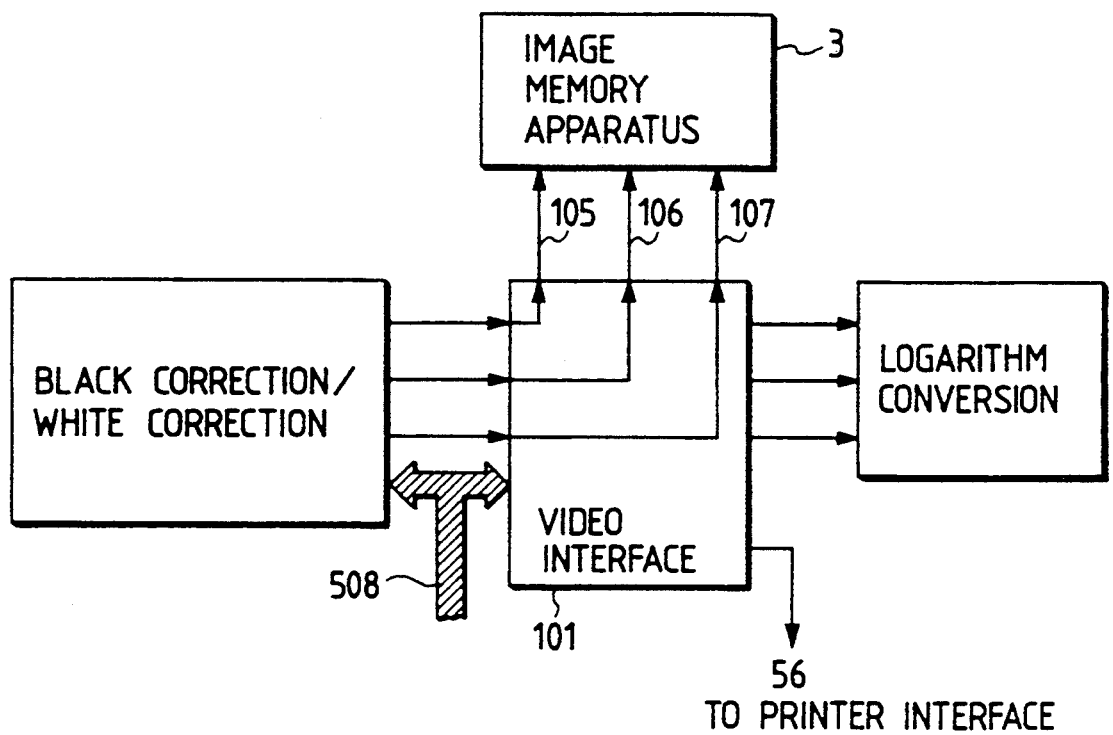
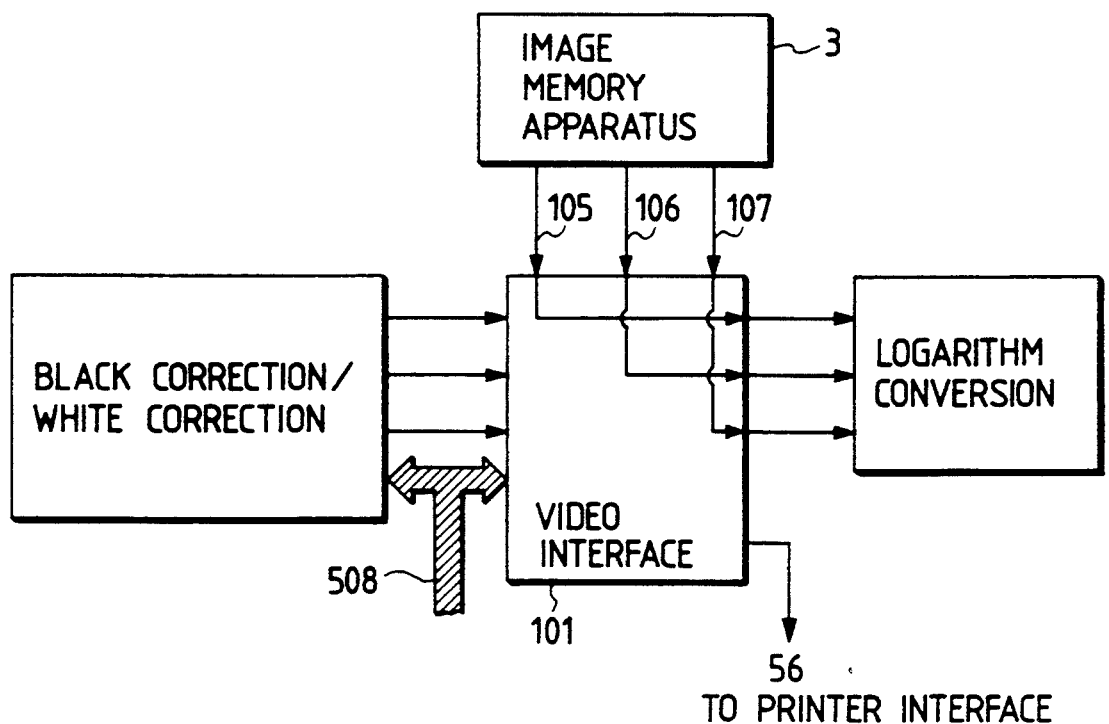

FIG. 17

| | MEMORY(R) 4060R | MEMORY(G) 4060G | MEMORY(B) 4060B |
|---|---|---|---|
| 2M | | | |
| | IMAGE 15 | IMAGE 15 | IMAGE 15 |
| 1.875M | | | |
| | IMAGE 14 | IMAGE 14 | IMAGE 14 |
| 1.75M | | | |
| | IMAGE 13 | IMAGE 13 | IMAGE 13 |
| 1.625M | | | |
| | IMAGE 12 | IMAGE 12 | IMAGE 12 |
| 1.5M | | | |
| | IMAGE 11 | IMAGE 11 | IMAGE 11 |
| 1.375M | | | |
| | IMAGE 10 | IMAGE 10 | IMAGE 10 |
| 1.25M | | | |
| | IMAGE 9 | IMAGE 9 | IMAGE 9 |
| 1.125M | | | |
| | IMAGE 8 | IMAGE 8 | IMAGE 8 |
| 1M | | | |
| | IMAGE 7 | IMAGE 7 | IMAGE 7 |
| 0.875M | | | |
| | IMAGE 6 | IMAGE 6 | IMAGE 6 |
| 0.75M | | | |
| | IMAGE 5 | IMAGE 5 | IMAGE 5 |
| 0.625M | | | |
| | IMAGE 4 | IMAGE 4 | IMAGE 4 |
| 0.5M | | | |
| | IMAGE 3 | IMAGE 3 | IMAGE 3 |
| 0.375M | | | |
| | IMAGE 2 | IMAGE 2 | IMAGE 2 |
| 0.25M | | | |
| | IMAGE 1 | IMAGE 1 | IMAGE 1 |
| 0.125M | | | |
| | IMAGE 0 | IMAGE 0 | IMAGE 0 |
| 0 | | | |

FIG. 20
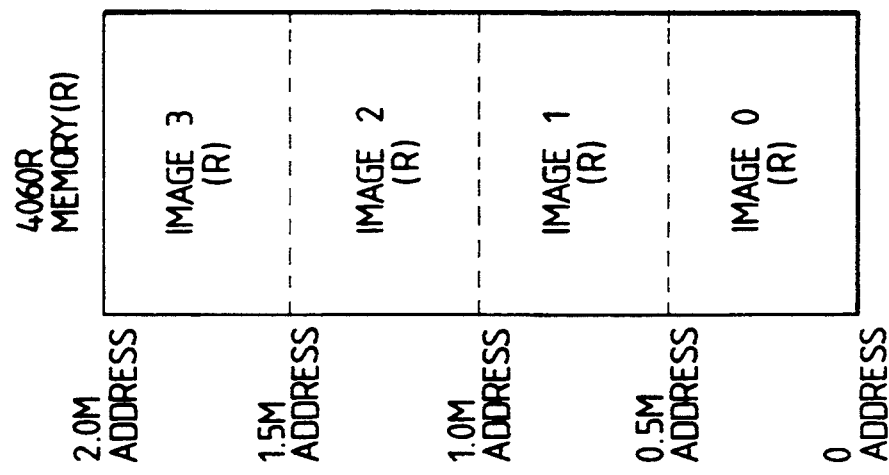
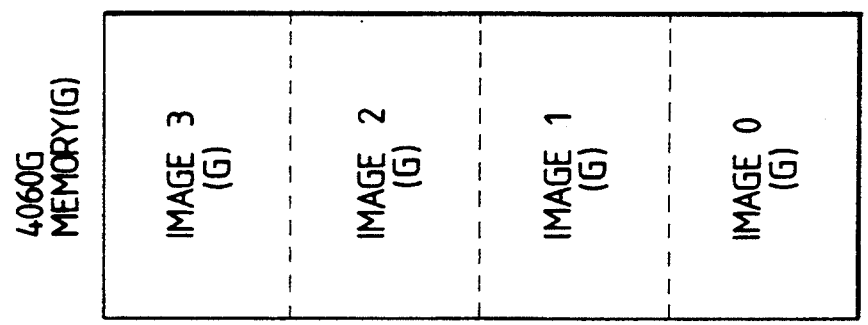
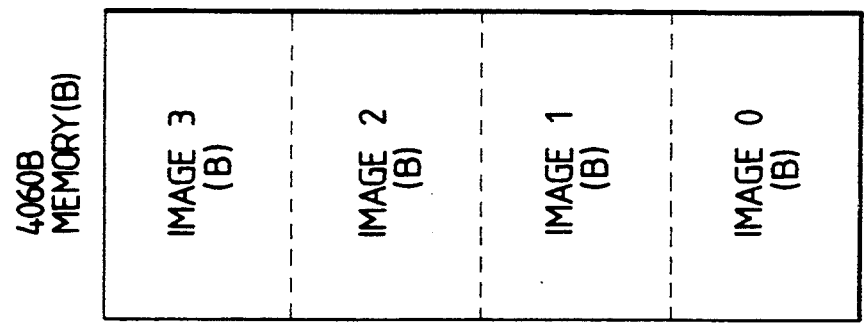

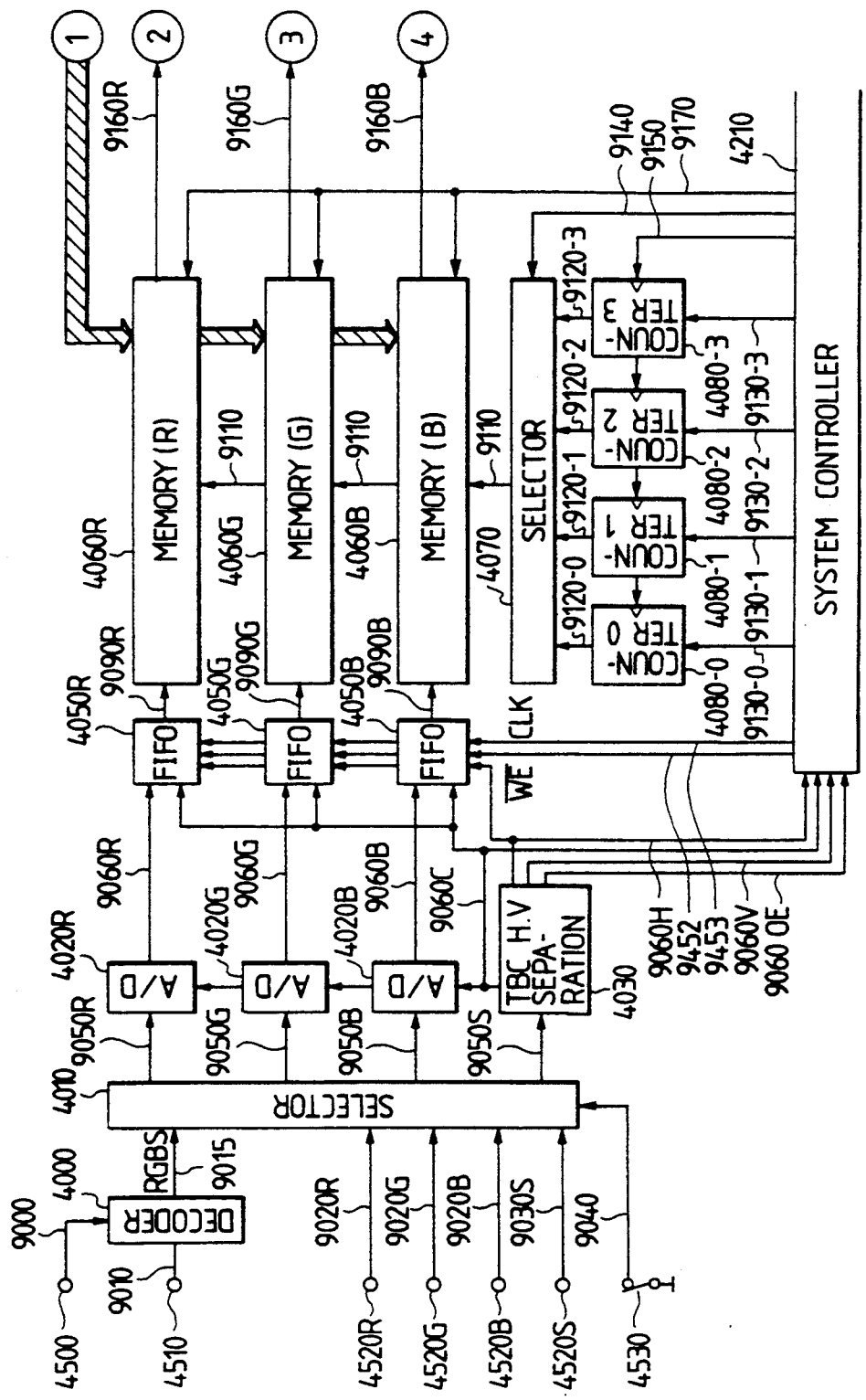

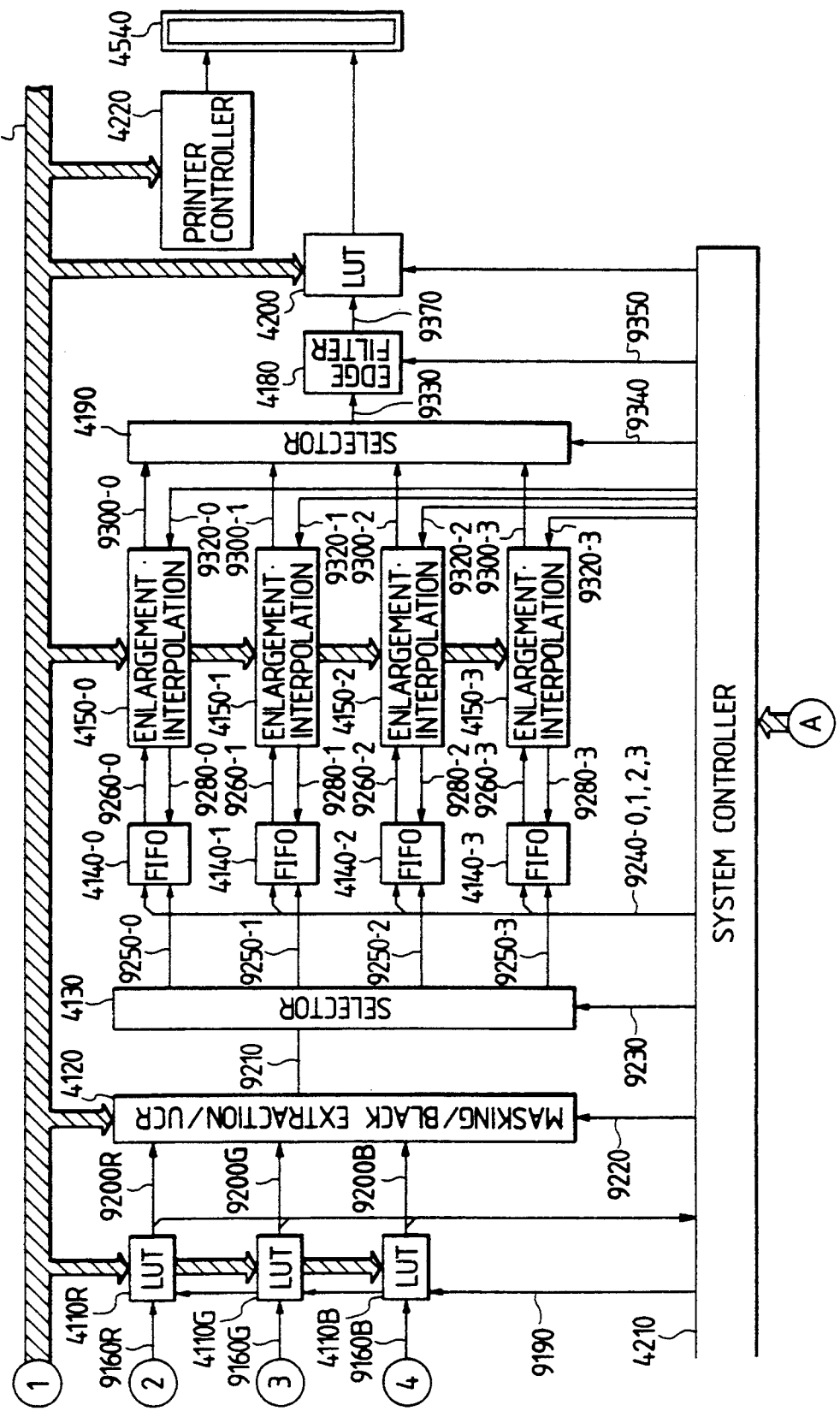

| FIG. 28A | FIG. 28B | FIG. 28C |

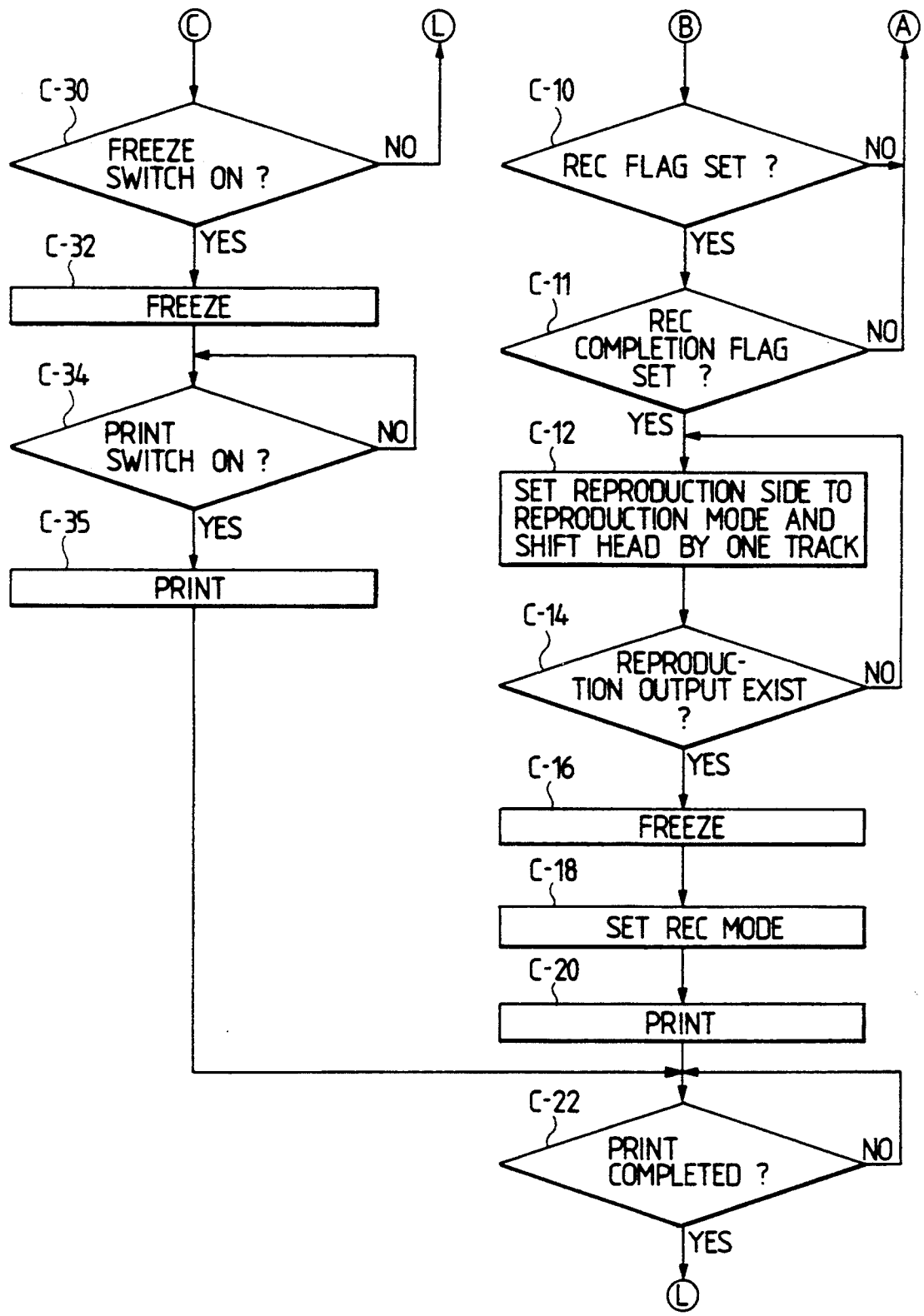

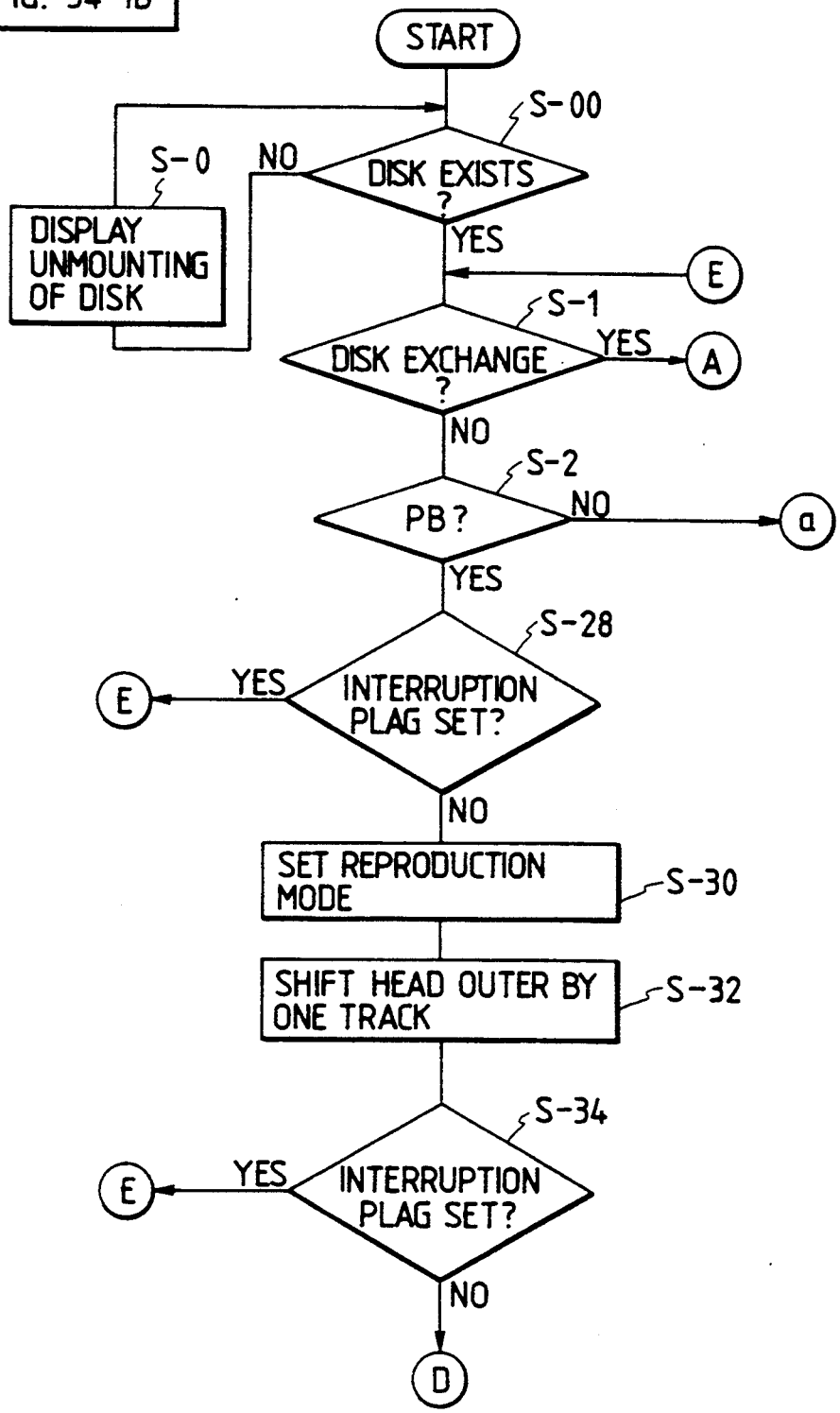

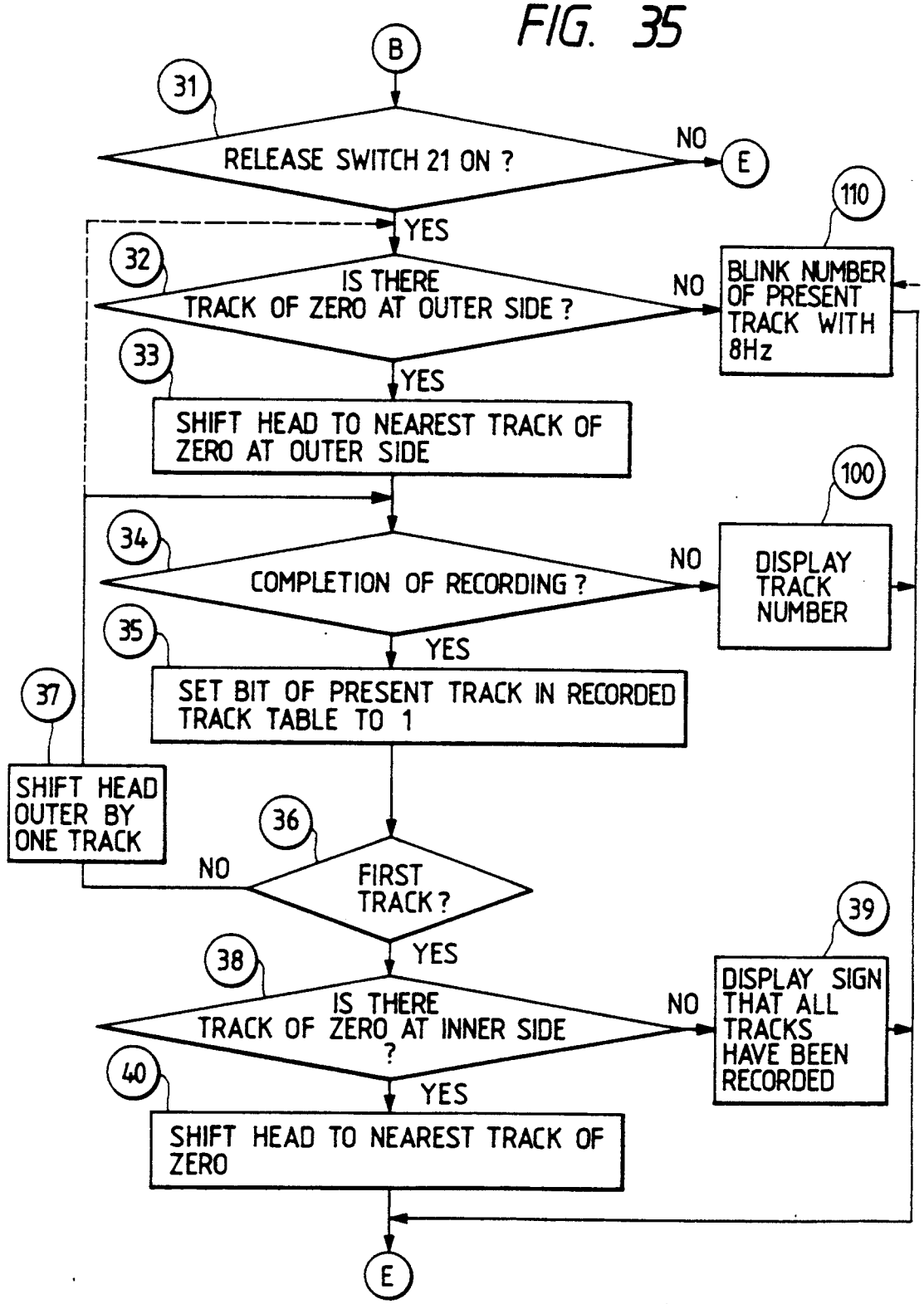

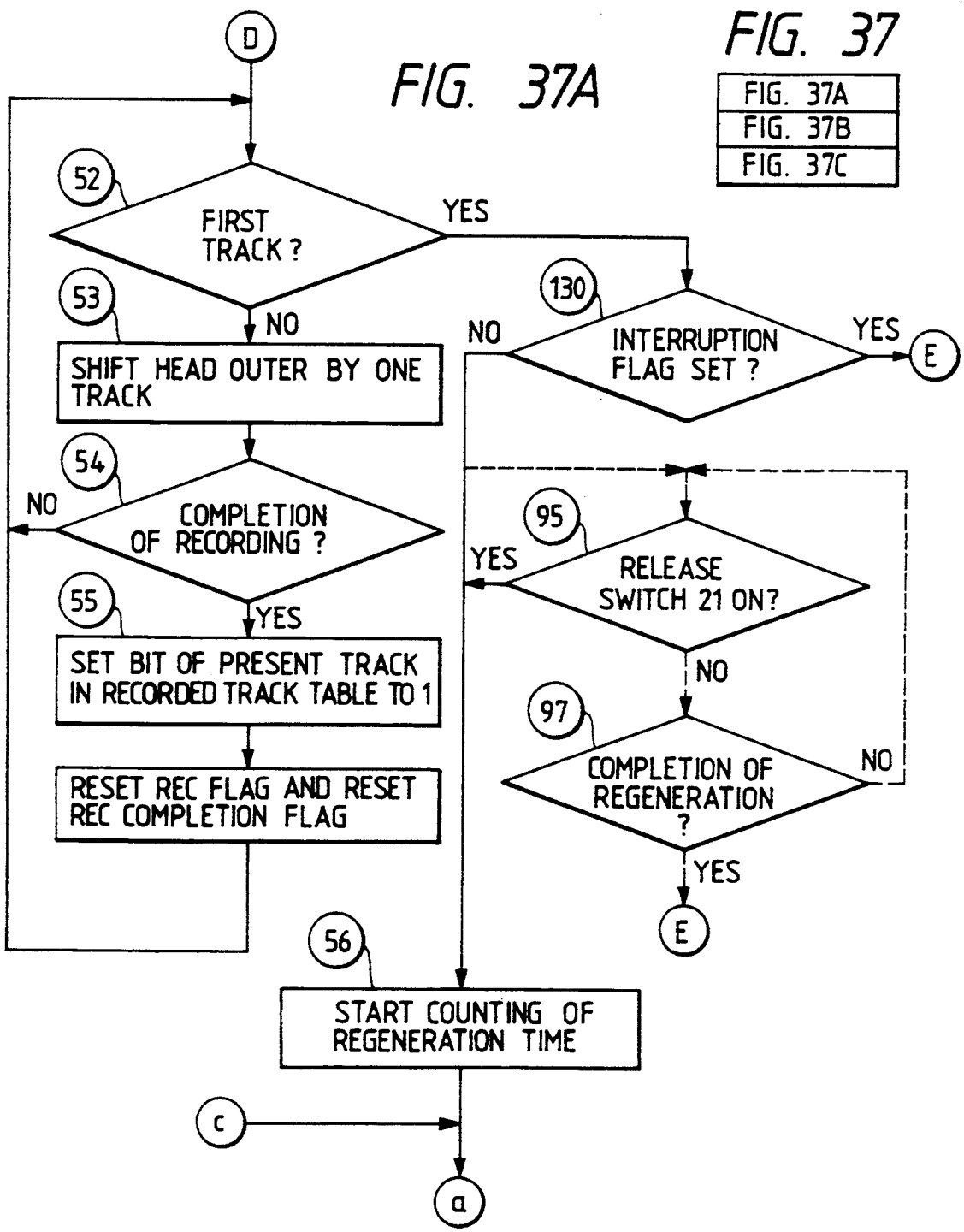

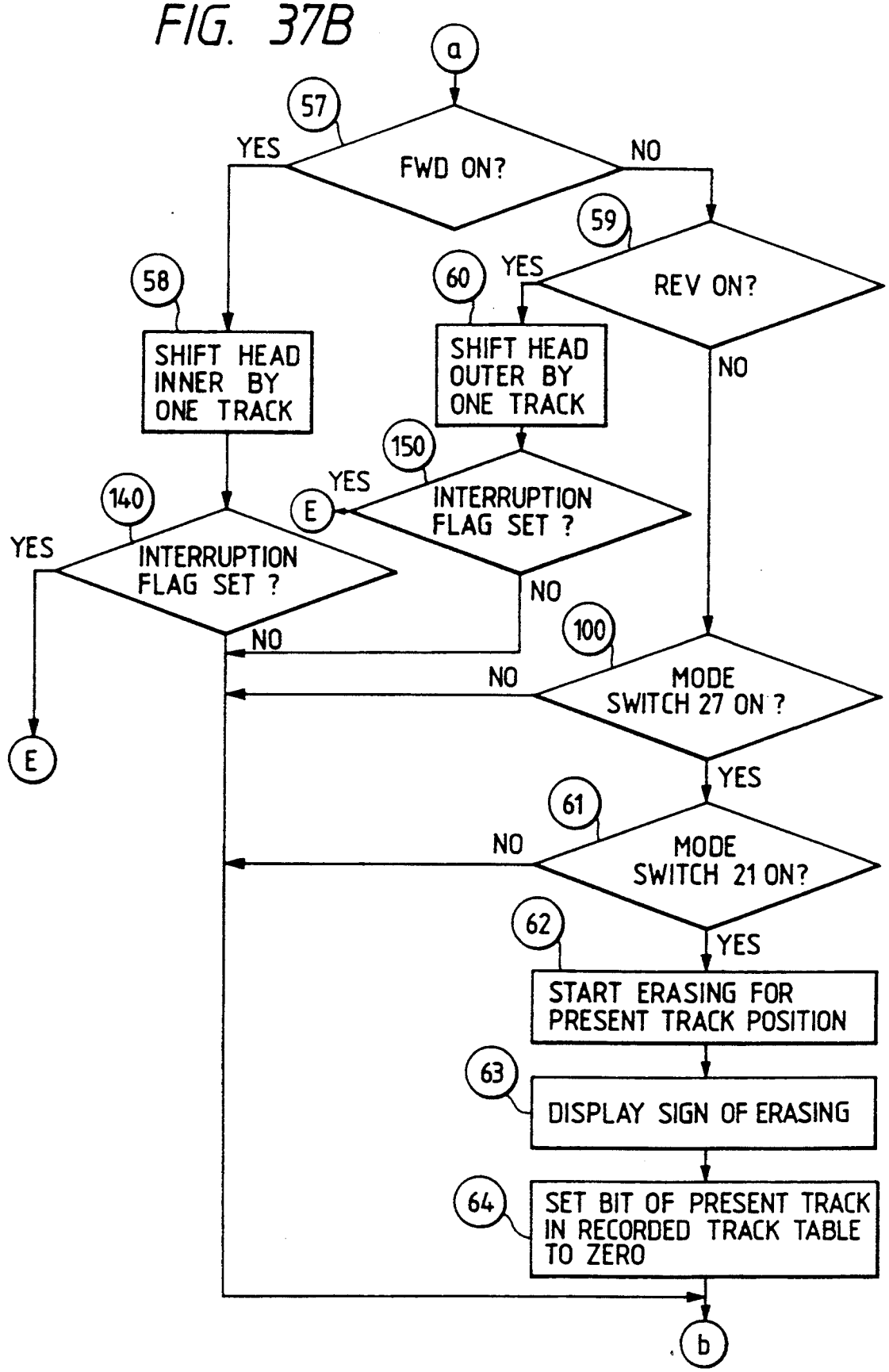

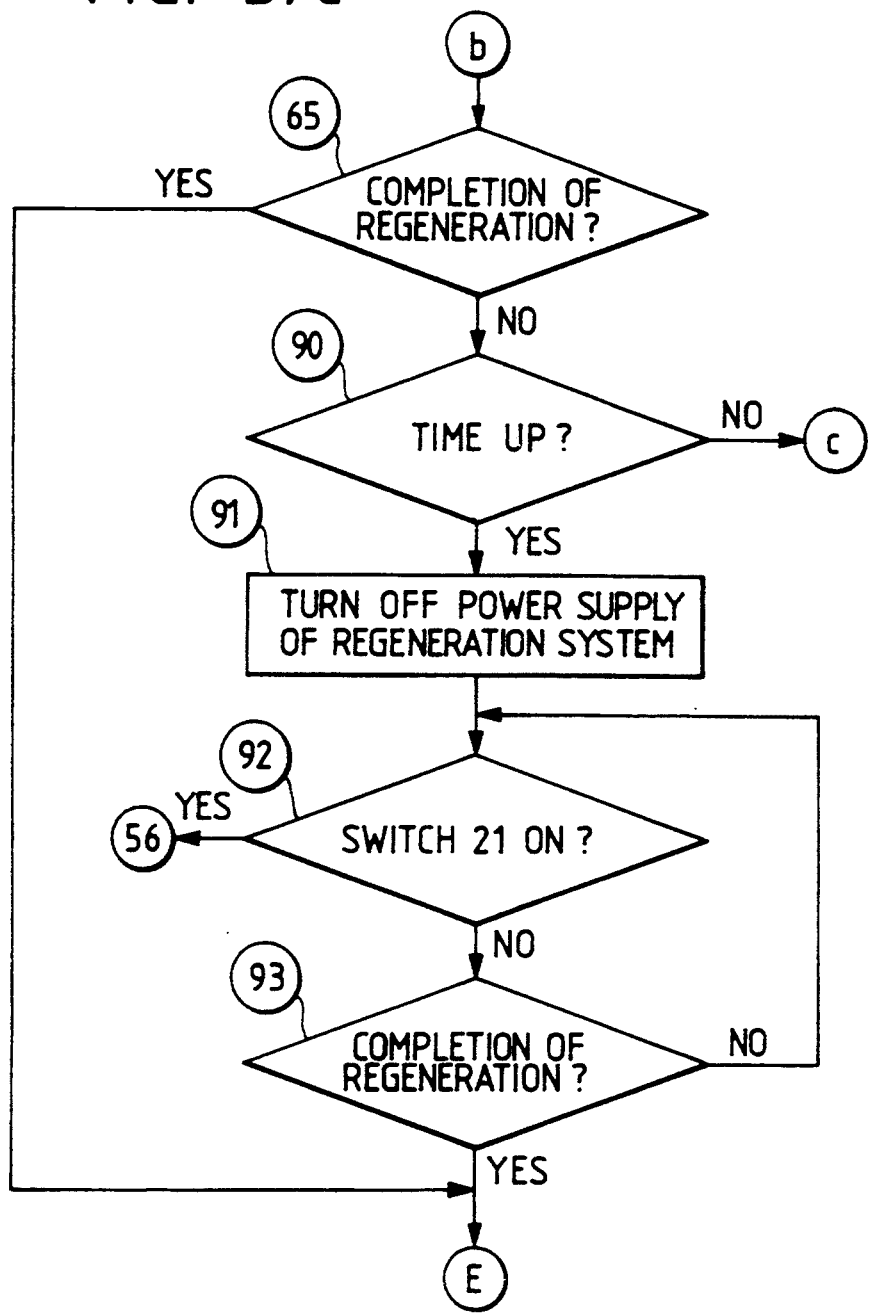

(BLINK TWICE)

(SINGLE IMAGE SURFACE RECORDING)

(SERIAL RECORDING)

(SELF TIMER RECORDING)

IMAGE PROCESSING SYSTEM

This application is a continuation of application Ser. No. 07/767,550 filed Sep. 27, 1991, now abandoned, which in turn is a continuation of application Ser. No. 07/409,950 filed Sep. 20, 1989, now abandoned.

BACKGROUND OF THE INVENTION

1. Field of the Invention

The present invention relates to an image processing system.

2. Related Background Art

Hitherto, as an image processing system, there has been known a combination of an image reproducing apparatus and an image forming apparatus in which an image signal reproduced by the image reproducing apparatus is formed as visual image onto, for instance, a paper.

However, in a conventional image processing system, between the image reproducing apparatus and the image forming apparatus, one of the apparatuses merely outputs an image signal to the other apparatus and an image processing system in which both of those apparatuses are organically combined is not obtained yet.

SUMMARY OF THE INVENTION

In consideration of the above point, it is the first object of the present invention to provide an image processing system having novel functions.

Another object of the invention is to provide an image processing system which can preferably form images of image signals of a plurality of picture planes recorded on a recording medium.

Still another object of the invention is to provide an image processing system which can preferably form an image while mutually executing communication between an image reproducing apparatus and an image forming apparatus.

To accomplish the above objects, according to a preferred embodiment of the invention, there is disclosed an image processing system comprising: reproducing means for sequentially reading out image signals of a plurality of picture planes recorded on a recording medium; and image forming means for forming image signals of a plurality of picture planes which were read out of the reproducing means as visual images.

Another object of the invention is to provide an image processing system in which an image recording and reproducing apparatus can be preferably controlled on the side of an image forming apparatus.

A further object of the invention is to provide an image forming apparatus which is suitable for portable color image pickup means.

Another object of the invention is to provide an image forming apparatus which is suitable for a portable recording and reproducing apparatus.

Under such objects, according to a preferred embodiment of the invention, there is disclosed an image processing system comprising: portable color image pickup means which can record a photographed color image onto a movable recording medium and can output a color image signal; electrophotographic processing means for forming a color image onto a recording sheet on the basis of color image data; and converting means for converting the color image signal from the image pickup means into the color image data in order to allow the color image by the color image pickup means to be visualized by the electrophotographic processing means.

The above and other objects and features of the present invention will become apparent from the following detailed description and the appended claims with reference to the accompanying drawings.

BRIEF DESCRIPTION OF THE DRAWINGS

FIGS. 3 to 6 are diagrams schematically showing examples of the switching control of a video interface unit in the color reader 1 in the embodiment;

FIG. 17 is an image information arrangement diagram in an image memory of the image memory apparatus in the embodiment;

FIG. 20 is an image information arrangement diagram in a memory of another image memory apparatus in the embodiment;

FIGS. 34-1, 34-2, 35 to 37, and 39 are flowcharts for explaining the operation of the apparatus in the embodiment.

DETAILED DESCRIPTION OF THE PREFERRED EMBODIMENTS

An embodiment according to the present invention will be described in detail hereinbelow with reference to the drawings.

Embodiment I

Figure 1:
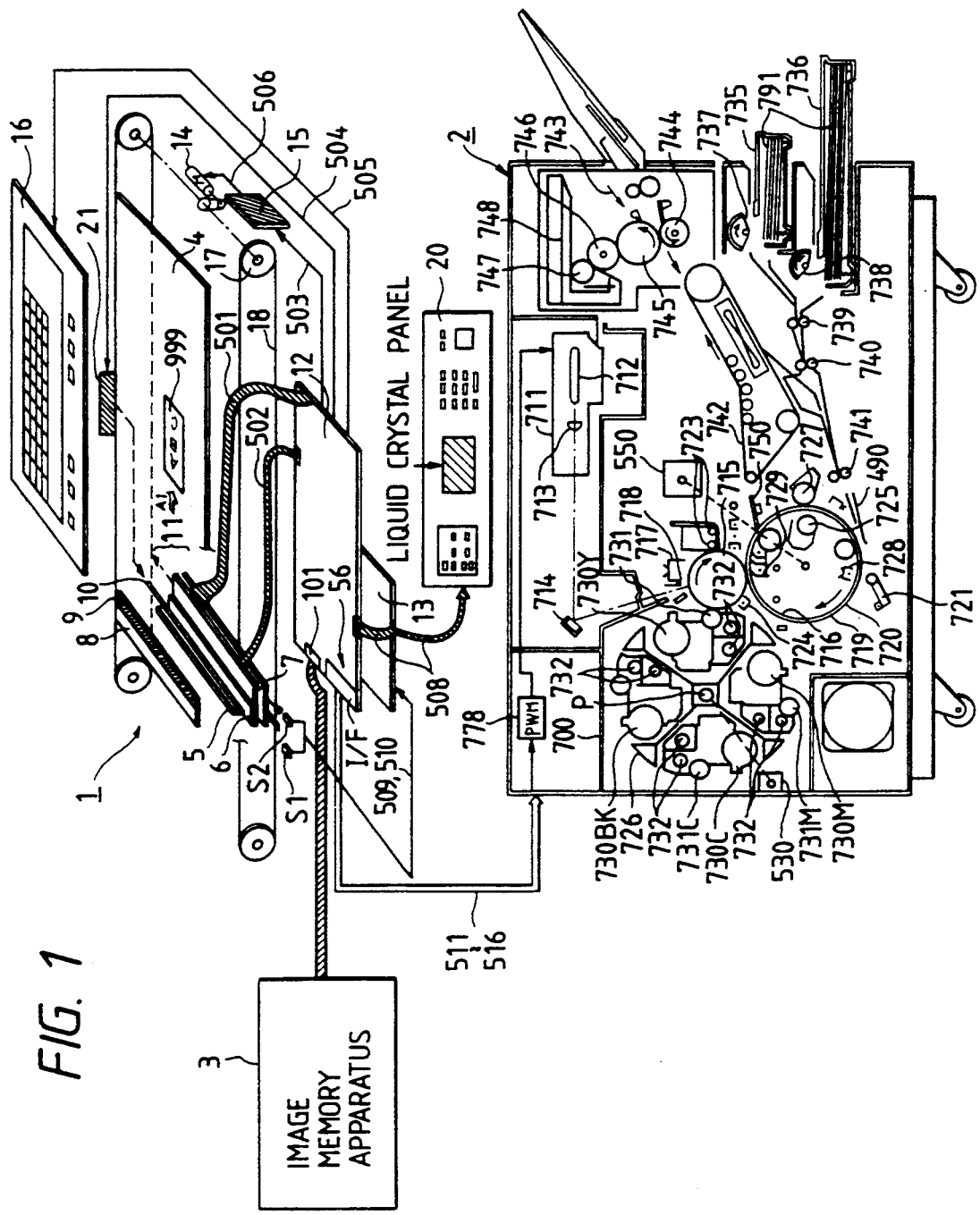
FIG. 1 is a system constructional diagram of an embodiment according to the present invention.

FIG. 1 is a system constructional diagram showing an example of a schematic internal construction of a color image forming system of an embodiment according to the invention. As shown in FIG. 1, the system of the embodiment comprises: a digital color image reading apparatus (hereinafter, referred to as a "color reader") 1 for reading a digital color image; a digital color image printing apparatus (hereinafter, referred to as a "color printer") 2 for printing and outputting the digital color image; and an image memory apparatus 3. The color reader 1 is arranged in the upper portion in FIG. 1. The color printer 2 and image memory apparatus 3 are arranged in the lower portion in FIG. 1.

The color reader 1 in the embodiment is an apparatus in which color image information of an original to be read for is read every color by color separating means, which will be explained hereinlater, and the read color image information is converted into the electrical digital image signals by a photoelectric converting element comprising a CCD or the like.

The color printer 2 is a laser beam color printer of the electrophotographic system in which color images are limited for every color in accordance with the digital image signal to be output and are copy transferred and recorded a plurality of times onto a recording paper in a digital dot format.

Further, the image memory apparatus 3 stores the digital images which were read from the color reader 1.

Each of the sections will now be described in detail hereinbelow.

Description of the Color Reader 1

A construction of the color reader 1 will be first explained.

In the color reader 1 in FIG. 1, reference numeral 999 denotes an original; 4 indicates a platen glass on which an original is placed; 5 denotes a rod array lens for converging the reflected light image from the original which was exposed and scanned by a halogen exposing lamp 10 and for inputting the image into a direct copy (real scale) type full color sensor 6. The rod array lens 5, the sensor 6, a sensor output signal amplifier 7, and halogen exposing lamp 10 integrally form an original scanning unit 11. The scanning unit 11 exposes and scans the original 999 in the direction of an arrow ($A_1$). Image information to be read from the original 999 is sequentially read every line by exposing and scanning the original scanning unit 11. The read color separation image signal is amplified into predetermined voltages by the sensor output signal amplifier 7 and, thereafter, the signal is input to a video processing unit by a signal line 501 and processed. The signal line 501 is constructed as a coaxial cable to assure the transmission of the signal with high fidelity. Reference numeral 502 denotes a signal line to supply a drive pulse of the direct copy type full color sensor 6. All of the necessary drive pulses are provided in a video processing unit 12. Reference numerals 8 and 9 denote a white board and a black board to execute the white level correction and black level correction of the image signal. Signal levels of predetermined concentrations can be obtained by irradiating the white and black boards by the halogen exposing lamp 10, respectively, and are used for the white level correction and black level correction of the video signal.

Reference numeral 13 denotes a control unit to control the whole color reader 1 in the embodiment having a microcomputer. The control unit 13 executes the display on an operation panel 20, control of key inputs, control of the video processing unit 12 through a bus 508, and the like. On the other hand, the control unit 13 detects the position of the original scanning unit 11 by position sensors $S_1$ and $S_2$ via signal lines 509 and 510.

Further, the control unit 13 controls a stepping motor driving circuit 15 to pulse drive a stepping motor 14 to move the original scanning unit 11 by a signal line 503. The control unit 13 also executes the entire control of the color reader 1. That is, the ON/OFF operations and the amount of light emitted by the halogen exposing lamp 10 are controlled by an exposing lamp driver 21 via a signal line 504. A digitizer 16, internal keys, and display unit are controlled via a signal line 505.

The color image signal which was read by the exposing scanning unit 11 when the original was exposed and scanned is input to the video processing unit 12 through the amplifier 7 and signal line 501.

The original scanning unit 11 and video processing unit 12 mentioned above will now be described in detail with reference to FIG. 2.

The color image signal which was input to the video processing unit 12 is separated into signals of three colors of G (green), B (blue), and R (red) by a sample and hold (S/H) circuit 43. The separated color image signals are processed by an analog color signal processing circuit 44 in an analog manner and, thereafter, they are A/D converted into the digital color image signals.

Figures 2, 26A:
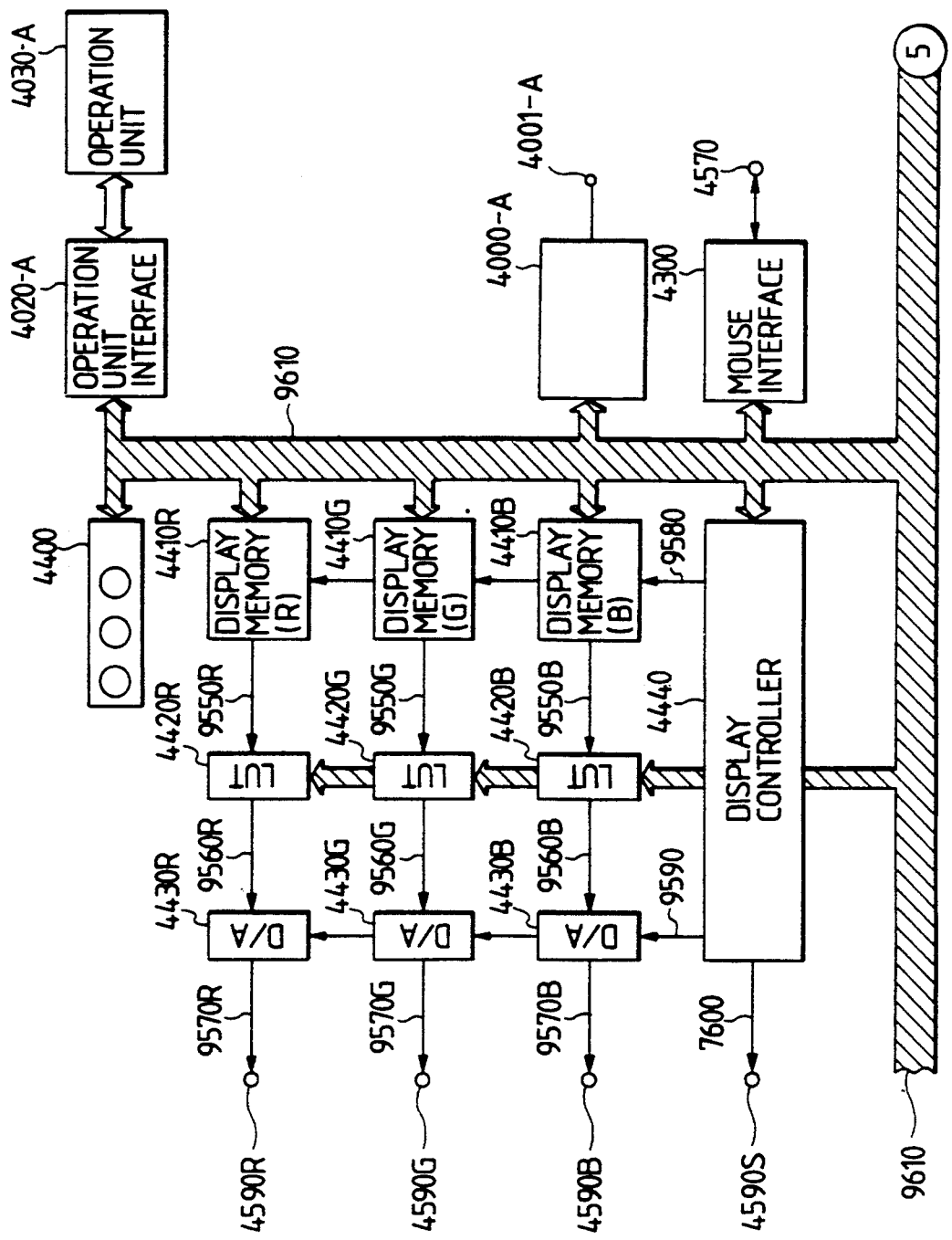
FIGS. 26A and 26B are block diagrams of an image memory apparatus in another embodiment.

In the embodiment, as also shown in FIG. 2, the color reading sensor 6 in the original scanning unit 11 is constructed like a stagger pattern which is divided into five regions. The reading positional deviations between the channels 2 and 4 which are precedently scanned and the remaining channels 1, 3 and 5 are corrected by using the color reading sensor 6 and FIFO memory 46. The signals in which the positional deviations were corrected are input from the FIFO memory 46 to a black correction/white correction circuit. A variation in the dark state of the color reading sensor 6, a variation of the light amount of the halogen exposing lamp 10, a variation of the sensitivity of the sensor, and the like are corrected by using the signals corresponding to the reflected lights from the white board 8 and black board 9 mentioned above.

The color image data which is proportional to the input light amount of the sensor 6 is input to a video interface 101 and connected to the image memory apparatus 3.

Figure 5:
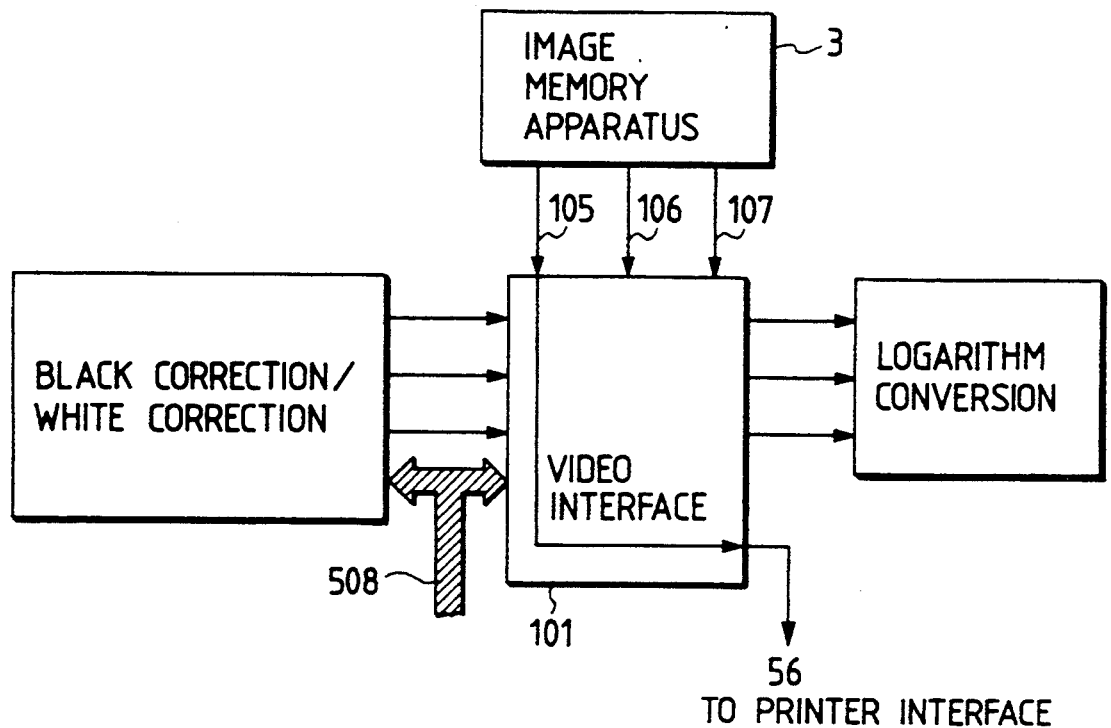
Figure 6:
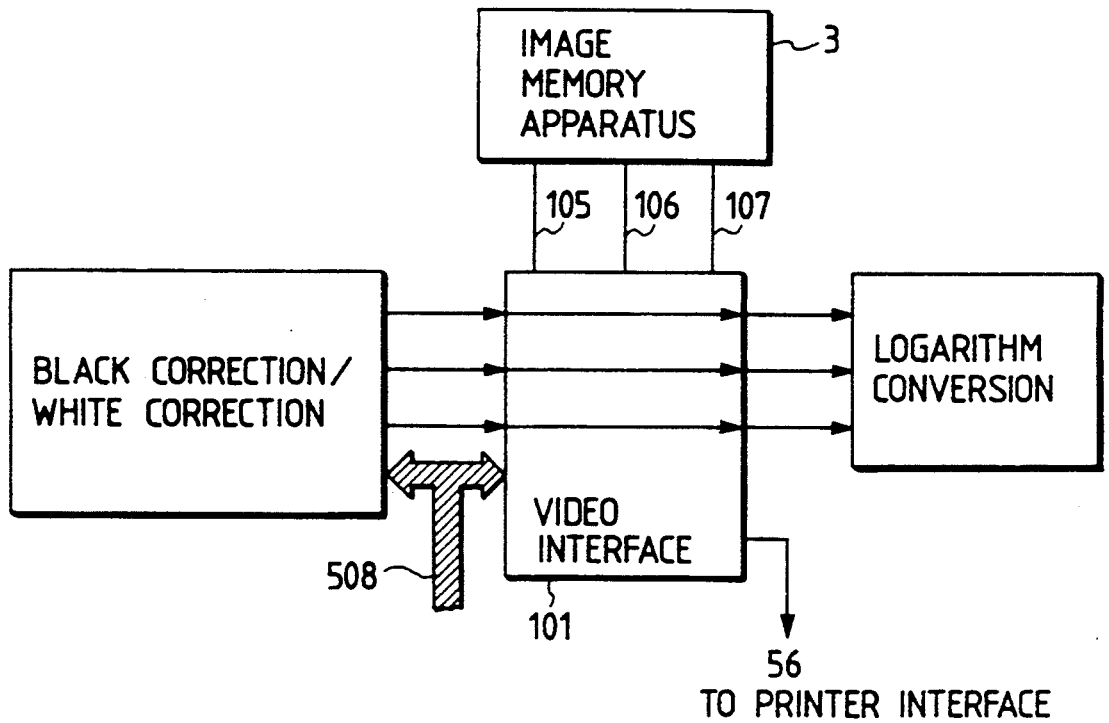

The video interface 101 has the following four functions shown in FIGS. 3 to 6:

(1) to output a signal 559 from the black correction/white correction circuit to the image memory apparatus 3 (FIG. 3);

(2) to input the image information from the image memory apparatus 3 to a logarithm conversion circuit 86 (FIG. 4);

(3) to input the image information from the image memory apparatus to a printer interface 56 (FIG. 5);

(4) to transmit the signal 559 from the black correction/white correction circuit to the logarithm conversion circuit 86 (FIG. 6).

The above four functions are selectively switched as shown in FIGS. 3 to 6 by the CPU control line 508.

Description of the Image Recording Unit

An explanation will now be provided with respect to the reading (latching) control in the color reader 1 and the memory control of the read image information into the image memory apparatus 3 according to the embodiment.

Figure 7:
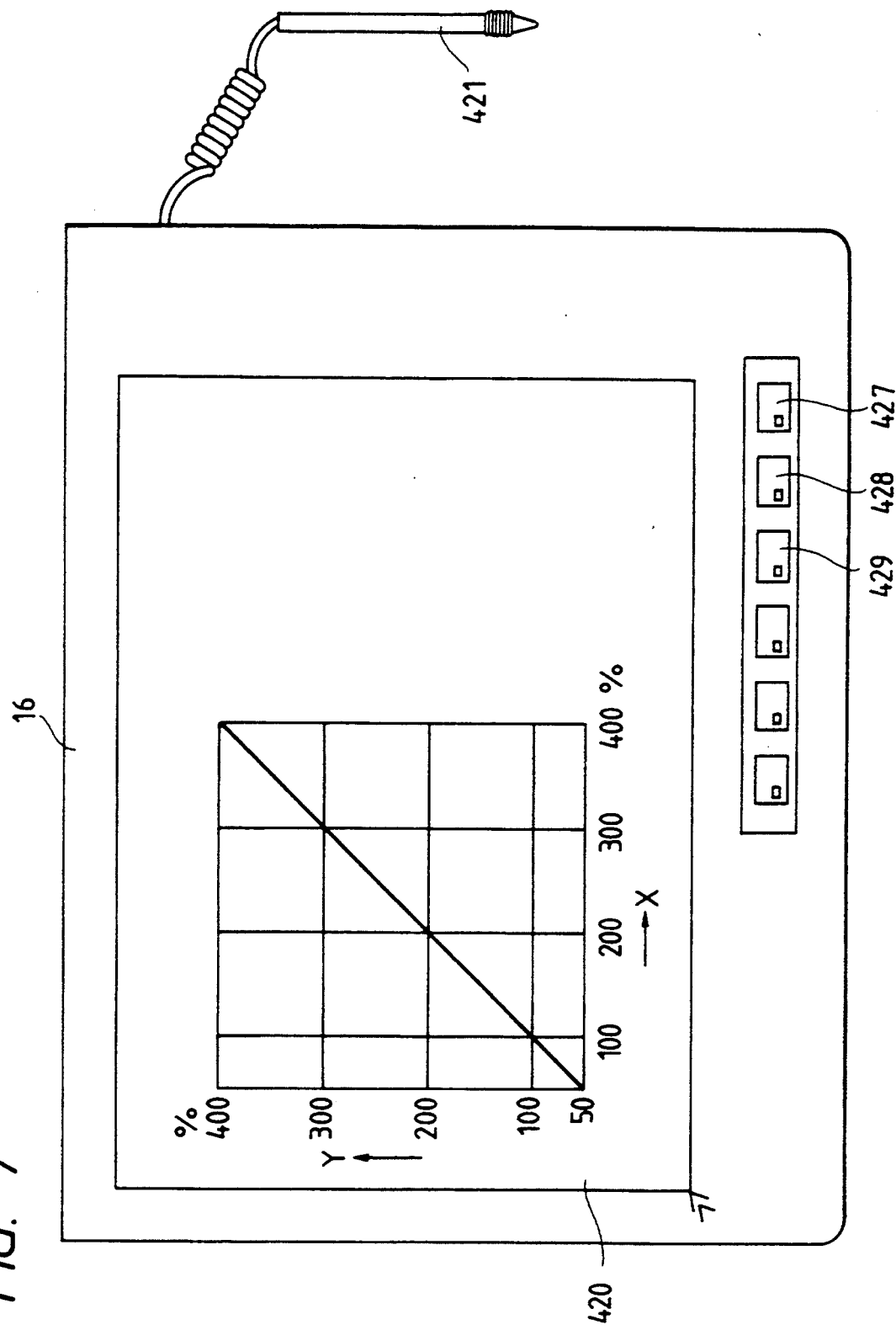
FIG. 7 is an external view of a digitizer in the embodiment.

The reading mode by the color reader 1 is set by the digitizer, which will be explained hereinlater. FIG. 7 shows an external view of the digitizer 16.

In FIG. 7, reference numeral 427 denotes an entry key to transfer the image data from the color reader 1 into the image memory apparatus 3. A coordinates detecting plate 420 is used to designate an arbitrary area on an original to be read or to set a reading magnification or the like. A pointing pen 421 is used to designate the coordinates of the arbitrary area.

To transfer the image data of an arbitrary area on the original to the image memory apparatus 3, the entry key 427 in FIG. 7 is depressed and, thereafter, the reading position is indicated by the pointing pen 421.

The information of the reading area is transmitted to the video processing unit 12 through the communication line 505 in FIG. 1. The video processing unit 12 sends the signal from the video interface 101 to the image memory apparatus 3 via the CPU control line 508.

Figure 8:
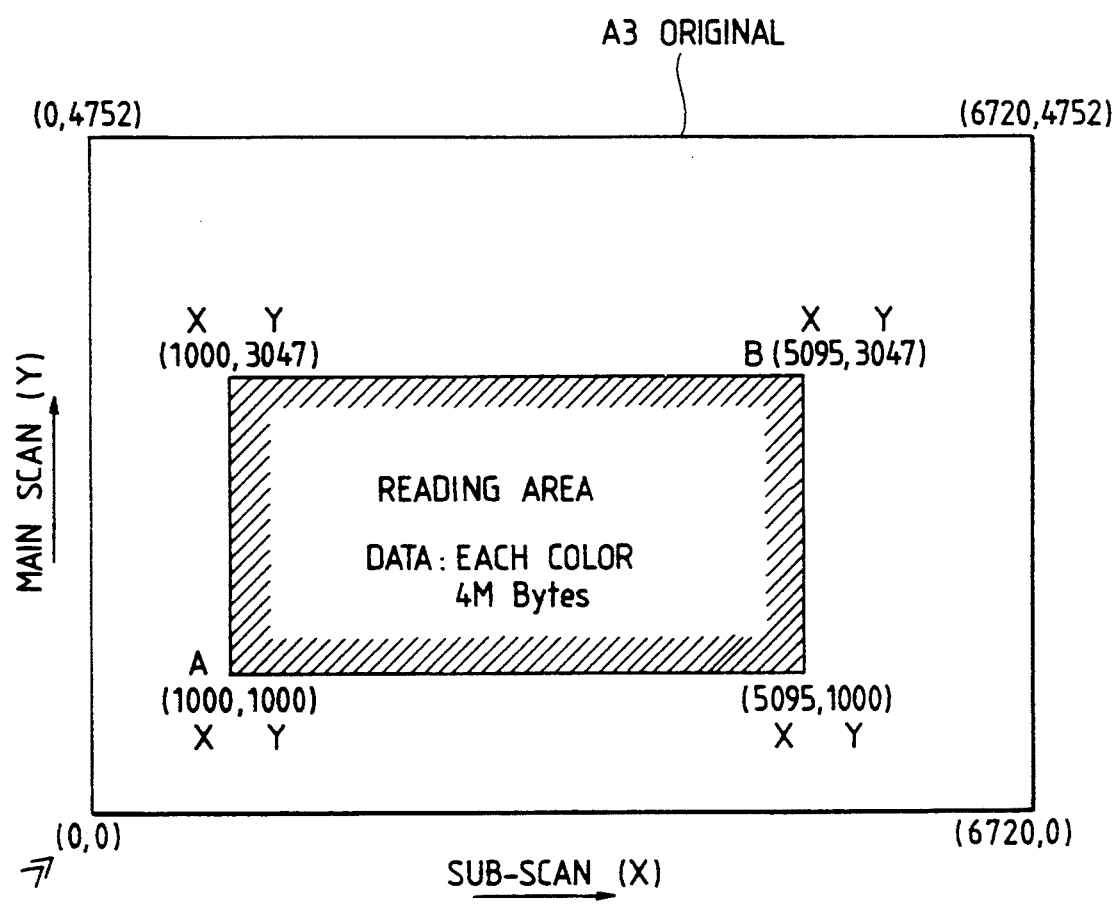
FIG. 8 is a diagram for explaining address information indicated by the digitizer of the embodiment.

FIG. 8 shows an example of addresses of the information (points A and B) of the areas designated by the pointing pen 421 of the digitizer 16.

Figure 9:
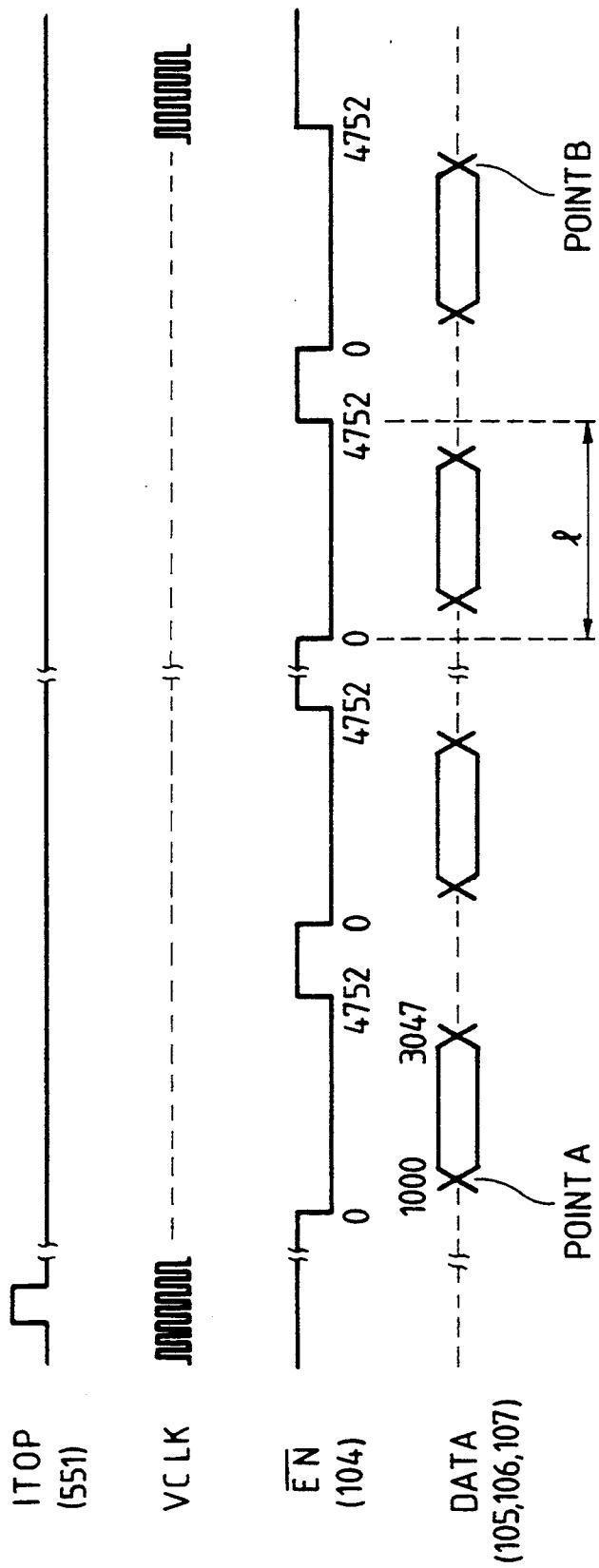
FIG. 9 is a timing chart for outputs from an interface unit to an image memory apparatus in the embodiment.

In addition to the above area information, the video interface 101 outputs a VCLK signal, an ITOP signal 551, and an $\overline{EN}$ signal 104 and the like as signals from an area signal generation circuit 51 to the image memory apparatus 3 together with the image data. FIG. 9 shows a timing chart for those output signal lines.

As shown in FIG. 9, by pressing a start button on the operation panel 20, the stepping motor 14 is driven. The original scanning unit 11 starts scanning. When the scanning position of the original scanning unit 11 has reached the front edge of the original, the ITOP signal 551 is set to "1". When the original scanning unit 11 has reached the area designated by the digitizer 16, the $\overline{EN}$ signal 104 is held to the "1" level during the scanning of the area. Therefore, it is sufficient to latch the read color image information (DATA 105, 106, 107) for the period of time when the $\overline{EN}$ signal 104 is at the "1" level.

As shown in FIG. 9 mentioned above, upon transfer of the image data from the color reader 1, by controlling the video interface 101 as shown in FIG. 3, the R data 105, G data 106, and B data 107 are transmitted to the image memory apparatus 3 in a real-time manner synchronously with the ITOP signal 551, the control signal of the $\overline{EN}$ signal 104, and the VCLK signal.

A method of storing the image data into the image memory apparatus 3 by the image data and control signals will now be practically described with reference to FIGS. 10A and 10B.

A connector 4550 is connected to the video interface 101 of the color reader 1 via a cable. The R data 105, G data 106, and B data 107 are connected to a selector 4250 through signal lines 9430R, 9430G, and 9430B, respectively. The VCLK signal, the $\overline{EN}$ signal 104, and the ITOP signal 551 which are sent from the video interface 101 pass through a signal line 9450 and are directly input to a system controller 4210. On the other hand, prior to reading the original, the area information designated by the digitizer 16 is input to a reader controller 4270 via a communication line 9460. The area information is read out of the reader controller 4270 by a CPU 4360 through a CPU bus 9610.

The R data 105, the G data 106, and the B data 107 which were input to the selector 4250 via the signal lines 9430R, 9430G, and 9430B are synchronized with the respective signals by the selector 4250 and, thereafter, they are output to signal lines 9420R, 20G, and 9420B and are input to FIFO memories 4050R, 4050G, and 4050B.

Figure 11:
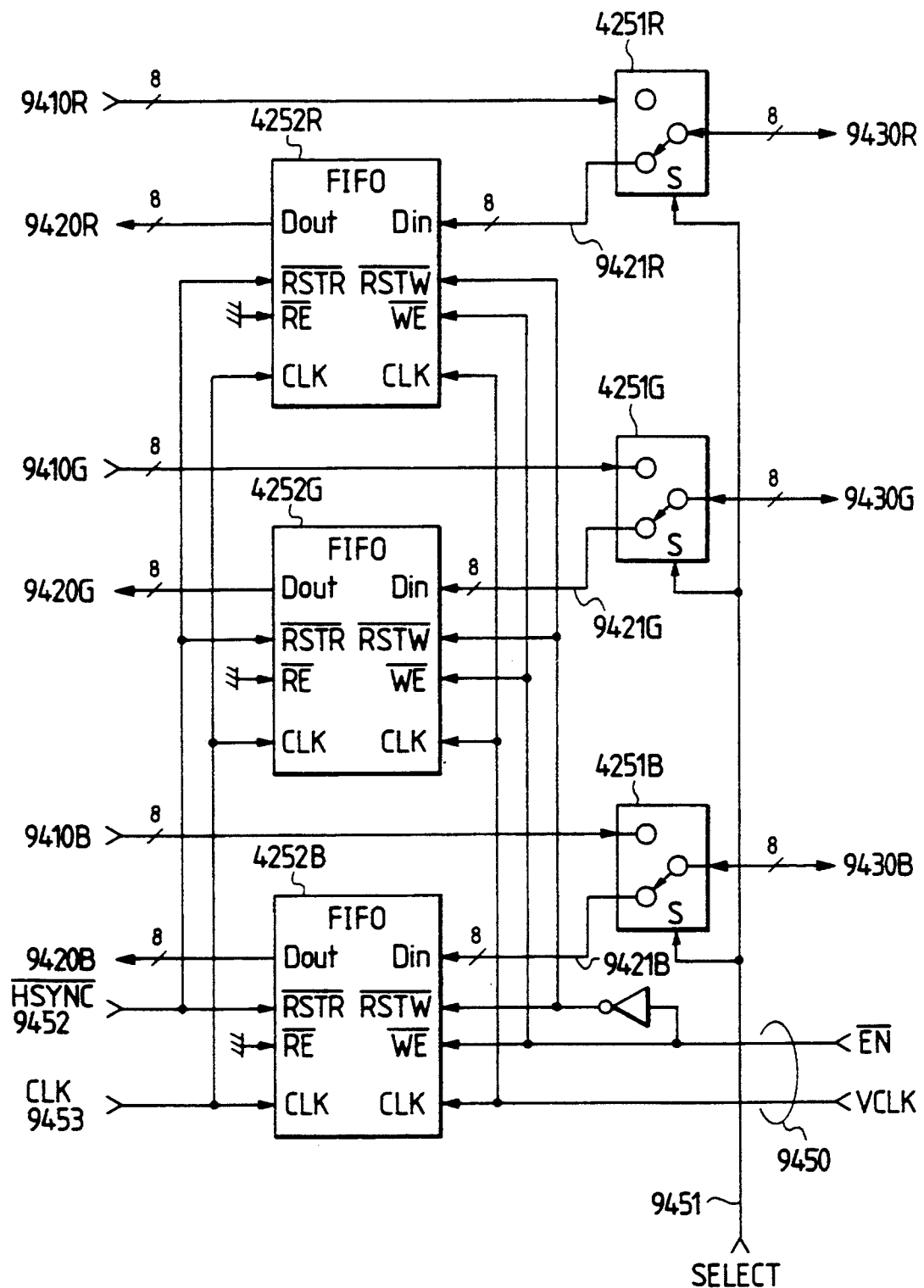
FIG. 11 is a detailed diagram of a selector unit in the image memory apparatus in the embodiment.

FIG. 11 shows a detailed construction diagram of the selector 4250.

As shown in the diagram, the image data on the signal lines 9430R, 9430G, and 9430B which were sent from the color reader 1 pass through selectors 4251R, 4251G, and 4251B and are input to FIFO memories 4252R, 4252G, and 4252B.

The input signals to the selectors 4251R, 4251G, and 4251B are selected by an SELECT signal 9451.

Image data 9421R, 9421G, and 9421B of one main scanning line (width corresponding to l: from address 0 to address 4752) shown in FIG. 9 are stored into the FIFO memories 4252R, 4252G, and 4252B by the VCLK signal and the $\overline{EN}$ signal.

The signals of the areas other than the effective area designated by the digitizer 16 are also stored into the FIFO memories 4252R, 4252G, and 4252B.

Next, the data stored in the FIFO memories 4252R, 4252G, and 4252B are read out synchronously with a CLK signal 9453 and an $\overline{HSYNC}$ signal 9452 in the image memory apparatus 3. That is, the difference between the clocks of the color reader 1 and image memory apparatus 3 is absorbed by the FIFO memories 4252R, 4252G, and 4252B.

The system controller 4210 transfers the image data of only the effective area of the image among the image data 9420R, 9420G, and 9420B from the FIFO memories 4252R, 4252G, and 4252B to the FIFO memories 4050R, 4050G, and 4050B. On the other hand, at this time, the system controller 4210 also simultaneously executes the trimming process and variable magnifying process. The above processes in the embodiment will now be described hereinbelow with reference to a circuit diagram of FIG. 12 and a timing chart of FIG. 13.

That is, before the data is transferred from the FIFO memories 4252R, 4252G, and 4252B to the FIFO memories 4050R, 4050G, and 4050B, the effective area in the main scanning direction of the area designated by the digitizer 16 is written into an RAM 4212 by the CPU bus 9610.

By controlling a selector 4213, the side of the CPU bus 9610 is selected and made effective. The "0" data is written into the effective area of the area indicated in the RAM 4212 and the "1" data is written into the invalid area.

Subsequently, by controlling the selector 4213, the side of a counter 4214 is selected and made effective. A write enable signal 9100 of the FIFO memories 4050R, 4050G, and 4050B synchronized with the $\overline{HSYNC}$ signal 9452 and CLK signal 9453 is output from the RAM 4212 and a latch 4211. Only the effective area (A') in the color image information (A) is written into the FIFO memories 4050R, 4050G, and 4050B. The written image data is sequentially output by the amount of the effective area from address "0" with the time delay corresponding to one main scan in the form synchronized with the $\overline{HSYNC}$ signal 9452 (9090R, 9090G, 9090B).

An explanation has been provided above with respect to the example in which the image data in the FIFO memories 4252R, 4252G, and 4252B are directly (at the real scale magnification) transferred to the FIFO memories 4050R, 4050G, and 4050B. However, the embodiment is not limited to the above control but the variable magnifying process and trimming process can be also executed depending on the data to be written into the RAM 4212.

Figure 14:
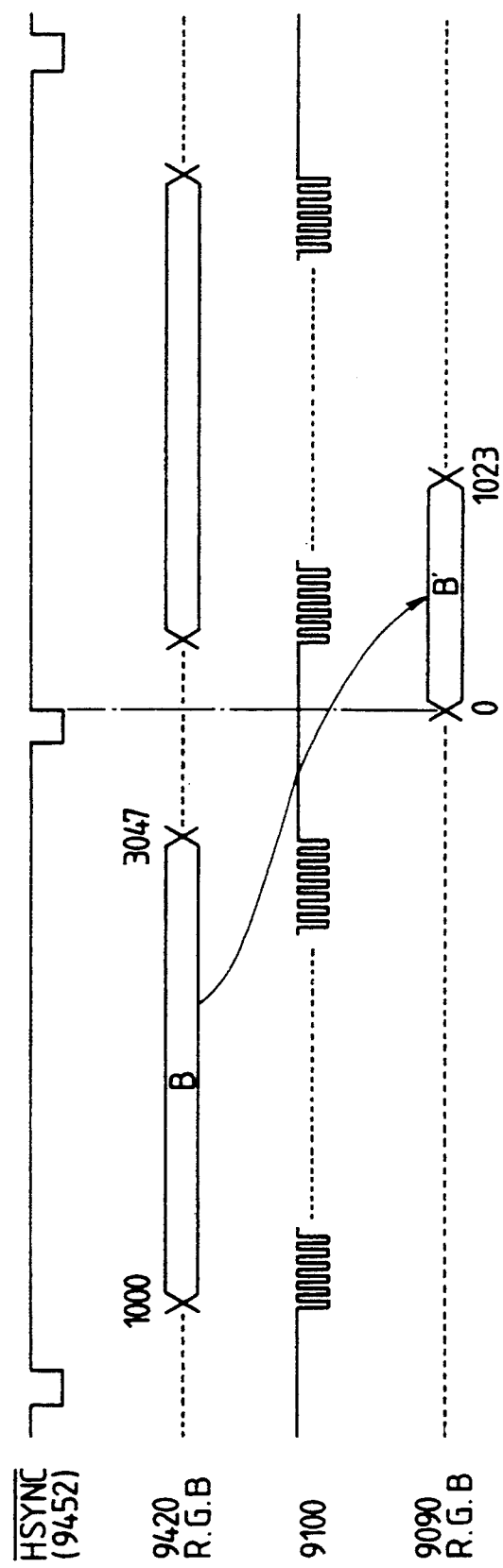
FIG. 14 is a timing chart when data is stored into the FIFO memory of the system control unit in the variable magnification processing mode in the embodiment.

FIG. 14 shows a timing chart in the case where the variable magnifying process and trimming process were executed.

FIG. 14 is a diagram showing an example of the timing chart in the case where the image data from the FIFO memories 4252R, 4252G, and 4252B were reduced by 50% by the variable magnifying process and transferred to the FIFO memories 4050R, 4050G and 4050B.

As shown in FIG. 14, the reading operation is limited by setting the write data (write enable signal to the FIFO memories 4050R, 4050G, 4050B) to the RAM 4212 into "1" (inhibition of the writing) in the effective area of the image data, thereby permitting the performing of a reducing operation. In the case of FIG. 14, the image data is reduced by 50% by alternately repeating the "1" and "0" data for the write enable signal 9100. In this manner, by reducing the write data to the RAM 4212 in accordance with a reduction magnification, the reducing process at an arbitrary magnification can be easily executed in the image memory apparatus 3.

The image data reduced by 50% is delayed by the time corresponding to one main scanning operation and output from the address "0" synchronously with the $\overline{HSYNC}$ signal (B' in FIG. 14).

As mentioned above, desired image data can be reduced in the main scanning direction due to the data to be written into the RAM 4212.

Next, the image data are transferred from the FIFO memories 4050R, 4050G, and 4050B into memories 4060R, 4060G, and 4060B by a counter 0 (4080-0) and a control line 9170.

In this case, both of the variably magnifying process and the trimming process in the sub-scanning direction are simultaneously executed. The variable magnifying process in the sub-scanning direction will now be described hereinbelow with reference to a block diagram of FIG. 15 and a timing chart of FIG. 16 showing the case where the image data was reduced by 50%.

Prior to transferring the data from the FIFO memories 4050R, 4050G, and 4050B to the image memories 4060R, 4060G, and 4060B, the CPU 4360 writes into an RAM 4217 the data (write enable signal to the image memories 4060R, 4060G, 4060B) to control the writing operations to the image memories 4060R, 4060G, and 4060B of the area in the sub-scanning direction of area designated by the digitizer 16 via the CPU bus 9610. The image invalid area is set to "1". The effective area is set to "0" in the direct copy mode. In the case of the reduction mode, the data in the effective area is set to "1" in accordance with the reduction magnification. The reducing process of 50% can be realized by alternately repeating the "1" and "0" data in the image effective area.

Figure 16:
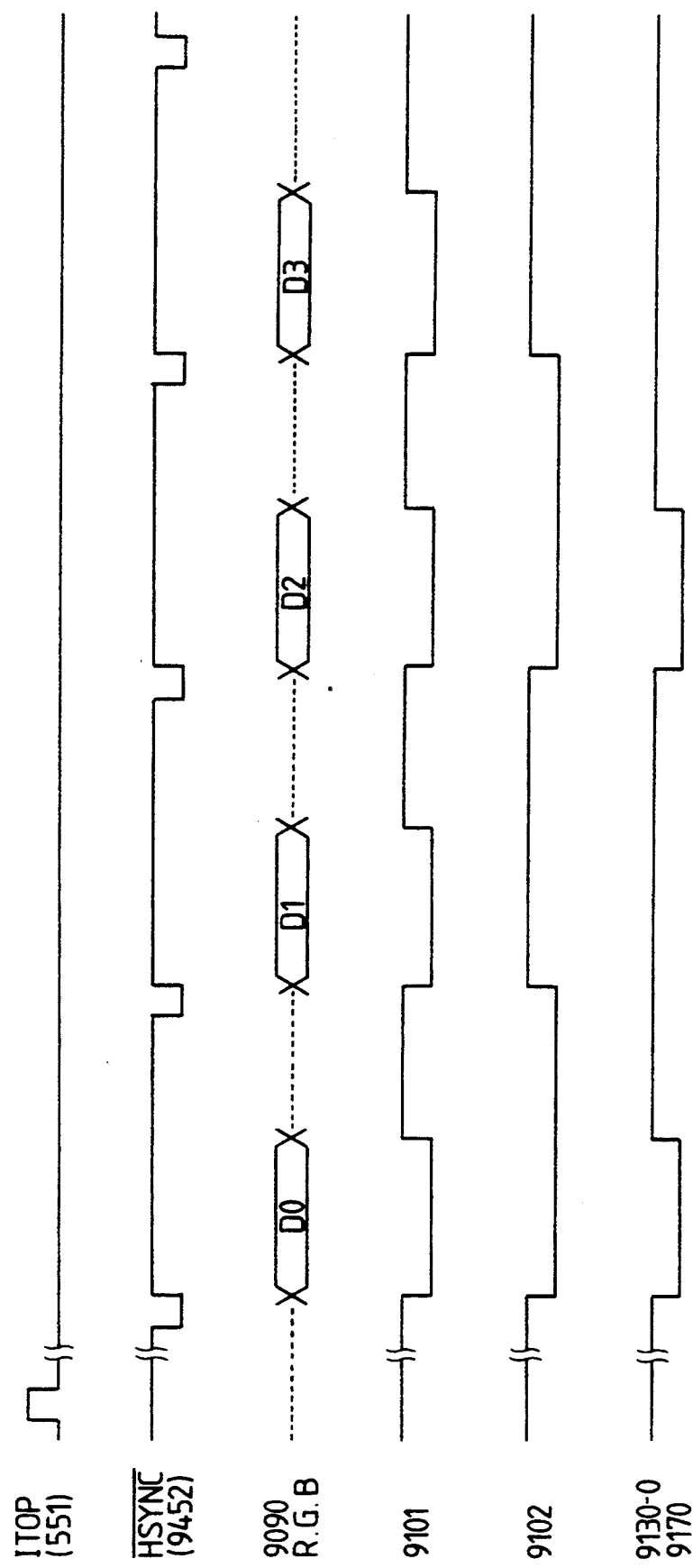
FIG. 16 is a timing chart when data is stored into the image memory of the system controller unit in the variable magnification processing mode in the embodiment.

In the reduction mode of 50%, for the write enable signal 9170 to the image memories 4060R, 4060G, and 4060B, the "1" and "0" data are alternately repeated in the image effective area as shown in FIG. 16. Due to this, "$D_0$" and "$D_2$" in FIG. 16 are stored as image data into the image memories 4060R, 4060G, and 4060B. "$D_1$" and "$D_3$" are not stored.

As mentioned above, the trimming and variable magnifying processes in the main scanning direction can be executed by the data which is set into the RAM 4212. The trimming and variable magnifying processes in the sub-scanning direction can be performed by the data which is set into the RAM 4217.

The memory capacity in the embodiment is set to 1 Mbytes for every color. Therefore, by reducing the image data in the reading area in FIG. 8 by 50%, the read image data is converted into the data of the maximum capacity of the memory provided in the image memory apparatus 3 and is stored.

On the other hand, in the above embodiment, the CPU 4360 calculates the effective area from the information of the area of the original of A3 size which was designated by the digitizer 16 and sets the data corresponding to the RAM 4212.

In the embodiment, since the amount of data of the reading image is larger than the capacity of the image memory provided, the reducing process is executed and image data is transformed to data of an amount which can be stored and, thereafter, it is stored into the image memory. However, if the amount of data of the reading image is smaller than the capacity of the image memory provided, by setting a $\overline{CLR}$ signal 9171 in FIG. 15 to "1", the image data of a plurality of picture planes can be simultaneously stored into the image memory. In this case, all of the write data to the RAMs 4212 and 4217 to control the writing into the memory of the area designated by the digitizer 16 are set to "0", a state that all of the data in the designated area are stored in the memory is set and the magnification is set to the real scale.

On the other hand, in order to store in the memory while keeping an aspect ratio (ratio between the vertical and lateral lengths) of the reading image, the CPU 4360 first obtains the number "x" of effective pixels from the area information sent from the digitizer 16. Next, z is obtained by the following equation from the maximum capacity "y" of the image memory.

$$\frac{y}{x} \times 100 = z$$

Thus, (1) When z≧100, all of the write data of the effective image area are set to "0" and stored into the RAMs 4212 and 4217 as a real scale mode.

(2) When z<100, the reducing process of z % is executed for both of the RAMs 4212 and 4217 and the reduced image data is stored into the maximum capacity of the memory while keeping the aspect ratio.

Even in this case, as the write data which is written into the RAMs 4212 and 4217, the "1" and "0" data are properly written in correspondence to the reduction ratio "z".

The following is a detailed description of the process, noted as (2), of storing image information which is reduced with the aspect ratio thereof preserved.

Image data (8 Mbytes for each color) on the readout region defined by a shaded periphery on the A3 document shown in FIG. 8 is stored up to the maximum memory capacity (2 Mbytes for each color) of each of the memories 4060R, 4060G, and 4060B.

The points A and B shown in FIG. 8 are specified with the pointing pen 421 of the digitizer 16.

The X-Y coordinates of point A are (1000, 1000), while the X-Y coordinates of point B are (5095, 3047). Both coordinates are transmitted to the video processing unit 12 over the signal line 505. The video processing unit 12 computes the size of the readout region from the coordinates of the respective points A and B. In this example, the size of the readout region is approximately 8 M picture elements which are obtained from $(5095-1000) \times (3047-1000)$.

Moreover, since the memory capacity of the apparatus is 2 Mbytes for each color.

$$\frac{2M}{8M} \times 100 = 25$$

Thus, Z=25 is obtained, and a 25% reduction in the area of the readout region is achieved.

The 25% reduction in the area means a 50% reduction in each of the X and Y direction. Therefore, in order to store the readout image in the memory without changing the aspect ratio, data corresponding to a 50% reduction is set in each of the RAM 4212 and the RAM 4217.

Figure 12:
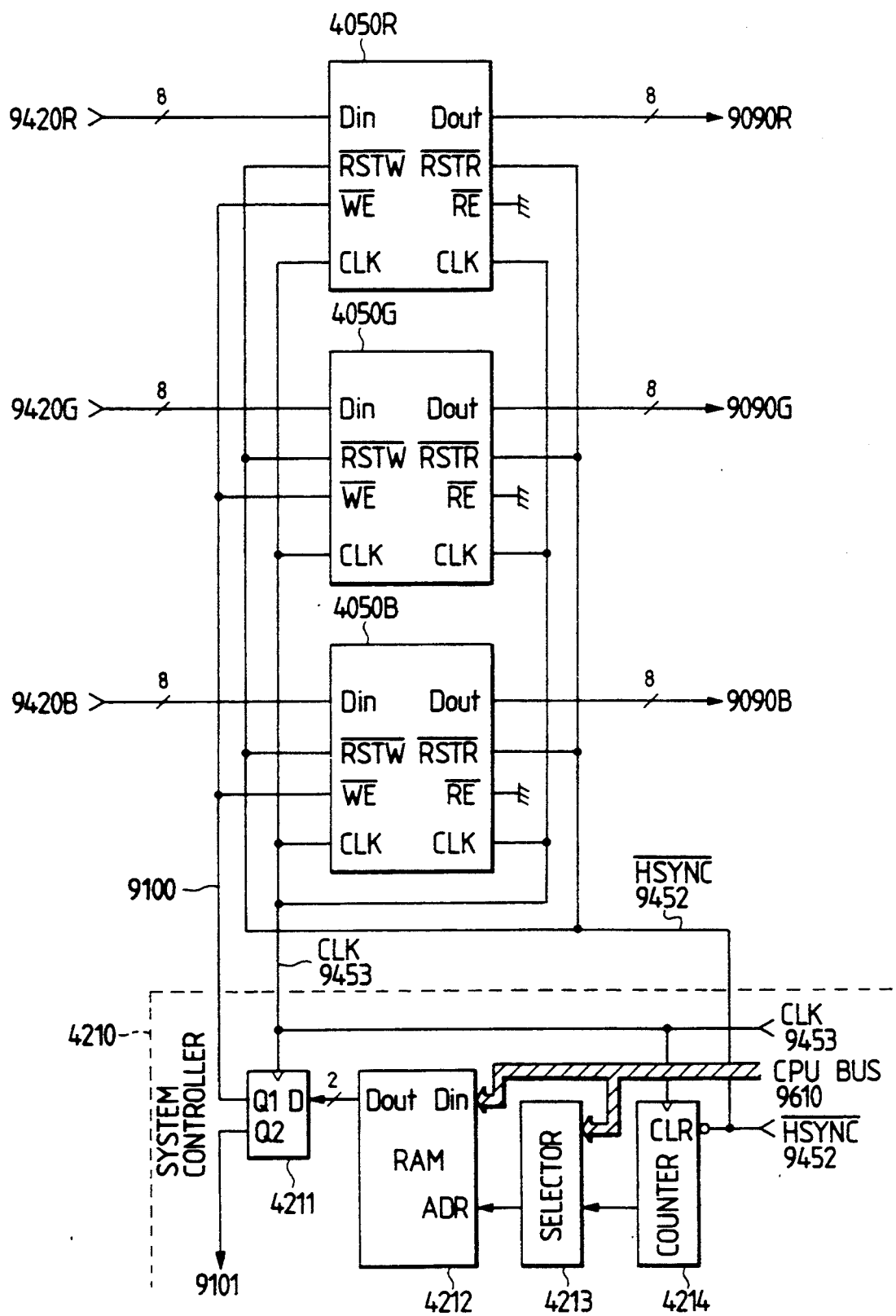
FIG. 12 is a detailed diagram of a system controller unit and an FIFO memory in the image memory apparatus in the embodiment.
Figure 13:
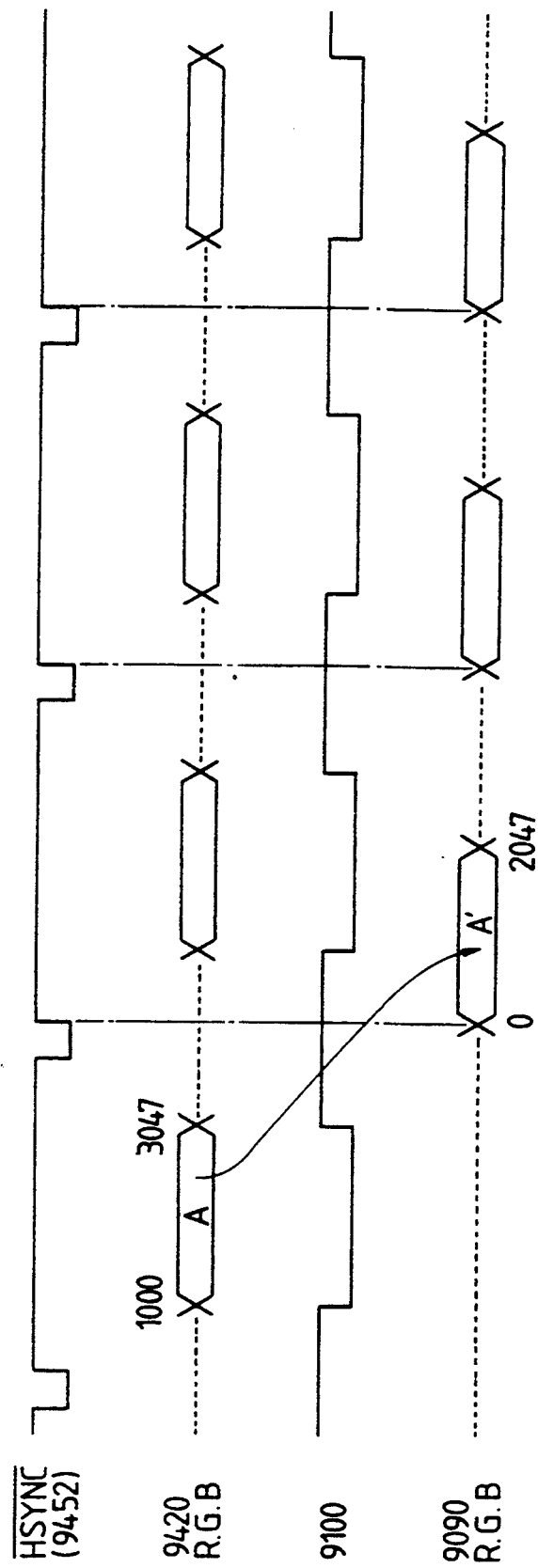
FIG. 13 is a timing chart when data is stored into the FIFO memory of the system controller unit in the direct copy (real scale) processing mode in the embodiment.

In the RAM 4212 of FIG. 12, "1" is written into the area of addresses 0 to 999, "0" and "1" are alternately written into the area of addresses 1000 to 3047, and "1" is written in the area from addresses 3048 to 4752.

Figure 15:
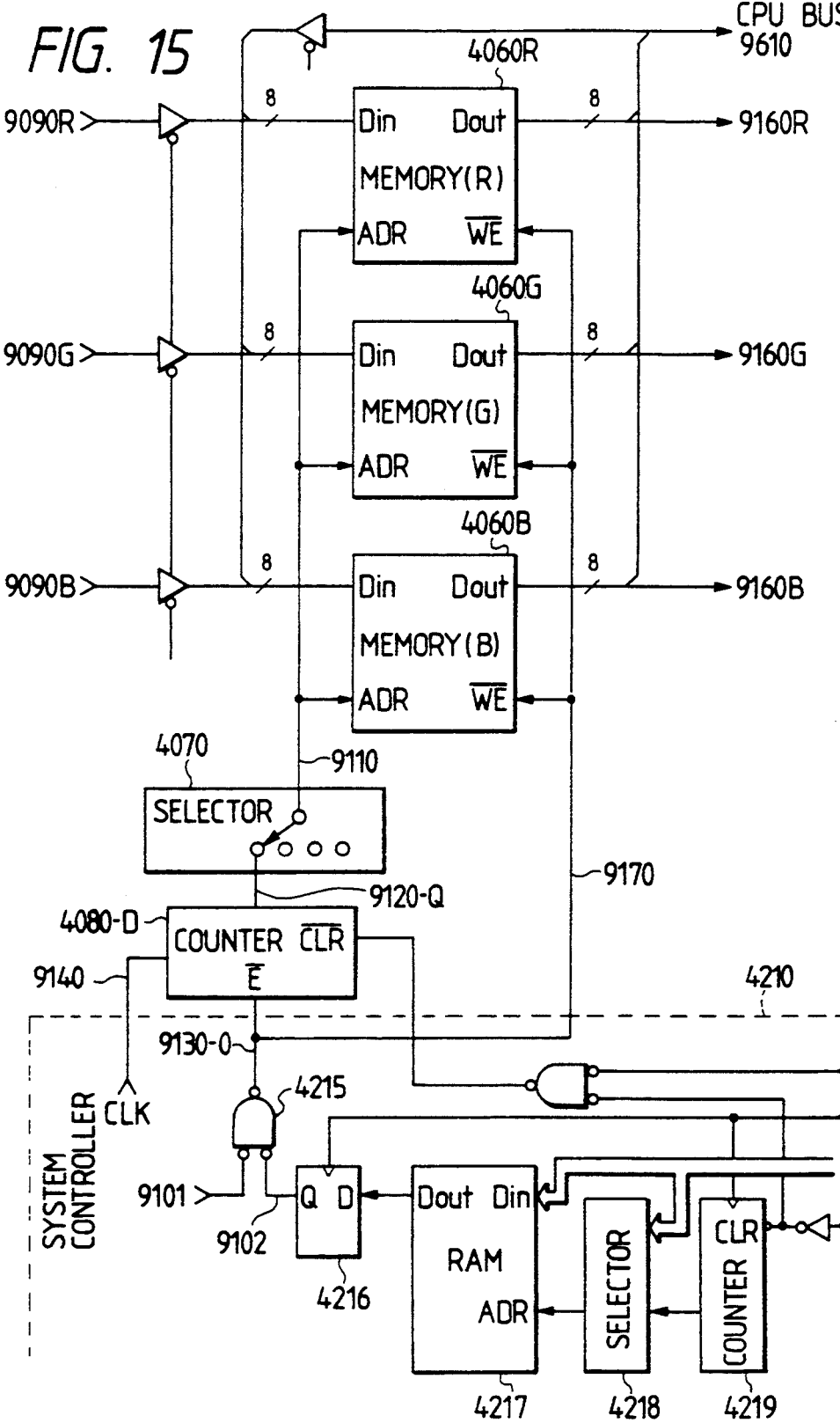
FIG. 15 is a detailed diagram of a construction with respect to the system controller unit and image memory in the image memory apparatus in the embodiment.

In the RAM 4217 of FIG. 15, "1" is written into the area of addresses 0 to 999, "0" and "1" are alternately written into the area of addresses 1000 to 5095, and "1" is written in the area from addresses 5096 to 6720.

Prior to storing the readout region shown in FIG. 8, the input of the selector 4213 of FIG. 12 which is connected to the counter 4214 is selected, while the input of the selector 4217 of FIG. 15 which is connected to the counter 4217 is selected.

The counter 4212 is cleared by the $\overline{\text{HSYNC}}$ signal 9452 and counts up in response to the CLK signal 9453. The output of the counter 4212 is latched by the flip-flop 4211, and is then input over the signal line 9100 to the $\overline{\text{WE}}$ terminal of each of the FIFO memories 4050R, 4050G and 4050B.

FIG. 14 shows the waveform appearing along the signal line 9100.

When the $\overline{\text{HSYNC}}$ signal 9452 is input, information stored at address 0 in the RAM 4212 is output to the signal line 9100 of FIG. 14. When the CLK signal 9453 is input, the counter 4214 counts up and sequentially outputs the stored data.

Since "1" is output to the signal line 9100 of FIG. 14 from addresses 0 to 999 in the RAM 4212, "1" is set to the $\overline{\text{WE}}$ input of each of the FIFO memories 4050R, 4050G and 4050B shown in FIG. 12, thereby inhibiting writing to these FIFO memories. Since "1" and "0" are alternately output to the signal line 9100 from addresses 1000 to 3047 in the RAM 4212, the R, G and B image signals from the color reader 1 are sequentially written into the respective FIFO memories 4050R, 4050G and 4050B. From the addresses following address 3047, "1" is output to the signal line 9100, thereby inhibiting writing to the FIFO memories 4050R, 4050G and 4050B.

As described above, the image information from addresses 1000 to 3047, i.e., the signals 9420R, 9420G and 9420B of FIG. 14 are sequentially written into the respective FIFO memories 4050R, 4050G and 4050B. In synchronization with the next application of the $\overline{\text{HSYNC}}$ signal 9452, the FIFO memories 4050R, 4050G and 4050B output their respective stored image signals in the form of continuous information (as shown at B' in FIG. 14).

A reduction in the main-scan direction is achieved by controlling the $\overline{\text{WE}}$ signals of the FIFO memories 4050R, 4050G and 4050B. In this embodiment, a 50% reduction is effected.

The following is a description of a reduction in the sub-scan direction.

The output signals 9090R, 9090G and 9090B of the FIFO memories 4050R, 4050G and 4050B are respectively input to the memories 4060R, 4060G and 4060B through corresponding tri-state butters.

The counter 4219 shown in FIG. 15 is cleared by the ITOP signal 551 and counts up in synchronization with the $\overline{\text{HSYNC}}$ signal 9452. The output of the counter 4219 is input to addresses of the RAM 4217 through the selector 4218.

The output of the RAM 4217 is latched by the flip-flop 4216, and is then supplied through an AND gate 4215 to both the $\overline{\text{WE}}$ inputs of the respective memories 4060R, 4060G and 4060B and the $\overline{\text{E}}$ input of the counter 4080-D.

As described above, "1" is stored in the RAM 4217 from address 0 to address 999 and from address 5096 to address 6720, and "1" and "0" are alternately stored in the RAM 4217 from address 1000 to address 5095.

Accordingly, although the output signals 9090R, 9090G and 9090B are continuously input to the input terminals Din of the corresponding memories 4060R, 4060G and 4060B, the $\overline{\text{WE}}$ inputs of the memories 4060R, 4060G and 4060B are controlled by the output signal 9170 from the RAM 4217 so that no line along addresses 0 to 999 in the sub-scan direction is stored in the memory 4060R, 4060G or 4060B. Every other line along addresses 1000 to 5095 is stored in the memories 4060R, 4060G and 4060B, thereby effecting a 50% reduction. This 50% reduction is explained below with reference to FIG. 16.

The image-information signals 9090R, 9090G and 9090B, each of which consists of an array of data D0 to D3 as shown in FIG. 16, are input to the respective memories 4060R, 4060G and 4060B. In the meantime, the output, 9102 from the RAM 4217 alternates between "1" and "0" in every other line and, therefore, the data D0 and D2 are stored in each of the memories, but neither data D1 nor data D3 are stored in the same.

With respect to the lines along the addresses following 5095, "1" is output from the RAM 4217 so that no image information 9090R, 9090G or 9090B is stored in the memory 4060R, 4060G or 4060B.

As described above, the size of the region specified on the digitizer 16 is compared with the memory capacity of the memory and, if the former is larger than the latter, the required reduction ratio is found out. On the basis of this reduction ratio, data is set into the RAMs 4212 and 4217 so as to provide the same reduction ratio in the X and Y directions.

In accordance with the data output from the RAMs 4212 and 4217 thus set, the $\overline{WE}$ terminals of the FIFO memories 4050R, 4050G and 4050B are controlled with respect to a reduction ratio in the main-scan direction, while the $\overline{WE}$ terminals of the memories 4060R, 4060G and 4060B are controlled with respect to a reduction ratio in the sub-scan direction, whereby the input image data can be stored in the memories 4060R, 4060G and 4060B with the aspect ratio of the original input image preserved.

By the control mentioned above, an arbitrary variable magnifying process can be executed by the easy control in only the image memory apparatus 3 with the aspect ratio of the input image held. The reading image can be effectively recognized. At the same time, the using efficiency of the memory capacity can be set to the maximum value.

Reading Process from the Image Memory Apparatus

The process to read out the image data from the memories 4060R, 4060G, and 4060B of the image memory apparatus 3 described above will now be explained.

In the case of forming an image by the color printer 2 on the basis of the image outputs from the memories, instructions, inputs, and the like are mainly executed by the digitizer 6 shown in FIG. 7 mentioned above.

In FIG. 7, reference numeral 428 denotes entry key to form an image of the image data from the memories 4060R, 4060G, and 4060B by the color printer 2 in accordance with the size of a recording paper. Reference numeral 429 indicates an entry key to form an image at the position designated by the pointing pen 421 and coordinates detecting plate 420 of the digitizer 16.

An embodiment to form an image in accordance with the size of the recording paper will be first described. An embodiment to form an image in the area designated by the digitizer will then be described.

Image Forming Process Corresponding to the Size of the Recording Paper

In the embodiment, as shown in FIG. 1, the color printer 2 has two cassette trays 735 and 736 and two kinds of recording papers are set. In the embodiment, the recording papers of the A4 size are set in the upper cassette tray 735 and the recording papers of the A3 size are set in the lower cassette tray 736. The recording papers are selected and input by operating a liquid crystal touch panel of the operation panel 20. The case of forming a plurality of images onto the recording paper of the A4 size will be described hereinbelow.

Prior to forming an image, by inputting the read image data from the color reader 1 to the image memory apparatus 3, a total sixteen image data comprising "image 0" to "image 15" are first stored from the color reader 1 into the image memories 4060R, 4060G, and 4060B, which will be explained hereinlater, as shown in, for instance, FIG. 17, respectively.

Figure 18:
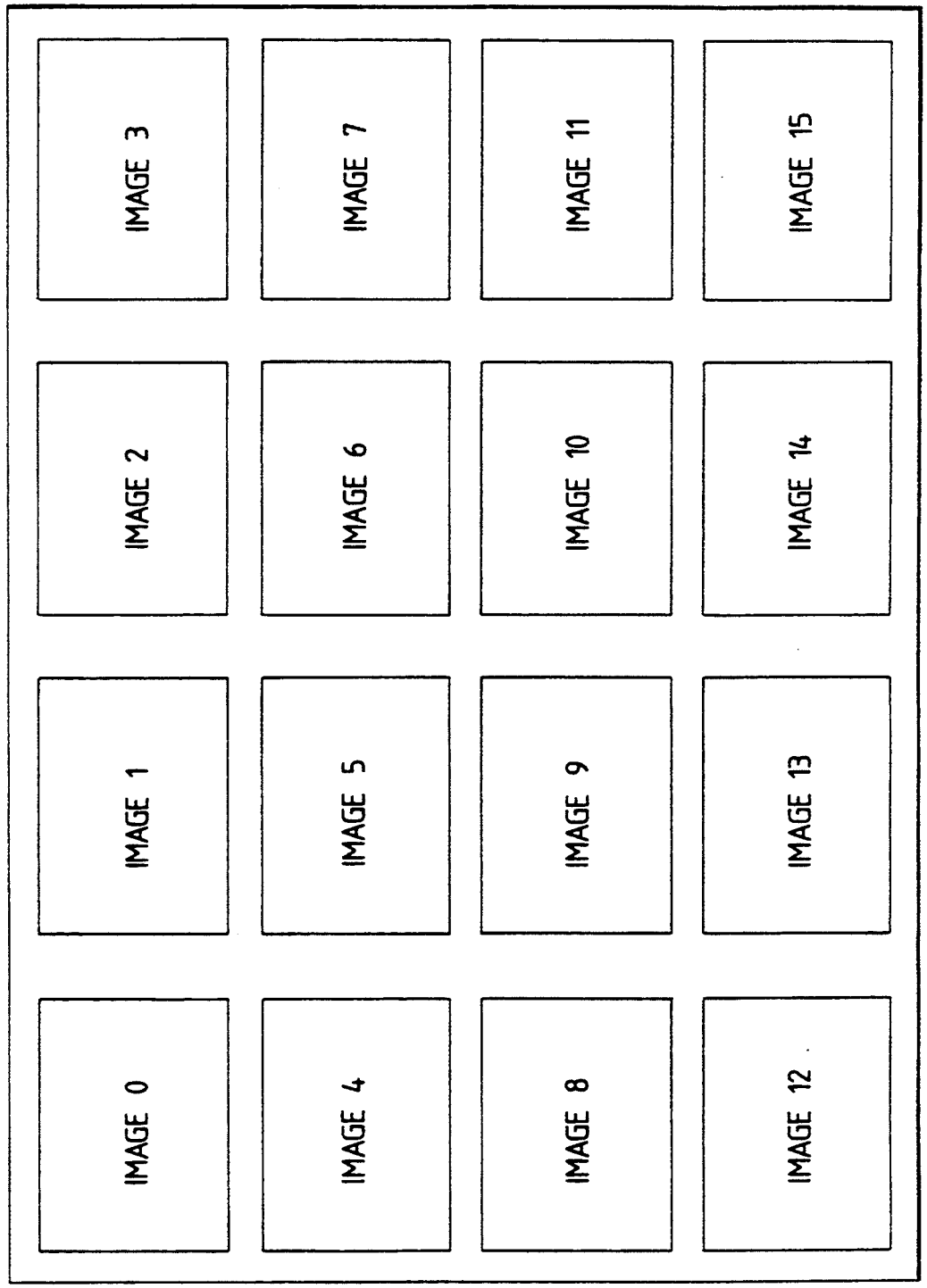
FIG. 18 is a layout diagram of the image formation in the embodiment.

Next, the entry key 428 of the digitizer 16 is pressed. Thus, the CPU (not shown) detects the key input and the image forming position is automatically set to the recording paper of the A4 size. In the case of forming sixteen images shown in FIG. 17, for instance, the image forming positions are set as shown in FIG. 18.

The details of the above image forming processes in the embodiment will now be described hereinbelow with reference to a block diagram of FIG. 10 and a timing chart of FIG. 19.

An ITOP signal 511 which is sent from the color printer 2 shown in FIG. 2 to the color reader 1 via the printer interface 56 is input to the video interface 101 in the video processing unit 12 and is transmitted to the image memory apparatus 3. The image memory apparatus 3 starts the image forming process by the ITOP signal 551. Each image data which was sent to the image memory apparatus 3 is formed as an image under the control of the system controller 4210 shown in FIGS. 10A and 10B in the image memory apparatus 3.

Figure 10A:
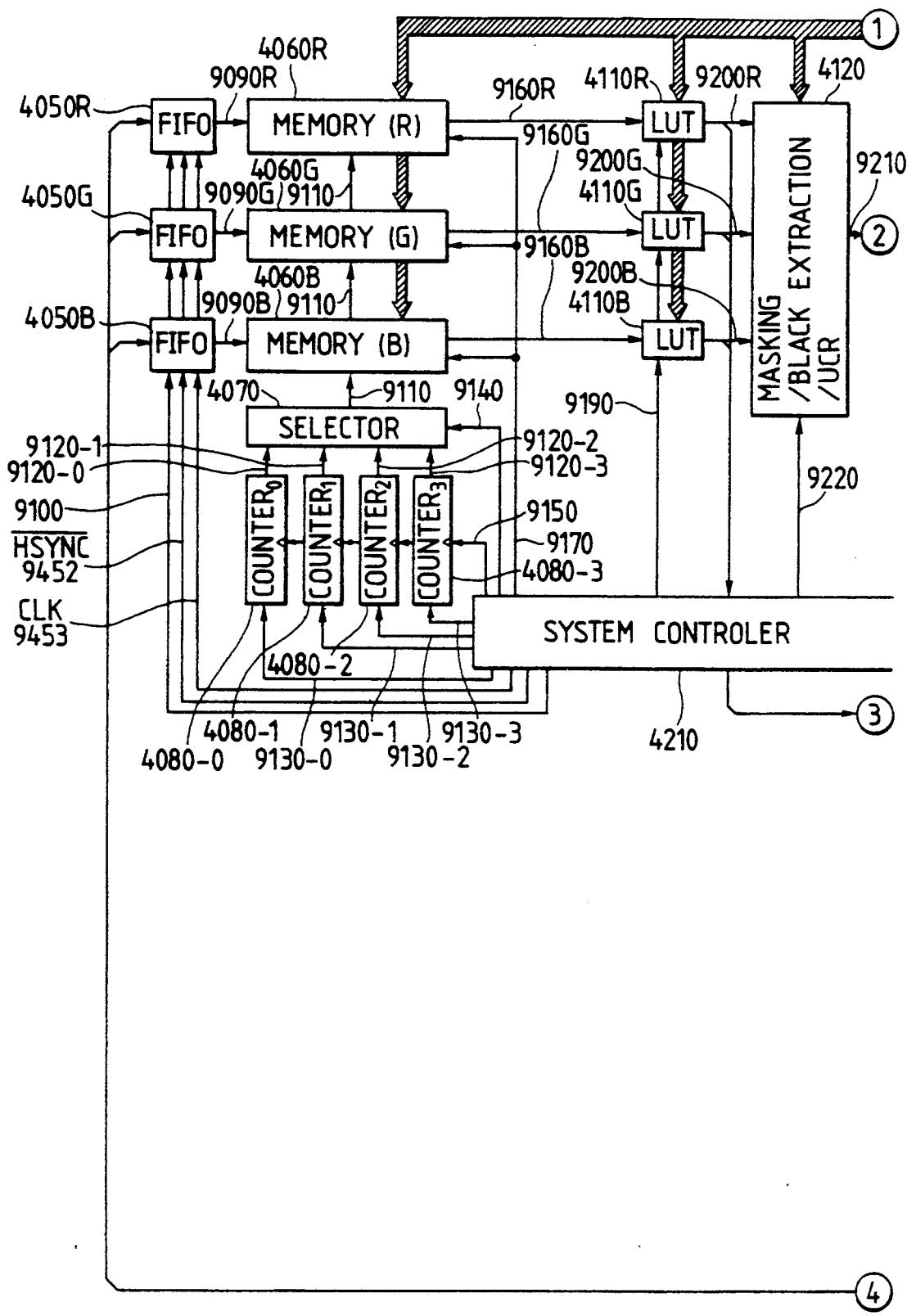
FIGS. 10A and 10B are detailed block diagrams of an image memory apparatus in the embodiment.
Figure 10B:
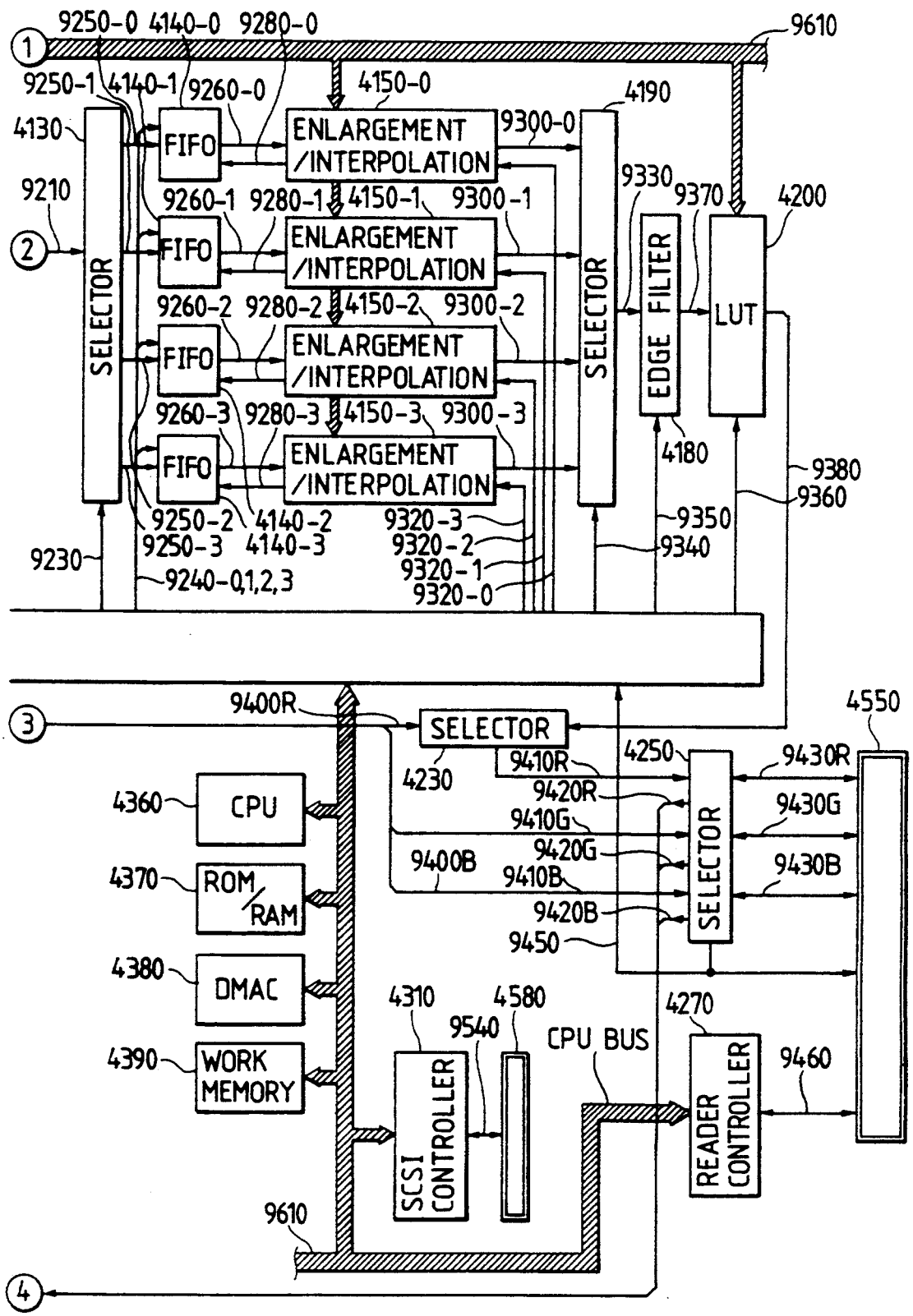

In FIGS. 10A and 10B, the output of the counter 0 (4080-0) is selected by a selector 4070 and the memories 4060R, 4060G, and 4060B are accessed to read by a memory address line 9110. The image data stored in the memories 4060R, 4060G, and 4060B are read out by the accessing operations. Read image signals 9160R, 9160G, and 9160B from the memories are sent to look-up tables (LUT) 4110R, 4110G, and 4110B, by which logarithm conversion is executed in order to match with a spectral luminous efficiency of the human eyes. Conversion data 9200R, 9200G, and 9200B from the look-up tables are input to a masking/black extraction/UCR circuit 4120. In the circuit 4120, the color correction of the color image signals of the image memory apparatus 3 is executed, and in the case of the black recording mode, the UCR/black extraction is executed.

A serial image signal 9210 from the masking/black extraction/UCR circuit 4120 is separated for every image by a selector 4130 and input to FIFO memories 4140-0 to 4140-3. The images which are sequentially arranged can be processed in parallel by the operations of the FIFO memories 4140-0 to 4140-3.

Figure 19:
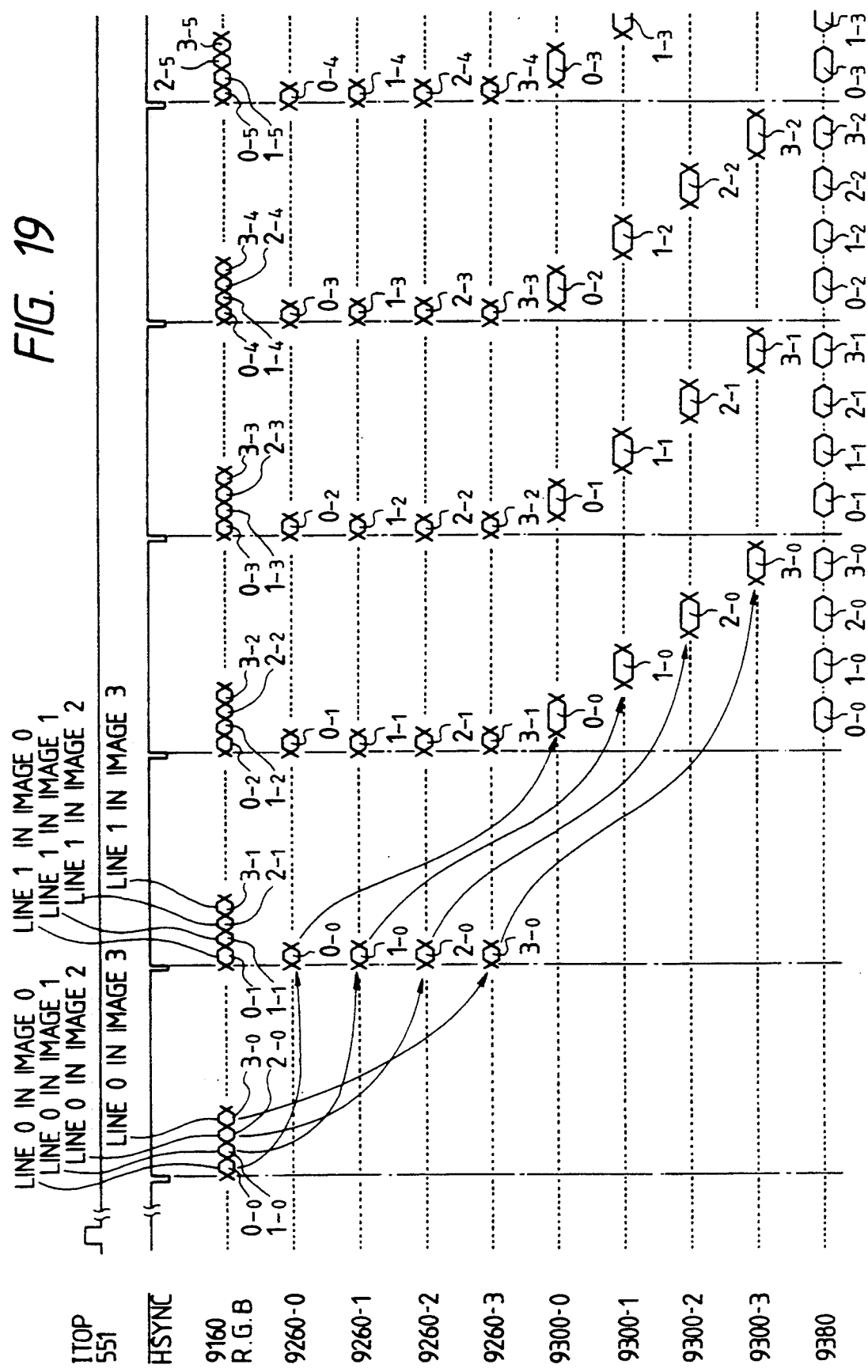
FIG. 19 is a timing chart for the image forming process according to the image formation layout of FIG. 18.

The relations between the readout image signals 9160R, 9160G, and 9160B from the memories and parallel output image data 9260-0 to 9260-3 from the FIFO memories are shown in the upper portion in FIG. 19. As shown in the diagram, all of the image data 9260-0 to 9260-3 corresponding to the readout image data of the line "0" of the "image 0" to "image 3" which are necessary to form the image of one line in the main scanning direction can be processed in parallel.

The parallel image signals 9260-0 to 9260-3 are input to enlargement/interpolation circuits 4150-0 to 4150-3 at the next stage. The circuits 4150-0 to 4150-3 are controlled by the system controller 4210 so as to obtain the layout of the images shown in FIG. 18 and enlarge and interpolate the image data as indicated by signals 9300-0 to 9300-3 shown in FIG. 19. In the embodiment, a primary interpolation method is used.

The interpolated signals 9300-0 to 9300-3 are input to a selector 4190. The image data which were processed in parallel are again transformed to the serial image data signal. An image signal 9330 which was converted into the serial image data by the selector 4190 is subjected to an edge emphasizing and smoothing processes by an edge filter circuit 4180. The processed signal passes through an LUT 4200 and is input to a selector 4230. The selector 4230 selects a group of outputs of M (magenta) C (cyan), Y (yellow), and BK (black) or a group of outputs of R (red), G (green), and B (blue). In the embodiment, since the M, C, Y, and BK outputs are selected and the signals are area sequentially output, the effective image data are output from only signal lines 9410R, 9410G, and 9410B. The selected image data are input to the selector 4250 and the image data on the signal lines 9410R, 9410G, and 9410B are selected by the selectors 4251R, 4251G, and 4251B shown in the block diagram of FIG. 11 and are output as the image data on the signal lines 9430R, 9430G, and 9430B to the connector 4550.

After the formation of all of the image data of "image 0" to "image 3" is finished, the images are then sequentially formed in accordance with the order of "image 4" to "image 7", "image 8" to "image 11", and "image 12" to "image 15", so that sixteen images of "image 0" to "image 15" shown in FIG. 18 are formed.

Image Formation by the Layout at Arbitrary Positions

Although the explanation has been provided with respect to the control example in which the images are automatically developed so as to be image formed and the images are formed as shown in FIG. 18, the invention is not limited to such an embodiment but an image can be also formed by developing an arbitrary image at an arbitrary position.

Figure 21:
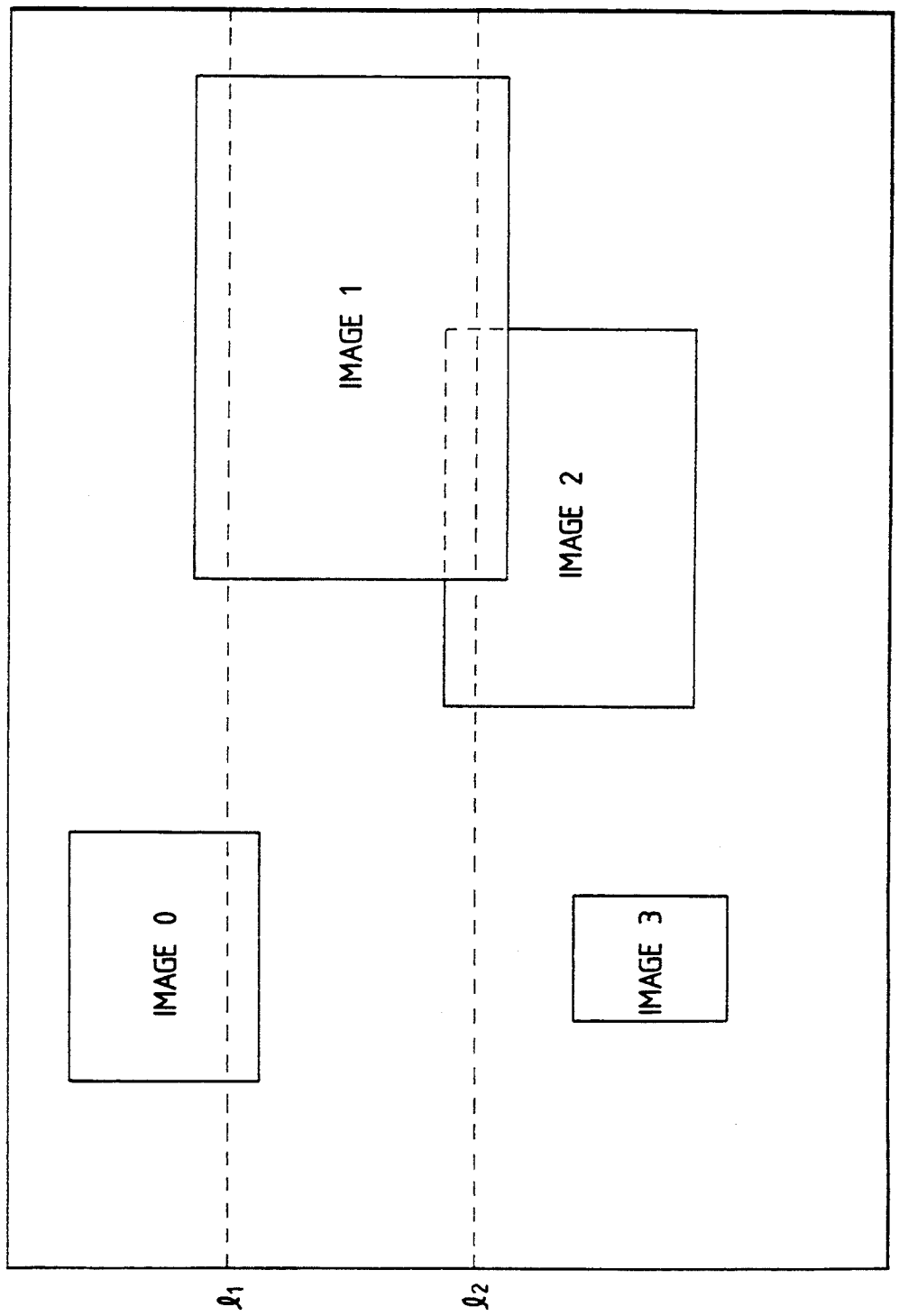
FIG. 21 is a diagram showing a layout state in which the image information shown in FIG. 20 is arbitrarily arranged.

As an example in such a case, an explanation will now be provided hereinbelow with respect to the case where "image 0" to "image 3" shown in FIG. 21 are developed as shown in the diagram and the images are formed.

First, by the control similar to the image input control into the memories mentioned above, four image data which were read out by the color reader 1 are stored into the image memories 4060R, 4060G, and 4060B as shown in FIG. 20. Next, by pressing the entry key 429 of the digitizer 16, the system is set into the mode to wait for the input of the designated position to form the read image from the digitizer 16.

By operating the pointing pen 421, a desired developing position is designated and input by the coordinates detecting plate 420. For instance, the developing area is designated and input as shown in FIG. 21.

The image forming processes in the above case will now be described hereinbelow with reference to the block constructional diagrams of FIGS. 10A and 10B and the timing charts shown in FIGS. 22 and 23.

Figure 22:
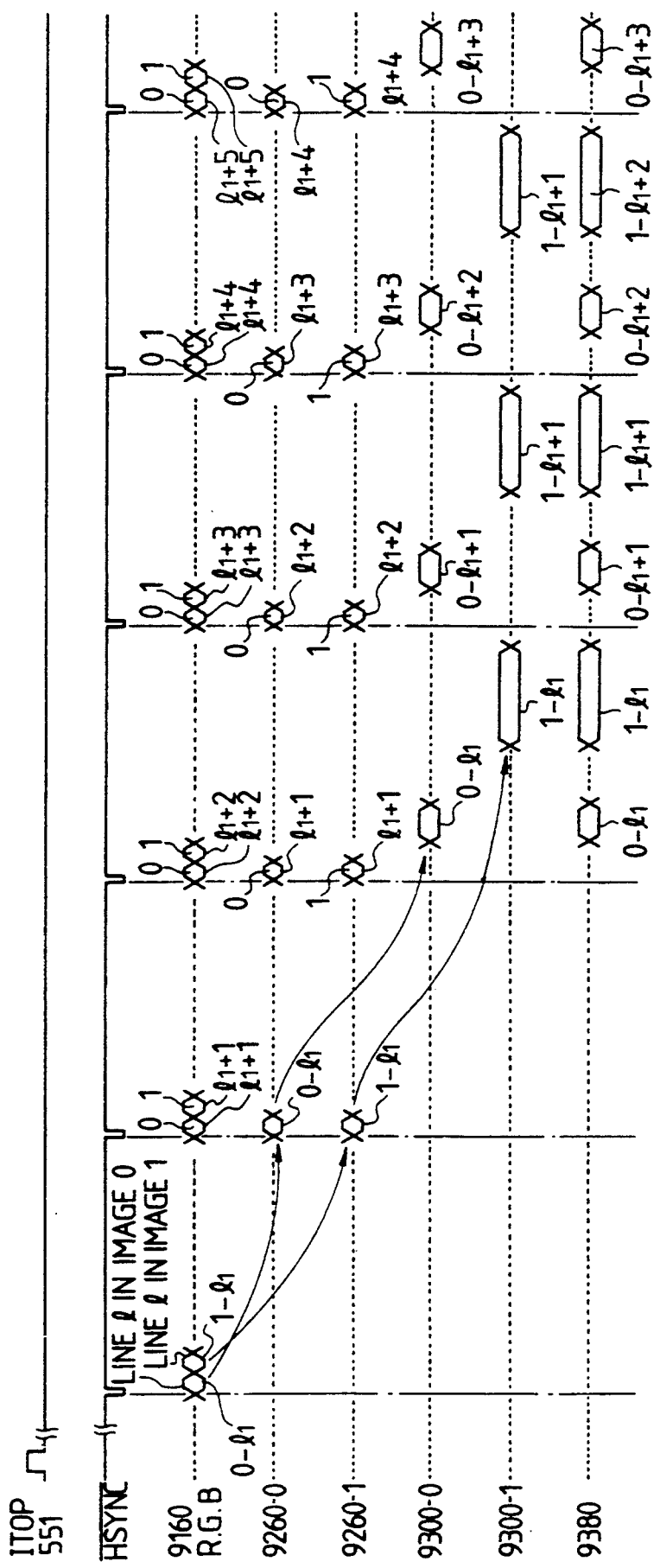
FIG. 22 is a timing chart when the image of line "$l_1$" shown in FIG. 21 is formed.
Figure 23:
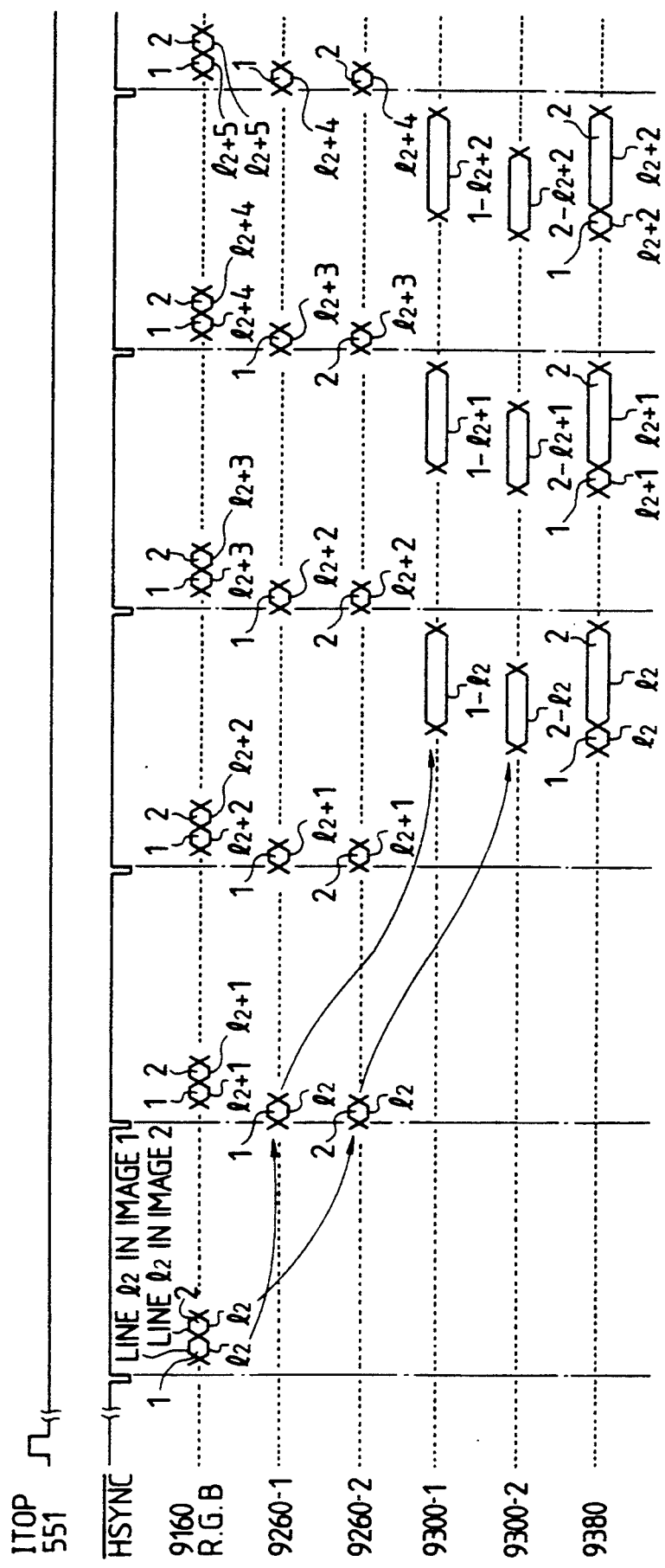
FIG. 23 is a timing chart when the image of line "$l_2$" in FIG. 21 is formed.

FIG. 22 is a timing chart when the image of line "$l_1$" shown in FIG. 21 is formed. FIG. 23 is a timing chart when the image of line "$l_2$" in FIG. 21 is formed.

The ITOP signal 551 is output from the printer 2 in a manner similar to the above and the system controller 4210 starts the operation synchronously with the ITOP signal 551.

In the layout of the images shown in FIG. 21, "image 3" is obtained by rotating the image from the color reader 1 by 90°.

The image rotating process in this case is executed by the following procedure. First, the image data are transferred from the memories 4060R, 4060G, and 4060B to a work memory 4390 by a DMAC (direct memory access controller) 4380 shown in FIG. 1. Next, the well-known image rotating process is executed in the work memory 4390 by the CPU 4360. Thereafter, the image data are transferred from the work memory 4390 to the memories 4060R, 4060G, and 4060B by the DMAC 4380, thereby executing the image rotating process.

The position data of the images which were arranged by the digitizer 16 and which were designated and input are sent to the image memory apparatus 3 through the video processing unit 12 shown in FIG. 1. When the system controller 4210 receives the developing position information corresponding to the images, the system controller generates operation permission signals 9320-0 to 9320-3 of the enlargement/interpolation circuits 4150-0 to 4150-3 corresponding to the images.

In the layout of arbitrary positions in the embodiment, for instance, the counter 0 (4080-0) operates in correspondence to the image 0; a counter 1 (4080-1) operates in correspondence to the image 1; a counter 2 (4080-2) operates in correspondence to the image 2; and a counter 3 (4080-3) operates in correspondence to the image 3, respectively.

The control upon formation of the image of line "$l_1$" shown in FIG. 21 will now be described with reference to FIG. 22.

When "image 0" is read out of the image memories 4060R, 4060G, and 4060B, the image data from address "0" to address "0.5M" (the memory area of "image 0" shown in FIG. 20) is read out by the counter 0 (4080-0). The outputs of the counters 4080-0 to 4080-3 are switched by the selector 4070.

In a manner similar to the above, when "image 1" is read out, the image data from address "0.5M" to address "1M" (the memory area of "image 1" shown in FIG. 20) is read out by the counter 1 (4080-1). The reading timings are shown by 9160R, 9160G, and 9160B in FIG. 22.

The counters 4080-2 and 4080-3 are not made operative by counter enable signals 9130-2 and 9130-3 from the system controller 4210.

The data of "image 0" and "image 1" are sent to the masking/black extraction/UCR circuit 4120 via the look-up tables 4110R, 4110G, and 4110B and are transformed into the area sequential color signal 9210. The area sequential color signal 9210 is separated from the parallel signals by the selector 4130 for every pixel and sent to the FIFO memories 4140-0 and 4140-1. When the operation permission signals 9320-0 and 9320-1 from the system controller 4210 to the enlargement/interpolation circuits 4150-0 and 4150-1 are set to the enable state, the circuits 4150-0 and 4150-1 set FIFO readout signals 9280-0 and 9280-1 to the enable state, thereby starting the reading control.

The FIFO memories 4140-0 and 4140-1 start transferring the image data to the enlargement/interpolation circuits 4150-0 and 4150-1 by the signals 9280-0 and 9280-1. The layout and interpolation according to the area which has already been designated by the digitizer 16 are executed by the enlargement/interpolation circuits 4150-0 and 4150-1. The timings at this time are shown by 9300-0 and 9300-1 in FIG. 22.

The data of "image 0" and "image 1" which were subjected to the layout and interpolating processes are selected by the selector 4190 and, thereafter, the selected image data is input to the LUT 4200 via the edge filter circuit 4180. Since the subsequent processes until the connector 4550 are similar to the processes mentioned above, their descriptions are omitted.

The timing of the line "$l_2$" shown in FIG. 21 will now be described with reference to FIG. 23.

The processes from the image memories 4060R, 4060G, and 4060B to the enlargement/interpolation circuits 4150-1 and 4150-2 are substantially the same as those mentioned above.

However, since both image data of "image 1" and "image 2" are output on the line "l₂", the counter 1 (4080-1), counter 2 (4080-2), FIFO memories 4140-1 and 4140-2, and enlargement/interpolation circuits 4150-1 and 4150-2 operate. The above operations are controlled by control signals from the system controller 4210.

As shown in FIG. 21, in the line "l₂", "image 1" and "image 2" overlap. Either one of the mode to form either one of those images and the mode to form both of the images in the overlap portion can be selected by a control signal 9340 from the system controller 4210.

The practical control is similar to that in the case mentioned above.

The signal from the connector 4550 is connected to the color reader 1 by a cable. Therefore, the video interface 101 of the color reader 1 selects the image signal 105 from the image memory apparatus 3 and outputs to the printer interface 56 via the signal line path shown in FIG. 5.

Although the case of M, C, Y, and BK has been described above, by controlling the selector 4230 in FIG. 10 for the image data outputs from image memory apparatus 3, the R, G, and B image data can be also output in parallel. At this time, the video interface 101 of the color reader 1 transfers the image data by the signal line path shown in FIG. 4.

Figure 24:
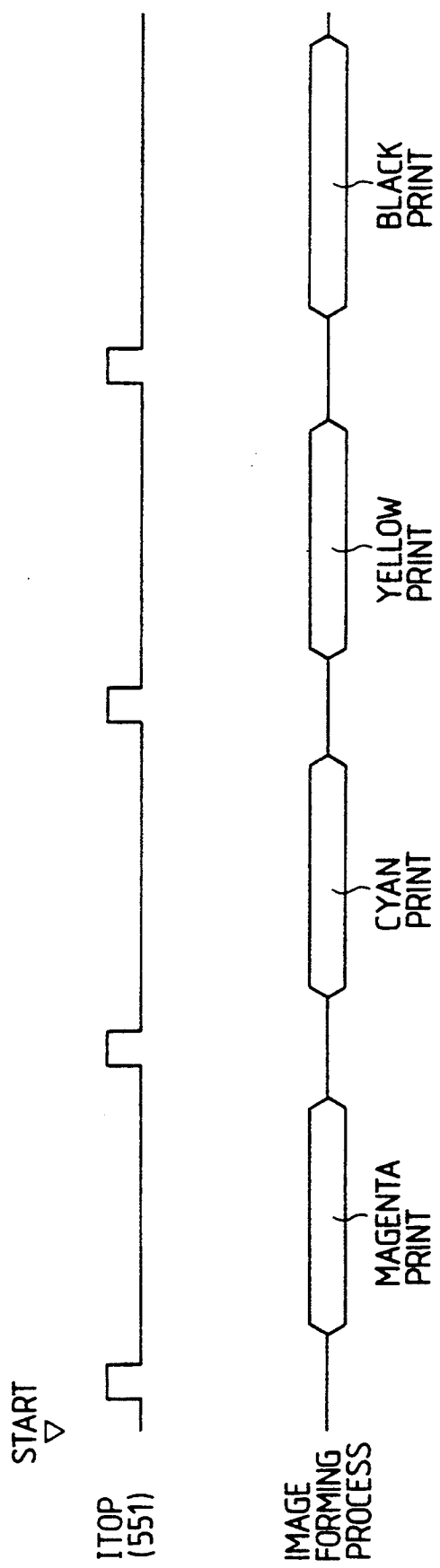
FIG. 24 is a timing chart for the image forming process in the embodiment.

The transferring processes of the image data from the image memory apparatus 3 to the color printer 2 in the image formation in the above embodiment will now be described in detail hereinbelow with reference to a timing chart of FIG. 24.

As mentioned above, by pressing the start button of the operation panel 20, the printer 2 starts operating and begins the conveyance of the recording paper. When the recording paper has reached the front edge of the image forming unit, the ITOP signal 551 is output. The ITOP signal 551 is sent to the image memory apparatus 3 through the color reader 1. On the basis of the set conditions, the image memory apparatus 3 reads out the image data stored in the image memories 4060R, 4060G, and 4060B and executes the above-mentioned processes of the layout, enlargement/interpolation, and the like and, thereafter, the processed image data are sent to the video processing unit 12 of the color reader 1. The video interface 101 of the video processing unit 12 changes the processing method in the video interface 101 in conformity with the kind (R, G, B)/(M, C, Y, BK) of the transmitted data.

In the embodiment, since the area sequential image signal of M, C, Y, and BK is output, by repeating the above operations four times in accordance with the order of M, C, Y, and BK, the images are formed.

Printer Unit

The construction of the color printer 2 for printing out the image signals which were processed by the video processing unit 12 as mentioned above will be finally explained with reference to FIG. 1.

In the construction of the printer 2 shown in FIG. 1, reference numeral 711 denotes a scanner having: a laser output unit to convert the image signals from the color reader 1 into the optical signals; a polygon mirror 712 of a polyhedron (for instance, an octahedron); a motor (not shown) to rotate the polygon mirror 712; an f/θ lens (image forming lens) 713; and the like. Reference numeral 714 denotes a reflective mirror to change the optical path of a laser beam from the scanner 711 which is indicated by an alternate long and short dash line in the diagram. Reference numeral 715 denotes a photo sensitive drum.

The laser beam emitted from the laser output unit is reflected by the polygon mirror 712 and scans like a line (raster scan) on the surface of the photo sensitive drum 715 via the f/θ lens 713 and reflective mirror 714, thereby forming a latent image corresponding to the original image.

Reference numeral 717 denotes a primary charging device; 718 indicates a whole surface exposing lamp; 723 denotes a cleaner unit to collect the remaining toner which was not copy transferred; and 724 denotes a pre-transfer charging device. The above components are arranged around the photo sensitive drum 715. Reference numeral 726 denotes a developing unit to develop the electrostatic latent image formed on the surface of the drum 715 by the laser exposure. Reference numerals 731Y (for yellow), 731M (for magenta), 731C (for cyan), and 731BK (for black) denote developing sleeves which come into contact with the photo sensitive drum 715 and directly execute the development. Reference numerals 730Y, 730M, 730C and 730BK denote toner hoppers to hold spare toners and 732 indicates a screw to transfer the developing agents. The developing unit 726 is constructed by the sleeves 731Y to 731BK, toner hoppers 730Y to 730BK, and screw 732. These components are arranged around a rotational axis P of the developing unit 726.

For instance, when a yellow toner image is formed, the yellow toner development is executed at the position shown in the diagram. When a magenta toner image is formed, the developing unit 726 is rotated around the axis P as a rotational center in the diagram and the developing sleeve 731M in the magenta developer is set at the position where the sleeve 731M comes into contact with the photo sensitive drum 715. In the case of forming a cyan or black image as well, the developing unit 726 is rotated around the axis P as a center in the diagram and the development is executed in a manner similar to the above.

Reference numeral 716 denotes a copy transfer drum to copy transfer the toner image formed on the drum 715 onto the recording paper; 719 indicates an actuator plate to detect the moving position of the copy transfer drum 716; and 720 denotes a position sensor to detect that the copy transfer drum 716 has moved to the home position by approaching the actuator plate 719. Reference numeral 725 denotes a copy transfer drum cleaner; 727 represents a paper pressing roller; 728 denotes a discharging device; and 729 denotes a copy transfer charging device. The above components 719, 720, 725, 727, 729 are arranged around the copy transfer drum 716.

On the other hand, reference numerals 735 and 736 denote the paper feed cassettes to collect the papers (cut sheets); 737 and 738 indicate paper feed rollers to feed the paper from the cassettes 735 and 736; and 739, 740, and 741 denote timing rollers to match the timings for the paper feed and conveyance. The paper which was fed and conveyed via the above components is led to a paper guide 749 and its front edge is supported by a glipper, which will be explained hereinlater, and the paper is wrapped around the copy transfer drum 716. Then, the processing step advances to the image forming step.

Reference numeral 550 denotes a drum rotating motor to synchronously rotate the photo sensitive drum 715 and copy transfer drum 716. Reference numeral 750 indicates a peeling claw to remove the paper from the copy transfer drum 716 after completion of the image forming step; 742 denotes a conveying belt to convey the removed paper; and 743 denotes an image fixing portion to fix the paper conveyed by the conveying belt 742. In the image fixing portion 743, the rotational force of a motor 747 attached to a motor attaching portion 748 is transferred to a pair of thermal pressure rollers 744 and 745 via a transfer gear 746, thereby fixing the image on the paper which is conveyed between the thermal pressure rollers 744 and 745.

The printing process of the printer 2 having the above construction will now be described hereinbelow with reference to a timing chart of FIG. 24 also.

When the first ITOP signal 551 comes, a Y latent image is first formed on the photo sensitive drum 715 by the laser beam and developed by the 10 developing unit 731Y. Then, the developed image is copy transferred onto the paper wound around the copy transfer drum 716 and the printing process for magenta is executed. The developing unit 726 is then rotated around the axis P as a center in the diagram.

When the next ITOP signal 551 comes, an M latent image is formed on the photo sensitive drum by the laser beam and the printing process for cyan is executed by operations similar to the above. The above operations are also similarly executed with respect to C and BK latent images in response to the ITOP signals 551 which are subsequently input and the printing processes for yellow and black are performed. After completion of the image forming steps, the paper is peeled off by the peeling claw 750 and the images on the paper are fixed by the image fixing portion 743 and a series of color image printing processes are finished.

Embodiment 2

Figures 2, 26B:
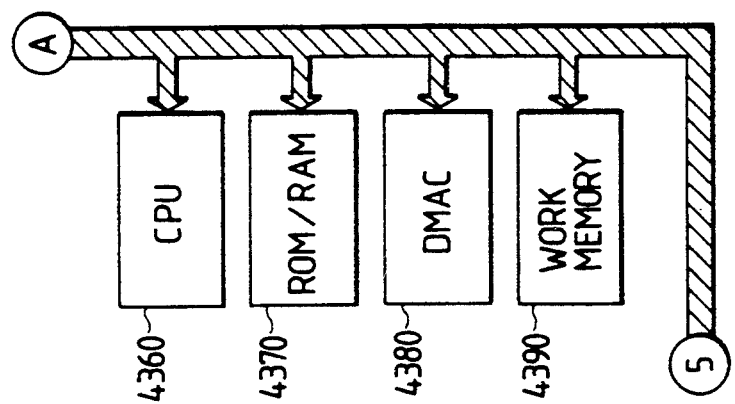
Figure 27:
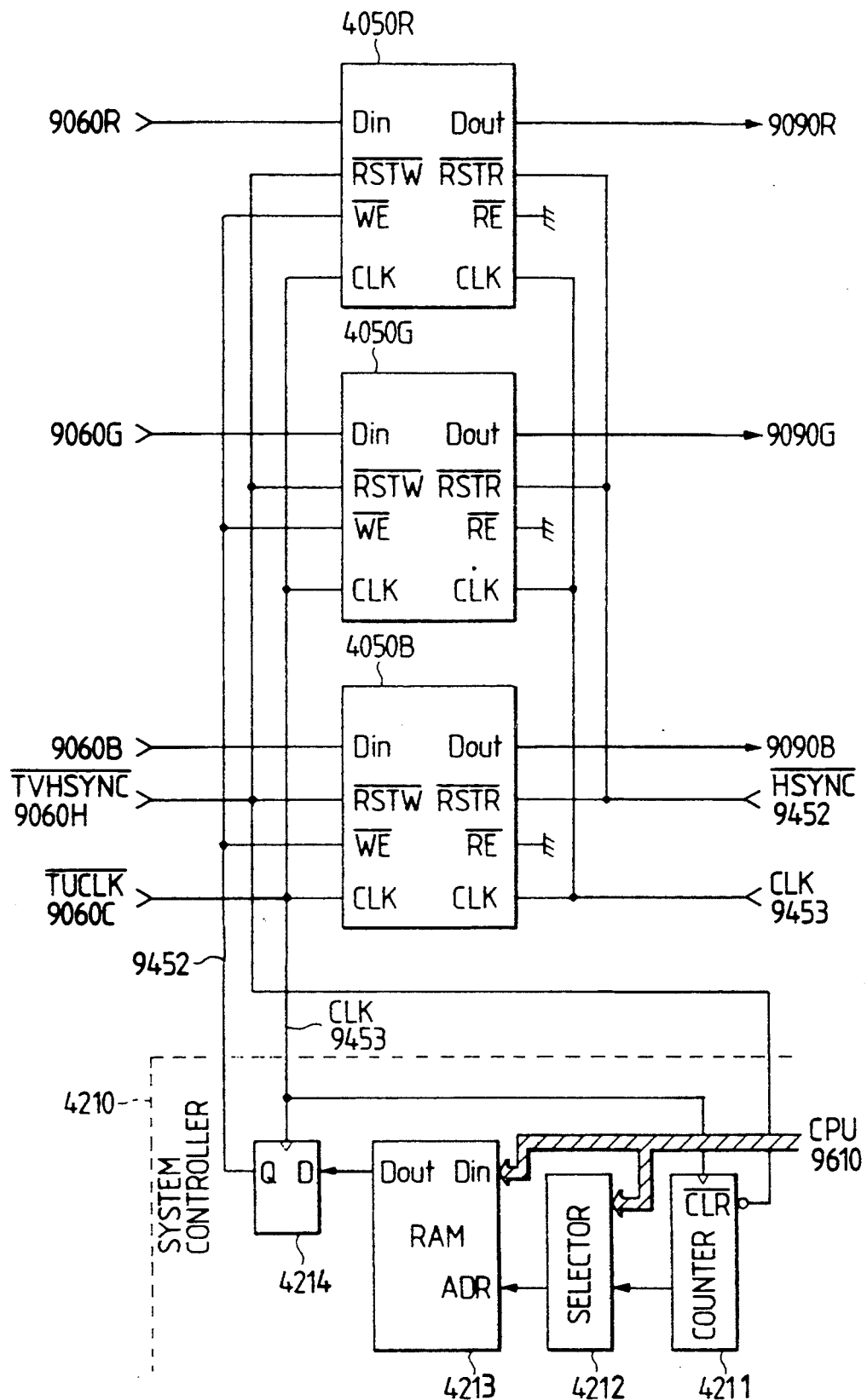
FIG. 27 is a detailed diagram of a system controller of the image memory apparatus in another embodiment.

Another embodiment according to the invention will now be described in detail hereinbelow with reference to FIGS. 25 to 27.

Figure 25:
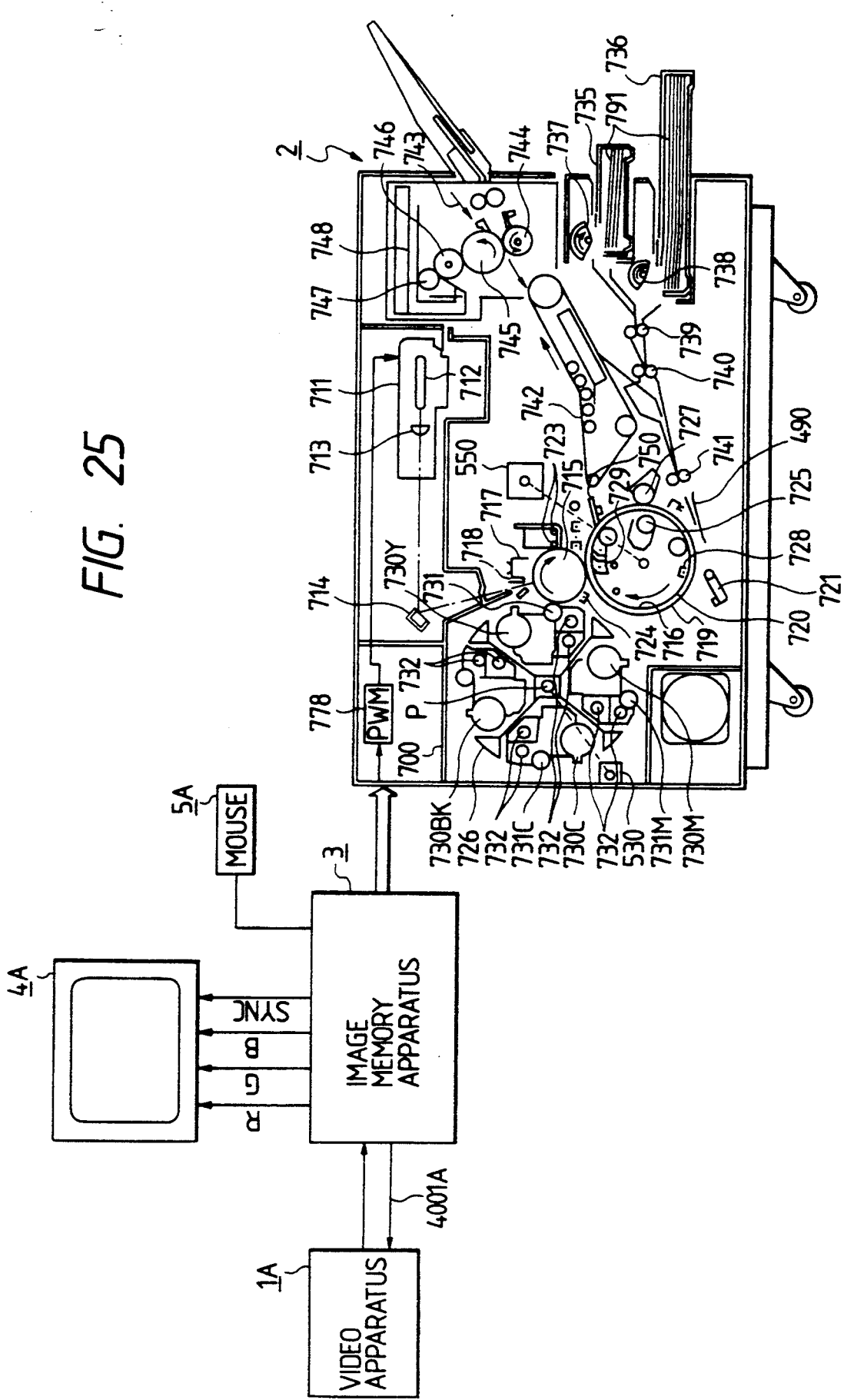
FIG. 25 is a system constructional diagram of another embodiment according to the invention.

FIG. 25 is a constructional diagram of a video image forming system in another embodiment according to the invention.

In the system of the embodiment; as shown in FIG. 25, a video image from a video apparatus 1A is stored in the image memory apparatus 3 and output to a monitor 4A and the color printer 2. The image memory apparatus 3 also executes the handling of the input image.

Latching Control of the Video Image

First, the latching control of the video image from the video apparatus 1A into the image memory apparatus 3 will be described hereinbelow will reference to block constructional diagrams of the image memory apparatus of FIGS. 26A and 26B.

In the diagrams, the parts and components similar to those shown in FIGS. 10A and 10B are designated by the same reference numerals and their detailed descriptions are omitted.

The video image from the video apparatus 1A is input in a form of an NTSC composite signal 9000 through an analog interface 4500 and is separated by a decoder 4000 into four signals comprising separator R, G, and B signals 9015R, 9015G, and 9015B and a composite SYNC signal 9015S.

The decoder 4000 also decodes a Y (luminance)/C (chrominance) signal 9010 from the analog interface 4500 in a manner similar to the above. Signals 9020R, 9020G, 9020B, and 9020S to a selector 4010 are input signals in the forms of separate R, G, and B signals and a composite SYNC signal. A switch 4530 controls the selector 4010 to select and switch either input signals 9030R to 9030S or the input signals 9015R to 9015S. When the switch 4530 is open, the signals 9030R to 9030S are selected. When the switch 4530 is closed, the signals 9015R to 9015S are selected.

Signals 9050R, 9050G, and 9050B as separate R, G, and B signals which were selected by the selector 4010 are analog-to-digital converted by A/D converters 4020R, 4020G, and 4020B.

A selected composite SYNC signal 9050S is input to a TBC/HV separation circuit 4030. A clock signal 9060C, a horizontal sync signal 9060H, and a vertical sync signal 9060V are produced from the composite SYNC signal 9050S by the TBC/HV separation circuit 4030. The sync signals are supplied to the system controller 4210. Reference numeral 4020A denotes an operation unit interface for detecting states of a print key and a freeze key which are included in an operation unit 4030A and for inputting detection signals to the CPU 4360.

The TVCLK signal 9060C which is output from the TBC/HV separation circuit 4030 in the embodiment is a clock signal of 12.25 MHz, the $\overline{\text{TVHSYNC}}$ signal 9060H is a signal having a pulse width 63.5 μsec, and the $\overline{\text{TVVSYNC}}$ signal 9060V is a signal having a pulse width 16.7 msec.

The FIFO memories 4050R, 4050G, and 4050B are reset by the $\overline{\text{TVHSYNC}}$ signal 9060H and write data 9060R, 9060G, and 9060B from address "0" synchronously with the TVCLK signal 9060C. The data writing operations to the FIFO memories 4050R, 4050G, and 4050B are executed when a $\overline{\text{WE}}$ signal 9452 which is output from the system controller 4210 is set to the high level. Reference numeral 4000-A denotes an interface circuit with the video apparatus. The interface circuit 4000-A interfaces with the video apparatus 1A through a terminal 4001-A.

The control of the writing operations to the FIFO memories 4050R, 4050G, and 4050B by the $\overline{\text{WE}}$ signal 9452 will now be described in detail hereinbelow with reference to a block diagram of FIG. 27.

In the embodiment, the video apparatus 1A is an SV recorder based on the NTSC standard. Therefore, when the video image from the video apparatus 1A is digitized, the capacity of the picture plane comprises 640 pixels (H)×480 pixels (V). Therefore, the CPU 4360 of the image memory apparatus 3 first writes the "0" data of the number corresponding to 640 pixels in the main scanning direction into an RAM 4213. Next, an input of a selector 4212 is switched to the side of a counter 4211. In a manner similar to the case of the above embodiment 1, the data from the RAM 4213 is used as $\overline{\text{WE}}$ signal control data of the FIFO memories 4050R, 4050G, and 4050B. Now, by writing the "0" data into the RAM 4213, the data of the amount of one main scanning operation of the video images 9060R, 9060G, and 9060B as output signals of the A/D converters 4020R, 4020G, and 4020B are stored into the FIFO memories 4050R, 4050G, and 4050B at the real scale.

On the other hand, in the case where the input video images are reduced and stored into the FIFO memories 4050R, 4050G, and 4050B, by setting the data in the RAM 4213 in the image effective area to "1" in accordance with the reduction ratio, the image data can be reduced in the main scanning direction.

Data transfer from the FIFO memories 4050R, 4050G, and 4050B to the image memories 4060R, 4060G, and 4060B is similar to that in the data writing control from the color reader 1 to the image memories 4060R, 4060G, and 4060B in the above embodiment 1.

The image data can be also reduced in the sub-scanning direction by setting the data into the RAM 4217 in FIG. 15 in a manner similar to the above.

The video apparatus 1A in the embodiment is based on the NTSC standard and has been described with respect to the case, as an example, where the aspect ratio of the digital image in the main scanning direction and sub-scanning direction is set to 4:3. However, by changing the content in the RAM 4213 in FIG. 27 and the content in the RAM 4217 in FIG. 15, the invention can be also applied to the case of the aspect ratio of 16:9 in the HDTV standard which will be presumed as a standard of a future television system.

On the other hand, although the memory capacity in the embodiment is set to 8 Mbytes, the capacity of one picture plane of the NTSC standard is set to about 0.3 Mbytes, so that the images of 25 picture planes can be stored. The storage of the images of 25 picture planes can be also executed by setting the $\overline{\text{CLR}}$ signal 9171 shown in FIG. 15 to "1".

On the other hand, in the case of the picture plane comprising 1840 pixels (main scanning direction)×1035 pixels (sub-scanning direction) in the HDTV standard, one picture plane can be stored into the memory of 2 Mbytes by setting the $\overline{\text{CLR}}$ signal 9171 to "0".

Further, the invention can be also applied to the realization of a high band system of the video apparatus 1A. That is, the number of reading pixels in the main scanning direction can be increased by raising the frequency of the TVCLK which is output from the TBC/HV separation circuit 4030 in the embodiment.

The video image data stored in the image memories 4060R, 4060G, and 4060B are read out by the DMAC 4380 and transferred to display memories 4410R, 4410G, and 4410B and stored. The video image data stored in the display memories 4410R, 4410G, and 4410B are transmitted to D/A converters 4430R, 4430G, and 4430B through look-up tables 4420R, 4420G, and 4420B and are converted into an analog R signal 4590R, an analog G signal 4590G, and an analog B signal 4590B synchronously with an SYNC signal 9590 from a display controller 4440 and are output.

On the other hand, an SYNC signal 4590S is output from the display controller 4440 synchronously with the output timings of the analog signals 4590R, 4590G, and 4590B. By connecting the analog R, G, and B signals 4590R, 4590G, and 4590B and the SYNC signal 4590S to the monitor 4A, the memory content of the image memory apparatus 3 can be displayed.

In the embodiment, the displayed image can be trimmed by a mouse 5A which is connected through a signal line 4570 by a mouse interface 4300.

The CPU 4360 can execute the trimming operation by transferring only the image data of the effective area from the display memories 4410R, 4410G, and 4410B to the image memories 4060R, 4060G, and 4060B from the area information which was designated and input by the mouse 5A by the control similar to that in the above embodiment 1.

Figure 30:
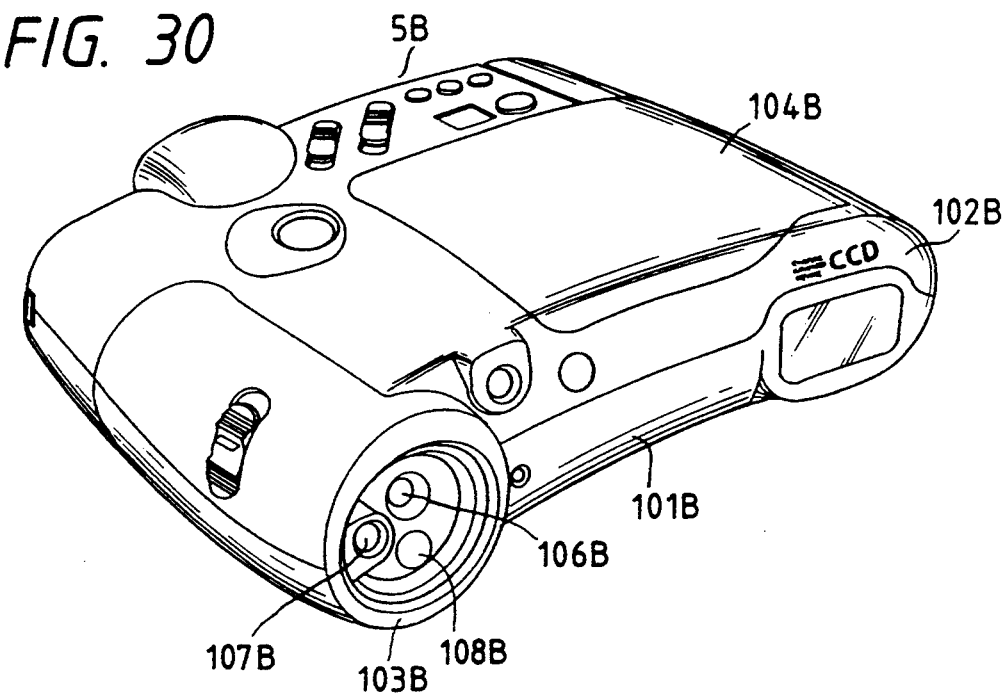
FIG. 30 is a perspective view of the apparatus in the embodiment of the invention.

On the other hand, in a manner similar to the case of the embodiment 1, the data is set into the RAMs 4213 and 4217 in correspondence to the area designation information from the mouse 5A. The image data is again input from an SV recorder (an example thereof is shown in FIG. 30) as the video apparatus 1A. Due to this, the trimmed image data can be stored into the memories 4060R, 4060G, and 4060B.

Reference numeral 4400 denotes a volume to adjust the color tone of the color image displayed on the monitor 4A. The CPU 4360 reads a resistance value (set value) of the volume 4400 and sets correction data for adjustment of the outputs into the LUTs 4420R, 4420G, and 4420B from the set value. On the other hand, when recording the image data by the color printer 2, in order to match the recording color with the display color on the monitor 4A, the correction data for adjustment of the LUTs 4200 is changed in conformity with the set value of the volume 4400.

Next, in the case where a plurality of images have been stored in the image memories 4060R, 4060G, and 4060B, the images can be also set to an arbitrary layout by using the monitor 4A and mouse 5A when recording the images by the color printer 2.

First, the size of the recording paper is displayed on the monitor 4A and the position information of the layout of the images is input by using the mouse 5A while observing the size displayed. Due to this, the images to be recorded by the color printer 2 can be set to a desired layout.

Since the reading control of the memory image data from the image memories 4060R, 4060G, and 4060B to the color printer 2 and the recording control by the color printer 2 are similar to those in the embodiment 1 mentioned above, their descriptions are omitted.

As described above, according to the embodiment, when the amount of the input image is larger than the capacity of the image memory, the image data of only one picture plane of the input image is stored. When the amount of the input image is smaller than the capacity of the image memory, a plurality of input images which can be stored are simultaneously stored into the image memory. Thus, the image memory can be effectively used.

Figures 28, 28A:
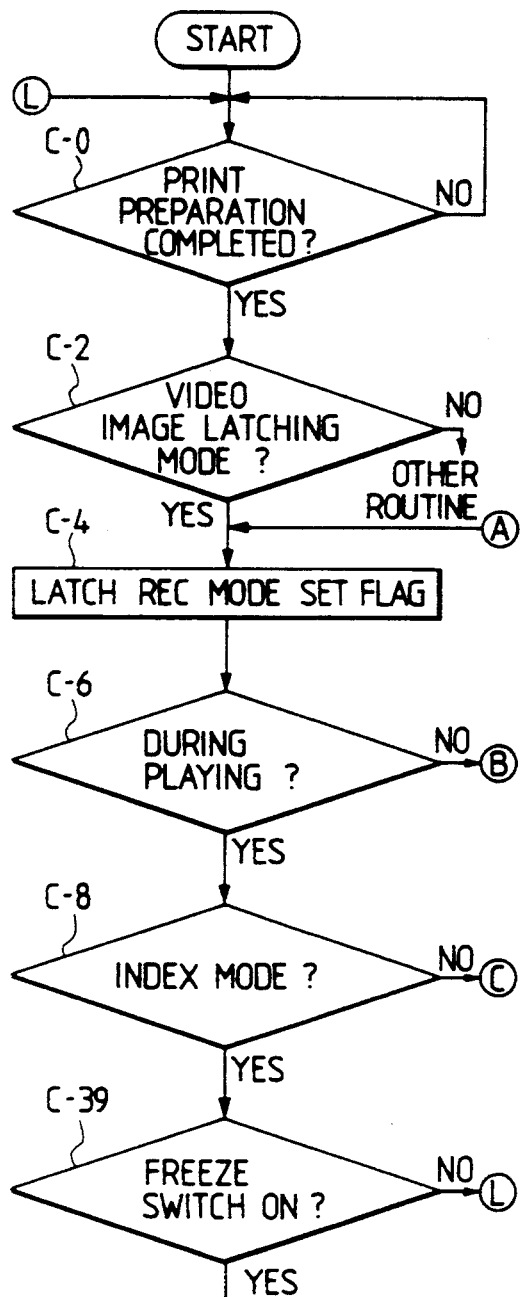
FIG. 28 is a flowchart showing the operation of a CPU 4360.
Figure 28B:
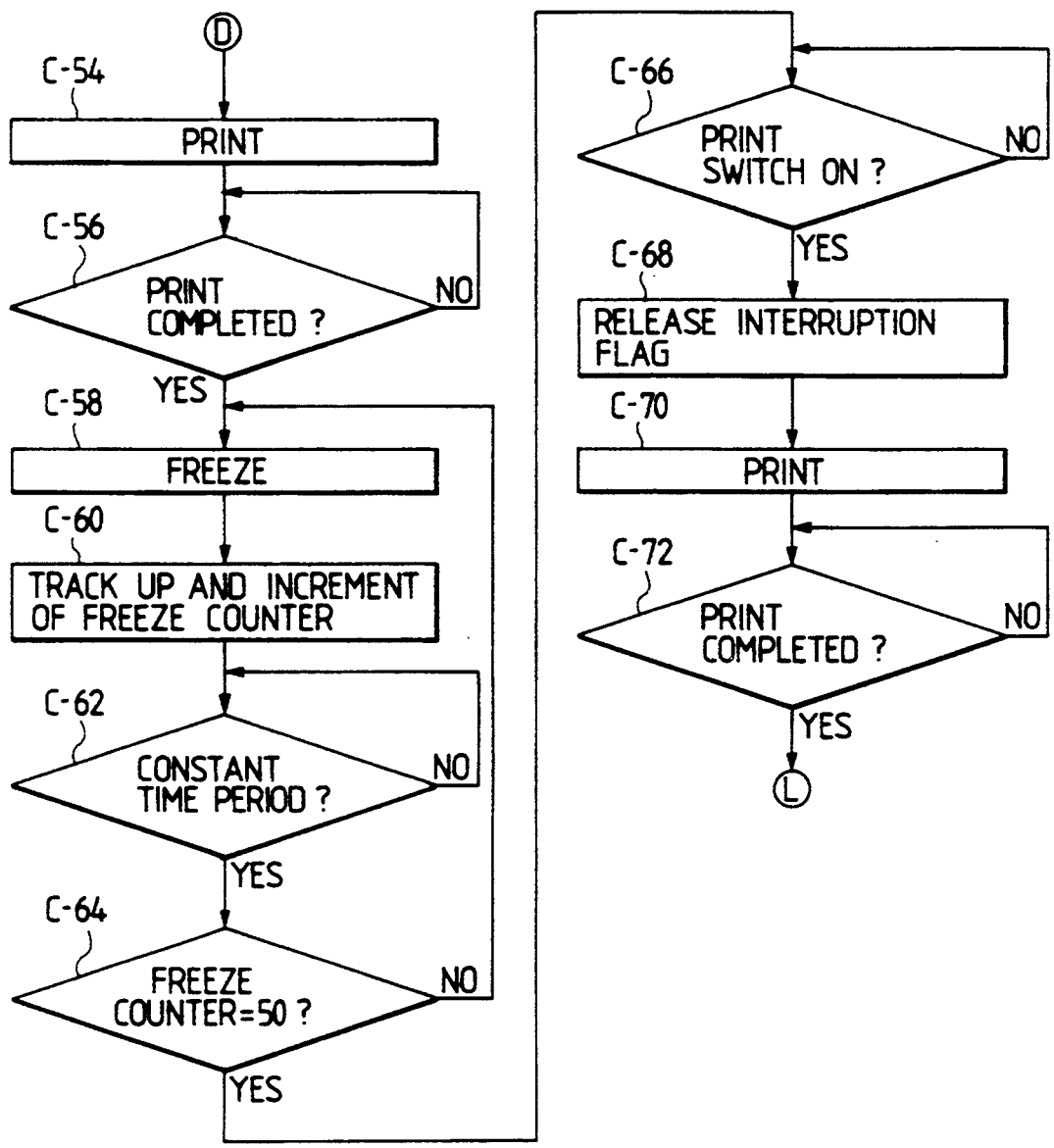

With reference to FIG. 28, an explanation will now be provided with respect to the operations of the image forming apparatus of the embodiment and of an image reproducing apparatus, which will be explained hereinafter, particularly, with regard to the operations of the CPU 4360 and video apparatus control signal generating apparatus 4000-A.

The image reproducing apparatus in the embodiment not only has the function to reproduce images but also the function to record the images.

In the case where the above two apparatuses are connected, a check is first made to see if the color printer (also referred to as an image forming apparatus) side has been set into the print preparation completion state or not (C-0). If the print preparation state has been set, a check is made to see if the operating mode has been set to the video image latching mode or not (C-2). If NO, the processing routine advances to another routine, for instance, the image is latched from the scanner or the operation in the ordinary copy mode is executed.

On the other hand, in the video image latching mode, REC flag is latched (C-4) in the image reproducing apparatus, which will be explained later. The REC flag is set in the case where the recording mode (REC mode) is set at the image reproducing apparatus side as will be explained hereinlater and the recording preparation operation, for instance, the operation to locate a recording/reproducing head onto an unrecorded track on a recording medium which is mounted at the image reproducing apparatus side has been completed.

Next, a check is made to see if the REC mode flag has been set or not (C-6). If the REC mode flag is not set, that is, when the reproducing apparatus side has been set to the reproduction mode, the processing routine advances to step C-8. If the reproduction mode (PB mode) has been set, the processing routine advances to step C-10. In step C-10, a check is made to see if the REC flag has been set or not at the image reproducing apparatus side. If YES, the processing routine advances to step C-11. If NO, the processing routine is returned to step C-4. In step C-11, it is discriminated that a REC completion flag has been set. A signal to set the reproducing apparatus into the reproduction mode is output and, further, the recording/reproducing head is shifted out by one track, that is, to the track on which data has just previously been recorded (C-12). Next, a check is made to see if a reproduction output has been obtained from the image reproducing apparatus side or not (C-14). If NO, the process in step C-12 is again executed. If YES, the reproduction outputs 4060R, 4060G, and 4060B in FIG. 26A or 10A are written into the image memories (C-16). In the writing operation in this case, all of the pixel data are written into the image memories without thinning out the reproduction outputs obtained from the reproducing apparatus.

Next, the reproducing apparatus side is set into the REC mode (C-18). As will be explained hereinafter, an interruption flag is set to "0" and, further, the REC flag is reset, thereby setting the REC mode. Thus, the image reproducing apparatus is returned to the present REC mode.

Next, the image forming apparatus prints the images stored in the memories in a manner as mentioned above (C-20). If the completion of the printing operation is detected (C-22), the processing routine is returned to ⓛ.

By executing the processes in steps C-4 to C-22 as mentioned above, if the completion of the image recording at the reproducing apparatus side is determined at the image forming apparatus side, the reproducing apparatus is automatically set into the reproduction mode. The image signal which has just previously been recorded is reproduced. The reproduced image signal is printed as a hard copy. To form such a hard copy, after the elapse of a predetermined time (for instance, 1/60 second) to store the image signal into the memory, the reproducing apparatus is again automatically set to the recording mode. Therefore, the reproducing apparatus can freely record the next image to the disk substantially irrespective of the operation of the image forming apparatus and a hard copy can be obtained almost simultaneously with the image recording operation.

On the other hand, in this case, since there is no need to operate the freeze switch and the print switch of the image forming apparatus, a hard copy can be obtained at a fairly good use efficiency.

The operations in step C-8 and subsequent steps will now be described. If it is determined that the reproduction mode has been set in step C-6, a check is first made to see if an index mode has been set or not (C-8). If NO, a check is made to see if the freeze switch has been turned on or not (C-30). If the freeze switch has been turned on, the freezing operation of the image memory is executed (C-32). When the print switch is turned on, the printing operation is performed and the processing routine advances to step C-22.

As mentioned above, if the reproducing apparatus has previously been set in the reproduction mode, when the index mode, which will be described hereinlater, is not set, by selecting the timing to turn on the freeze switch at the image forming apparatus side, a desried image can be recorded after the desired image was selected.

The operation in the case where the index mode has been set in step C-8 will now be described.

In such a case, a check is made to see if the freeze switch has been turned on or not (C-39). If YES, the recording track which is reproduced by the recording/reproducing head on the reproducing apparatus side is set to the first track (C-40) as will be explained later.

Next, a freeze coutner is reset (C-42) and the freezing operation is executed (C-44). The track which is being accessed by the recording/reproducing head is shifted up to the next track and the count value of a freeze counter is increased by "1" (C-46). Then, a check is made to see if a predetermined period of time which is required to shift the head to the next track has elapsed or not (C-48). The processes in steps C-44 to C-48 are repeated until it is detected that the count value of the freeze counter is set to 25. If the count value of 25 of the freeze counter is detected, a check is made to see if the print switch has been turned on or not (C-52). If YES, by executing the processes in steps C-44 and C-48, the images of 25 picture planes which were freezed in the memory are printed in a lump (C-54 and C-56).

If the completion of the printing operation is detected in step C-56, the operations similar to those in steps C-44 to C-50 are now repeated until the count value of the freeze counter becomes 50 (C-58 to C-64). After the image data of the 26th to 50th picture planes were latched into the memory, a check is made to see if the print switch has been turned on or not (C-66). If YES, an interruption flag is reset (C-68) and, thereafter, the printing operation is executed in a manner similar to the processes in steps C-54 and C-56 (C-70, C-72).

According to the processing routine in step C-39 and subsequent steps described above, an integrated hard copy of 1st to 25th images among images of the 1st to 50th tracks on the image reproducing apparatus side is obtained in a lump. The number of picture planes to form an integrated hard copy can be easily changed by changing the set value 25 for the freeze counter to the other number. For instance, if it is set to 16, an integrated copy of 16 picture planes can be obtained as shown in FIG. 18. On the other hand, as an operation necessary to obtain such a copy, it is sufficient to execute only the operation from the image forming apparatus side. Therefore, such a copy can be obtained by a very simple operation.

As a freezing operation in steps C-44 and C-58, different from the freezing operation in step C-32 or C-16, a larger number of images can be printed in a lump by executing the process to thin out the pixels.

On the other hand, after the image signal is stored into the memory on the image forming apparatus side, the interruption flag is set to "0", so that the image forming apparatus and the image reproducing apparatus can respectively independently operate.

In the video apparatus 1A, which will be explained hereinafter, a still video recording and reproducing apparatus in which concentric tracks are formed on a disk is shown as an example. However, the invention is not limited to such an apparatus. A memory device having a card shape or a tape shape can be also used as memory means instead of the disk shape.

An embodiment of the video apparatus 1A will now be described hereinbelow with reference to the drawings.

The apparatus of this embodiment of the invention will now be described hereinbelow.

Figure 29:
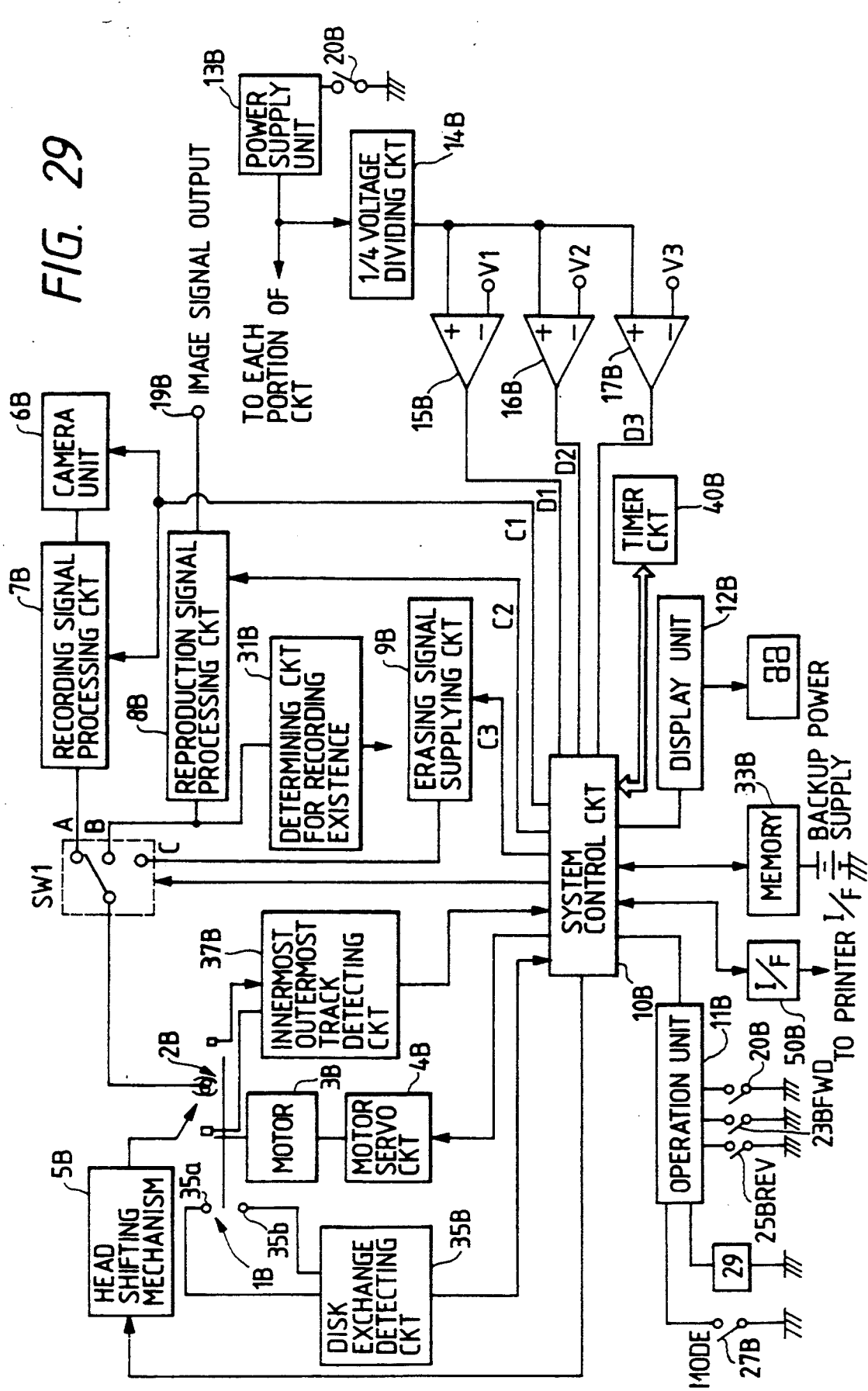
FIG. 29 is a block diagram showing a construction of the apparatus in an embodiment of the invention.

FIG. 29 is a block diagram showing a construction of the apparatus in the embodiment. In FIG. 29, reference numeral 1B denotes a magnetic disk as a recording medium and 2B indicates a magnetic head which is moved in the radial direction of the rotating magnetic disk 1B and executes the recording, reproduction, and erasure of a signal onto/from the tracks formed on the magnetic disk 1B. Reference numeral 3B denotes a motor to rotate the disk 1B; 4B indicates a motor servo circuit to rotate the disk 1B at a constant velocity by controlling the motor 3B; 5B denotes a head shifting mechanism for shifting the magnetic head 2B in the radial direction of the disk 1B and for locating the head 2B onto the tracks which are concentrically formed on the disk 1B; 6B denotes a camera unit comprising an optical system including a photographing lens, a diaphragm shutter, an image pickup device for converting image information photographed by the optical system into an electrical signal, and the like; and 7B denotes a recording signal processing circuit for executing signal processes such as frequency modulation and the like on the electrical signal which was output from the camera unit and converting it into a signal in a form suitable to record it onto the magnetic disk and for supplying the converted signal to the magnetic head 2B through a switch $SW_1$. Reference numeral 8B indicates a reproduction signal processing circuit. The signal which was reproduced from the tracks on the disk 1B by the magnetic head 2B is input to the processing circuit 8B via switch $SW_2$. The processing circuit 8B executes the signal processes such as frequency demodulation and the like to the reproduced input signal and converts it into the original video image signal and outputs it to a video signal output terminal. Reference numeral 9B denotes an erasing signal supplying circuit to supply an erasing current to the head 2B via the switch $SW_1$. Reference numeral 10B indicates a system control circuit to control the apparatus. The motor servo circuit 4B, the head shifting mechanism 5B, the camera unit 6B, the recording signal processing circuit 7B, the reproduction signal processing circuit 8B, the erasing signal supplying circuit 9B, the switch $SW_1$, and the like are controlled by the system control circuit 10B. Reference numeral 11B denotes an operation unit to input commands corresponding to various modes to the system control circuit 10B and has switches, which will be explained hereinlater, such as a release switch 21B, a FWD switch 23B, a REV switch 25B, a mode switch 27B, etc. Reference numeral 12B denotes a display unit to display the information regarding the respective operating modes by the system control circuit 10B. The display unit 12B has a 7-segment display of two digits. Reference numeral 13B denotes a power supply unit to supply a power source to the apparatus. A power source is supplied to each block in the apparatus. Reference numeral 20B denotes a power switch for switching whether electrical power is supplied from the power supply unit 13B to each section of the apparatus or not. Reference numeral 14B dentoes a ¼ voltage dividing circuit to divide the power source voltage generated from the power supply unit 13B by ¼. Reference numerals 15B, 16B, and 17B denote voltage comparators. The output signal from the ¼ voltage dividing circuit 14B is input to the + terminal of each of the voltage comparators 15B to 17B. Preset voltages $V_1$, $V_2$, and $V_3$ are input to − terminals of the comparators 15B to 17B. On the other hand, output signals of the comparators 15B to 17B are input to the system control circuit 10B. Reference numeral 19B indicates a terminal to output the image signal processed by the reproduction signal processing circuit 8B to the outside; 21B indicates the release switch for allowing an image to be recorded; 23B denotes the REV switch to indicate the movement of the head 2B to the outer track; 25B denotes the FWD switch to indicate the movement of the head 2B to the inner track; 27B denotes the mode switch to further set various kinds of modes in the set recording mode; and 29B denotes a slide switch to set either one of the recording mode, erasing mode, reproduction mode, and lock mode. By setting the lock mode, the switch 20B is turned off and the power supply of the whole apparatus is turned off. Reference nuemral 31B denotes a recording existence/absence determining circuit to discriminate whether data has already been recorded in the track which is being accessed by the head 2B or not on the basis of an output of the head 2B. Reference numeral 33B denotes a memory to store an output of the system control circuit 10B, for instance, the result of the discrimination regarding the existence/absence of the recording of each track and the number of track which is being accessed by the head 2B at present. Reference numeral 35B denotes a disk exchange detecting circuit for detecting by photocouplers 35B$a$ and 35B$b$ whether the medium has been exchanged or not. Reference numeral 37B denotes an innermost/outermost track detecting circuit to detect that the head 2B has arrived at the innermost or outermost track; 40B represents a timer circuit to detect the operating time of the apparatus, in which the timing for clearing and the timing for starting the counting operation are controlled in accordance with the output of the system control circuit 10B; and 50B denotes an interface circuit to receive a communication signal from the image forming apparatus and executes transmission and reception of signals with the video apparatus control signal generating apparatus 4000-A in FIG. 26A.

As external view of the apparatus of the embodiment will now be described with reference to FIGS. 30 to 33.

Figure 31:
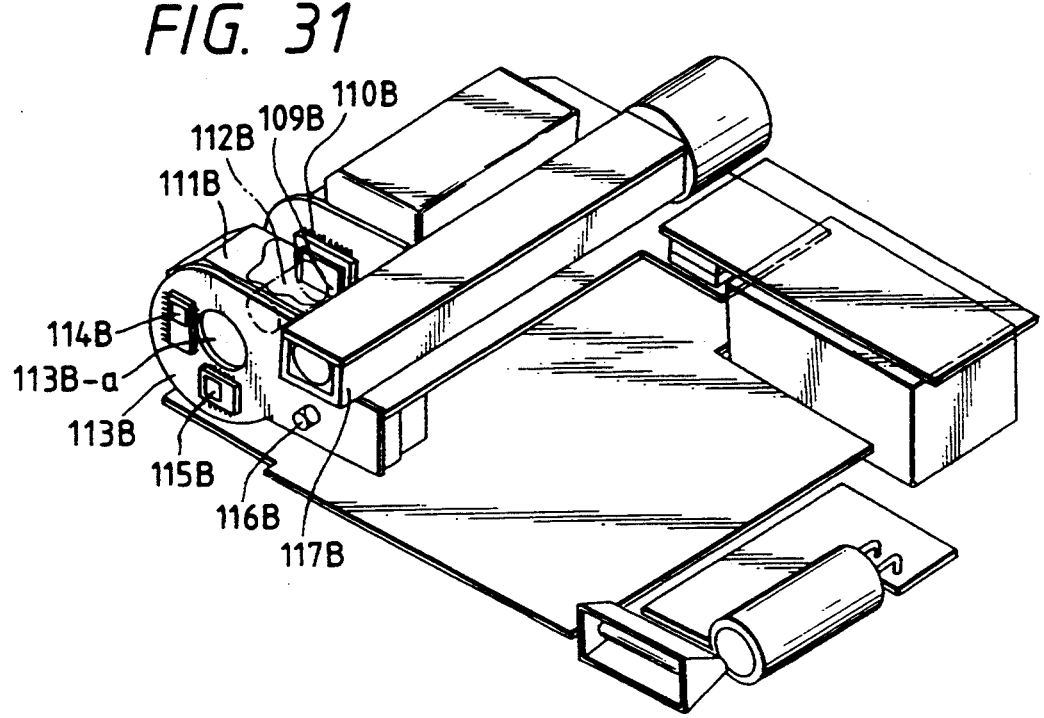
FIG. 31 is a perspective view showing a state in which external attaching members of the apparatus in the embodiment of the invention are removed.
Figure 32:
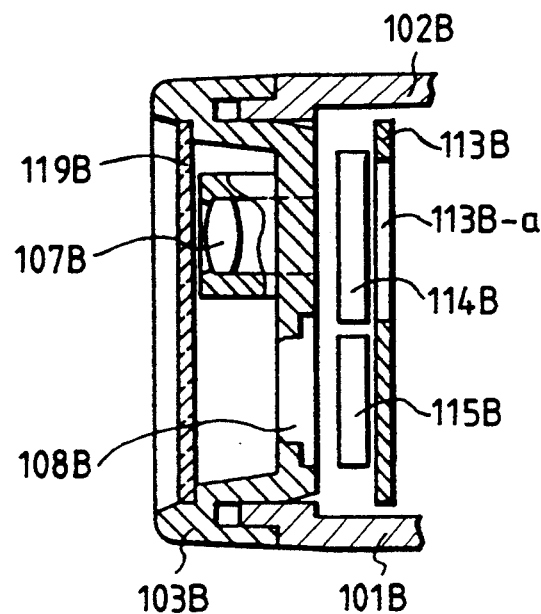
FIG. 32 is a cross sectional view of an optical system section of the apparatus in the embodiment.
Figure 33:
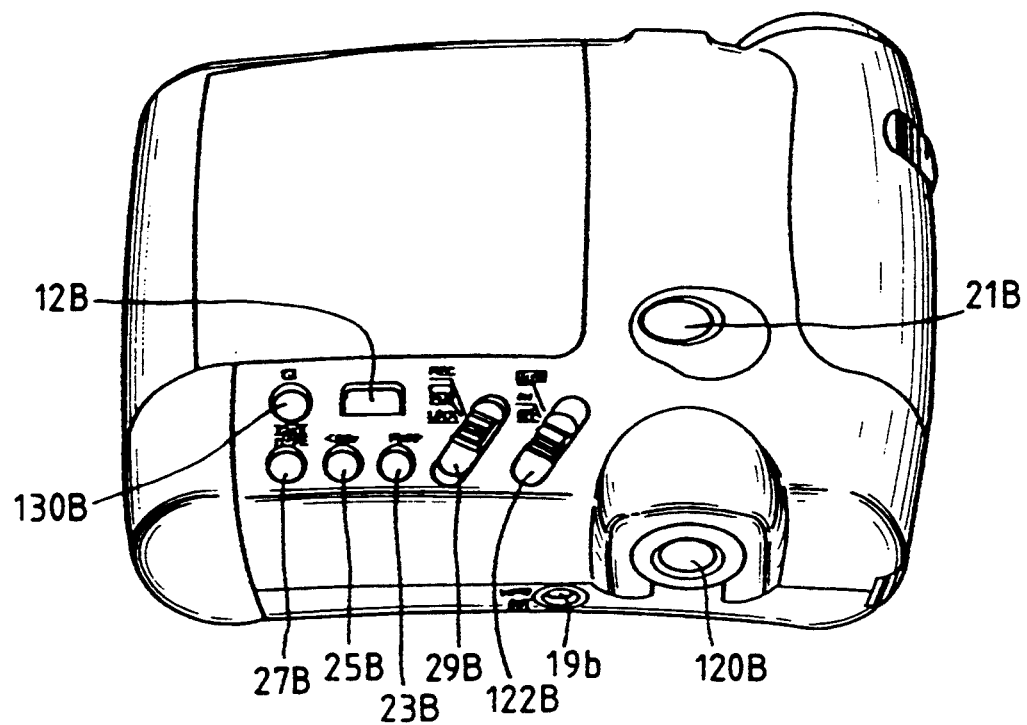
FIG. 33 is an external view of the apparatus in the embodiment when it is seen from the backside.

FIG. 30 shows a perspective view of the apparatus of the embodiment according to the invention (when it is seen from the right front direction). FIG. 31 is a perspective view showing the state in which outer attaching members of the apparatus shown in FIG. 30 were detached (when it is seen from the left front direction). FIG. 32 is a cross sectional view of each section of the optical system. FIG. 33 is an external view of the apparatus shown in FIG. 30 (when it is seen from the backside direction).

The outer attaching members of the apparatus shown in FIG. 30 mainly comprise: an upper cover 102B; a lower cover 101B; an opening/closing cover 104B which constitutes a cover member of a mounting portion of a video floppy as a disk which is used in the apparatus of the embodiment; and a protective cover 103B which is attached so as to cover various optical system components from the front direction.

In FIG. 31 showing the state in which the above outer attaching members were removed, an image pickup device 109B is soldered and a shutter unit 111B having an image pickup lens unit 112B therein is arranged in front of a board 110B. A printed circuit board 113B on which a photometric IC 114B and a photometric sensor 115B are soldered is fixed to the front portion of the shutter unit 111B.

Further, an escape hole 113B-a for the image pickup optical system and an LED 116B to display upon photographing by a self timer are provided for the board 113B.

In the state in which the above outer attaching members are attached to the image pickup block constructed as mentioned above, the protective cover 103B is attached to the image pickup block from the front side as shown in FIG. 30.

Referring to FIG. 32 showing a cross sectional view of the protective cover 103B, a photometric condenser lens 107B and a photometric diffusion plate 108B are attached to the protective cover 103B so as to face the photometric IC 114B and photometric sensor 115B which are mounted on the printed circuit board 113B.

Further, a cover glass 119B is fixed to the protective cover 103B at the position in front of the condenser lens 107B.

On the other hand, the switches which have been described in FIG. 29 are arranged as shown in FIG. 33. In FIG. 33, reference numeral 120B denotes a finder to observe an object which is photographed by the image pickup optical system; 122B indicates a switch to set a stroboscopic photographing mode; and 130B denotes an exposure correcting switch.

In the embodiment, with the construction as shown in FIG. 33, an electronic camera can be formed as a thin shape so as to be easily operated.

The operation of the embodiment constructed as mentioned above will now be described.

Figures 1B, 34:
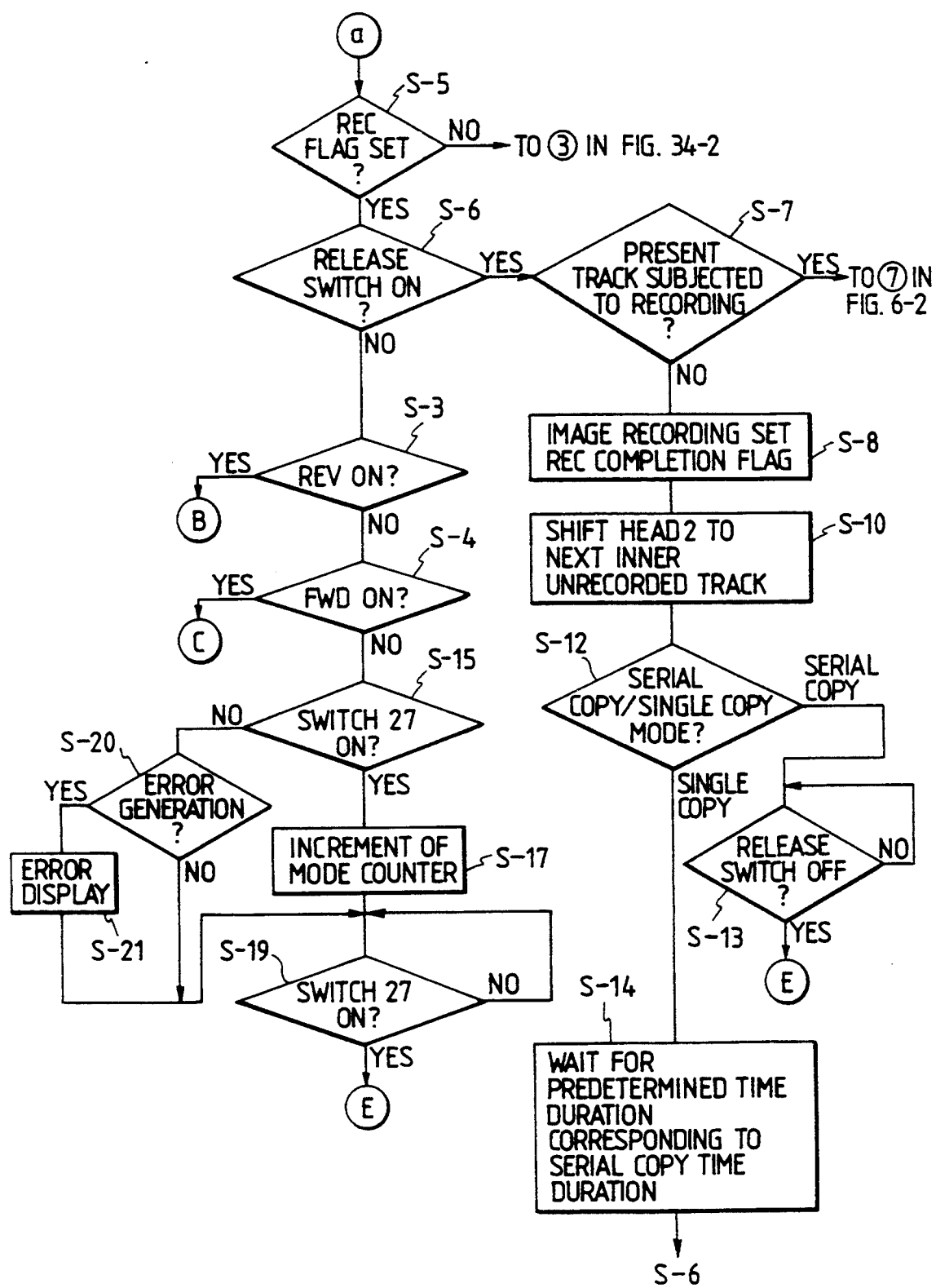
Figures 2, 34:
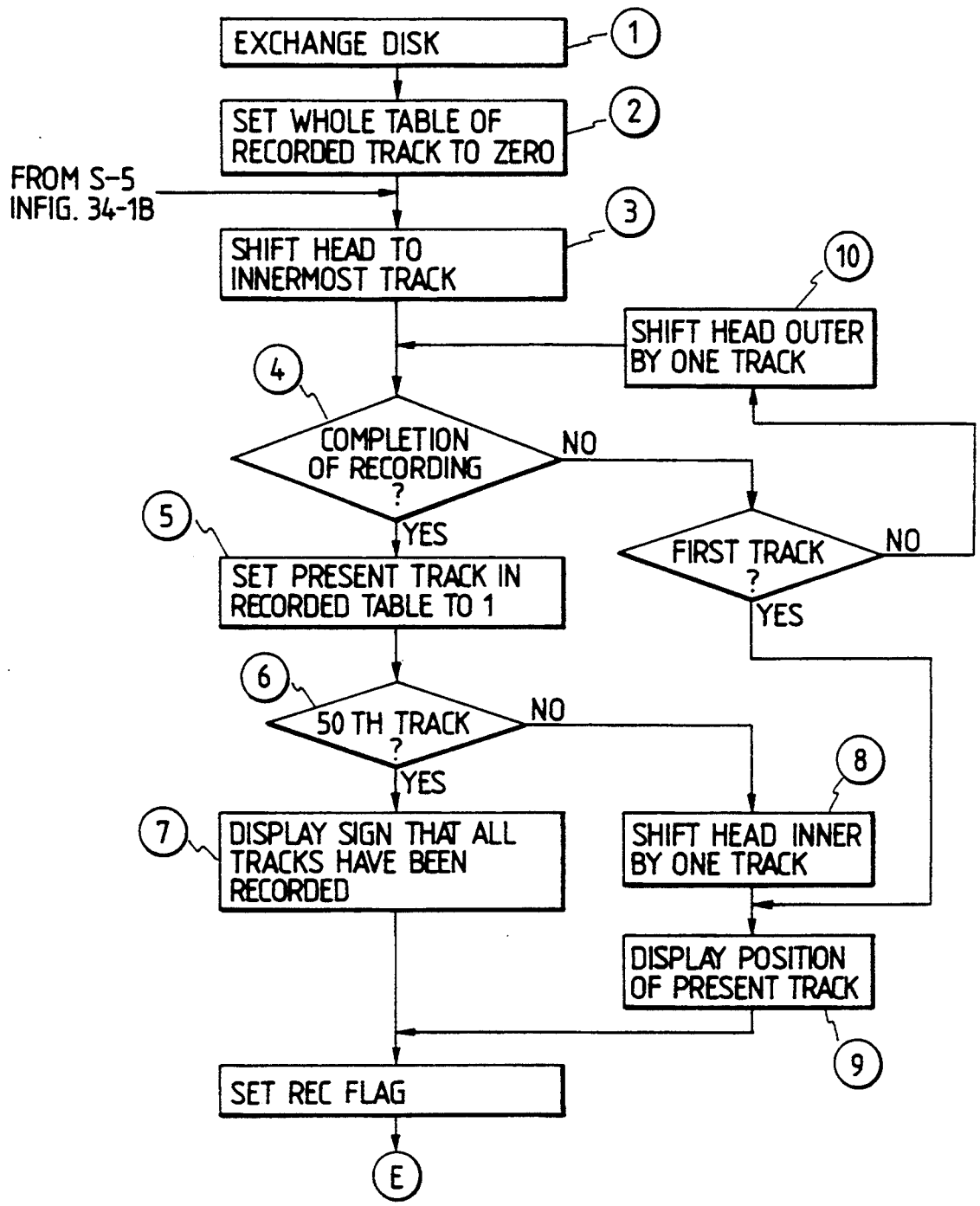

FIGS. 34-1 to 37 are flowcharts for explaining the operation of the embodiment constructed as mentioned above.

FIG. 34-1 is a diagram for explaining the whole operation in the apparatus of the embodiment.

The processes shown in the above flowchart are executed by unlocking the switch 29B shown in FIG. 33.

Figure 38A:
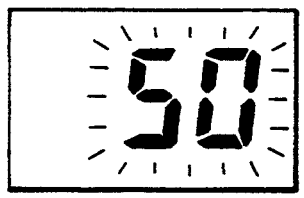
FIGS. 38A to 38H are diagrams showing an example of a display of a display unit 12B shown in FIG. 29.
Figure 38B:

In FIG. 34-1, the existence or absence of the disk is detected in step S-00 on the basis of outputs of the photocouplers 35Ba and 35Bb. If no disk is mounted, "00" shown in. FIG. 38B is displayed by the display unit 12B so as to blink in step S-0. If the existence of the disk is detected in step S-00, a check is made in step S-1 to see if the exchange of the disk has been detected by the disk exchange detecting circuit 35B or not. In step S-2, a check is made to see if the reproduction mode (PB mode) has been set by the slide switch 29B or not. In step S-5, a check is made to see if the REC flag, which will be explaiend hereinlater, has been set or not. In step S-6, a check is made to see if the release switch 21B has been turned on or not. If YES in step S-6, step S-7 follows. If NO in step S-6, the processing routine advances to step S-3. In step S-3, a check is made to see if the REV switch 25B has been turned on or not when it is discriminated that the PB mode is not set in step S-2. In step S-4, a check is further made to see if the FWD switch 23B has been turned on or not. If YES in each of steps S-1, S-3, and S-4, the processing routines Ⓐ, Ⓑ, and Ⓒ, which will be explained hereinlater, are executed, respectively. In step S-28, a check is made to see if the interruption flag has been set or not. If NO in step S-28, the operating mode is set into the reproduction mode in step S-30. That is, the switch $SW_1$ is switched to the B side and the head 2B is shifted out by one track (S-32). A check is again made to see if the interruption flag has been set or not (S-34). On the other hand, if the FWD switch is not turned on in step S-4, a check is made to see if the switch 27B has been turned on or not (S-15). If YES in step S-15, the count value of a mode counter in the system control circuit 10B is increased by "1" (S-17).

In the apparatus of the embodiment, each time the mode switch 27B shown in FIGS. 29 and 33 is turned on, either one of the serial recording mode, the single recording mode, and the self timer recording mode can be sequentially set. In accordance with such a set mode, the display unit 12B switches the display content as shown in FIGS. 38F, 38G and 38H. To certainly set such a mode, in the apparatus of the embodiment, the system control circuit 10B has the mode counter therein. Each time the count value of the mode counter is increased by "1", the count value is cyclically updated such that "0"→"1"→"2"→"0".

When the count value of the mode counter is set to "0" the single recording mode is set. When it is "1", the serial recording mode is set. When it is "2", the self timer recording mode is set. After step S-17, a check is made to see if the switch 27B has been turned off or not (S-19) and the processing routine is returned to Ⓔ. On the contrary, if the switch 27B is not turned on in step S-15, an error of the apparatus is detected. If there is some failure, for instance, if a situation such that the servo of the motor 3B cannot be executed is detected, the display unit displays as shown in FIG. 38D.

On the other hand, if the REC flag has been set in step S-5, step S-6 follows. If it is not set, the processing routine advances to ③ in FIG. 34-2, which will be explained hereinlater.

If it is detected that the release switch has been turned on in step S-6, a check is made in step S-7 to see if the track which is being accessed by the head has already been recorded or not. If YES, the processing routine is branched to ⑦ in FIG. 34-2, which will be explained hereinlater, to display the sign indicating that the recording cannot be performed. If NO, the image signal from the camera unit 6B is recorded onto the disk 1B by the head 2B through the processing circuit 7B and the REC completion flag is set in step S-8. In step S-10, the head 2B is shifted to the next inner unrecorded track on the disk 1B. A check is made to see if the single recording mode has been set or the serial recording mode has been set on the basis of the count value of the mode counter described in step S-17 (S-12). If the single recording mode has been set, a check is then made in step S-13 to see if the release switch has been turned off or not and the processing routine is returned to Ⓔ. On the other hand, if the serial recording mode has been set in step S-12, the apparatus waits for a predetermined time duration corresponding to the serial recording time duration (S-14) and the processing routine is returned to step S-6.

The processing routine shown in Ⓐ will now be described with reference to FIG. 34-2.

An explanation will now be provided hereinbelow, in which each step number shown in the flowchart is surrounded by a circle ◯.

① If it is detected by the disk exchange detecting circuit 35B that the disk has been exchanged, the control unit controls the head shifting mechanism until the detecting circuit 37B detects that the head was shifted to the innermost track and sets the whole recorded track table (included in the memory 33B) to "0" (②, ③). After that, the head 2B is sequentially accessed to each track from the 50th track and the existence or absence of the recording is discriminated by the determining circuit 31B. ⑥ If the 50th track has already been recorded, ⑦ a sign indicating that "The 50th track has been recorded" is displayed by the 7-segment display elements of the display unit 12B. In this case, for example, as shown in FIG. 38A, if such a sign is indicated by flickering "50" or the like, the number of segments of the LCD can be reduced and the user can easily confirm such a message. On the other hand, if it is detected in ⑥ that the recorded track is not the 50th track, ⑧ the head 2B is shifted in by one track, that is, the head 2B is shifted to the unrecorded track. ⑨ The present track position is displayed by a numerical value. On the other hand, if it is detected that the track is not recorded in ④, 10 the head is shifted out by one track and the existence or absence of the recording is again discriminated in ④. In ⑤, the address corresponding to the table included in the memory 33B is set to "1".

By executing the above processing routine, the head 2B is positioned from the inner track on the disk 1B onto the outermost track among the continuous unrecorded tracks. If the 50th track has been recorded, a sign is displayed as shown in FIG. 38A, thereby warning the user.

On the other hand, by executing the above processing routine, 11 the REC flag is set to indicate that the head 2B has been positioned onto the unrecorded track in order to record.

After the head was shifted onto the unrecorded track in accordance with the flow of FIG. 34-1, if the release switch is pressed, the recording is executed as shown in step S-8 in FIG. 34-1 mentioned above. FIG. 35 shows a flow ⓑ which is executed when the REV switch is then pressed. In FIG. 35, if the release switch 21B is turned on with the REV switch 25B pressed, 32 the apparatus does not operate if the track "0" does not exist on the outer side. If the track "0" exists, 33 the head 2B is shifted to the outer nearest track of "0". 34 If it is determined that the outer nearest track of "0" has not been recorded, 100 the track number is displayed by the display unit 12B. If it has already been recorded, 35 the bit of the present track in the recorded track table is set to "1". In 36 and 37 , until it is detected that the present track is set to the first track of the unrecorded track, the processes in steps 34 to 37 are repeated. If the head 2B has reached the first track during the repetitive operations in steps 34 to 37 and when the first track has been all recorded, the processing routine advances to step 38 . In step 38 , a check is made to see if the track of "0" exists in the track table at the inner side or not by searching the table in the memory 33B. If it exists, 40 the head is shifted to the nearest track of "0" in the track table. If the track of "0" does not exist, 39 a sign indicating that all of the tracks have been recorded is displayed as shown in FIG. 38A.

In the embodiment, the processing routine has been branched from 37 to 34 . However, for instance, if the flow is branched to 32 as shown by a broken line in FIG. 35, there is no need for the determining circuit 31B to discriminate the existence or absence of the recording in step 34 with respect to the track in which "1" has already been written in the track table. Therefore, the time which is required to shift the head to the unrecorded track can be reduced.

A flow of ⓒ which is branched from step S-4 shown in FIG. 34-1 will now be described with reference to FIG. 36.

Figure 36:
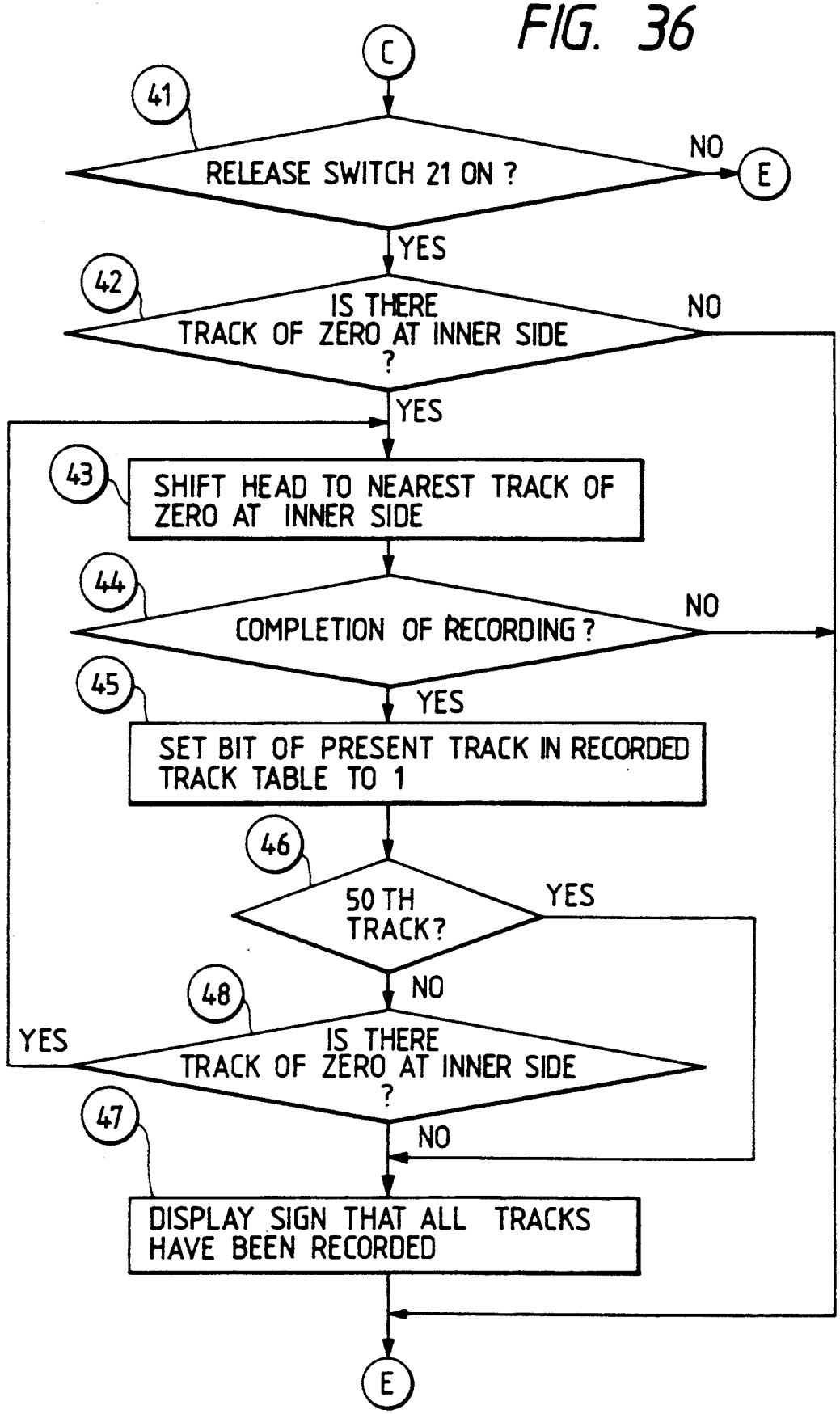

In FIG. 36, if the release switch 21B is turend on ( 41 ) with the PWD button pressed, 42 a check is made to see if the track of "0" exists at the inner side then the position of the track which is at present being accessed by the head 2B or not. If it does not exist, the apparatus does not operate. However, if it exists, 43 the head is shifted to the inner nearest track of "0". 44 The existence or absence of the recording of the track after the head was shifted is discriminated by the determining circuit 31B. If the track is not recorded, the processing routine advances to ⓔ mentioned above. If it has been recorded, 45 the present bit in the recorded track table in the memory 33B is set to "1". 46 A check is made to see if the track which is at present being accessed by the head is the 50th track or not. Thus, if it is the 50th track, 47 a sign indicating that all of the tracks have been recorded is displayed as shown in FIG. 38A. If it is not the 50th track, whether the track of "0" exists at the inner side or not is again discriminated by searching the track in which the corresponding address is set to "1" from the table in the memory 33B. If such a track exists, step 43 follows. If NO, the processing routine is finished.

A processing routine ⓓ which is executed in the case where the reproduction mode has been set (YES) in step S-2 shown in FIG. 34-1 will now be described with reference to FIG. 37. In ⓓ, a flow in the case where the system has the function to reproduce and erase will be described.

First, in 51 , the reproduction mode is set. As such a setting, there is a case where the switch SW$_1$ shown in FIG. 1 is switched to the B side and, further, the track number which is at present being accessed by the head 2B is displayed by the display unit 12B.

That is, in the recording mode, by executing the processes in steps ④ to 10 shown in FIG. 34-2, for instance, if all of the tracks on the disk 1B have been recorded, a display sign is flickered as shown in FIG. 38A. However, in 51 , such a flickering display is stopped and the display mode is returned to the ordinary display mode.

52 A check is then made to see if the track which is at present being accessed is the first track or not. If NO, 53 the head is shifted out by one track. 54 A check is made to see if the first track has been recorded or not by checking the table in the memory 33B or the output of the determining circuit 31B. 55 The bit of the present track in the recorded track table is set to "1". Then, the REC flag and the REC completion flag are reset. If the track is not recorded in step 54 , step 55 follows and a check is again made to see if the position of the track which is at present being accessed by the head 2B is the first track or not. The above processes in steps 51 to 54 are repeated until the head reaches the recorded first track.

In the apparatus in the embodiment, as described in the flowchart in FIG. 34-2, when the disk is exchanged or a new disk is mounted, a check is sequentially made to see if each track is unrecorded or has already been recorded from the innermost track on the disk 1B until the recorded track is found. If the track has been recorded, "1" is set to each address of the table in the memory 33B.

In the flow shown in 51 to 55 in FIG. 37, the existence or absence of the recording is discriminated with respect to the tracks from the track which is at present being accessed by the head 2B until the first track. Therefore, according to the embodiment, if the reproduction mode is set by the switch 29B after the disk 1B was set into the apparatus, the information regarding the existence/absence of the recording of all tracks on the disk 1B is written into the table in the memory 33B. There is an advantage such that the operation for the next mode, for instance, the operation when the operating mode was switched to the recording mode can be promptly executed.

If the first track is detected in step 52, a check is made in step 130 to see if the interruption flag has been set or not. If NO, the switch $SW_1$ is switched to the B side, the reproducing operation is started, and the counting of a timer to set the reproducing time is started. Next, if the FWD switch 23B has been pressed in 57, the head 2B is shifted inner by one track in 58. On the other hand, if the REV switch 25B has been pressed in 59, the head is shifted outer by one track in 60.

Figure 38C:
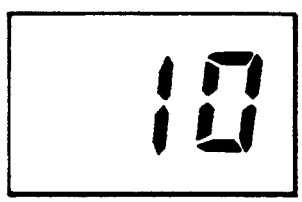
Figure 38D:
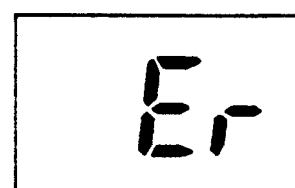

After the head 2B was shifted in 58 and 60, the position of the track which is at present being accessed by the head 2B is displayed by the display unit 12B as shown in FIG. 38C. In 140 and 150, a check is made to see if the interruption flag has been set or not. If YES, the flow is branched to (E).

Figure 38E:
Figure 38F:
Figure 38G:
Figure 38H:

If the REV switch 25B is not turned on in 59, a check is made to see if the mode switch 27B has been turned on or not in 100. If NO in step 100, a check is made to see if the reproduction mode has been released or not in 65. If the mode switch 27B has been turned on, a check is made to see if the release switch 21B has been turned on or not in 61. If YES in 61, the switch $SW_1$ is connected to the C side and the start of the erasing operation is indicated to the erasing signal supplying circuit 9B. As shown in FIG. 38E, the sign which is displayed by the 7-segment display device to display the number of the track which is being accessed by the head 2B is flickered twice, thereby indicating that the data is being erased. 64 The address corresponding to the erased track in the table in the memory 33B is reset to "0". In 65, a check is made to see if the release of the reproduction mode has been indicated by the switch 29B or not. If YES, the flow is branched to (E) in FIG. 34-1. If NO in step 65, an output of the timer circuit 40B is detected to discriminate whether the reproducing operation has continued for a predetermined time (for instance, about ten minutes) or not in 90. If YES in 90, the power supply by the power supply unit 13B is stopped in 91. In this case, it is preferable that the power supply unit 13B stops the power supply to the sections other than the system control circuit 10B, that is, at least the power supply to the motor 3B or the reproduction signal processing cirucit 8B.

Next, a check is made in 92 to see if the switch 21B has been turned on or not. If YES, the processing routine again advances to step 56 and the reproducing operation is started. If the switch 21B is not turned on, a check is made in 93 to see if the release of the reproduction mode has been indicated or not in a manner similar to the flow shown in 65. If it is not indicated, the flow is branched to 92. If YES, the processing routine is branched to (E).

According to the embodiment, since the reproducing operation is automatically stopped due to the elapse of a predetermined time by the timer from the start of the reproducing operation after the reproduction mode was set, there is a large advantage in terms of, particularly, the power saving in the case of a small apparatus whose power supply capability is limited as in the apparatus of the present embodiment.

On this other hand, in the embodiment, after the reproducing operation was automatically stopped by the timer, the reproducing operation is restarted by turning on the release switch 21B. Therefore, there is no need to provide a special switch to set the reproduction mode.

In the embodiment, when the reproduction mode is set by the switch 29B, the processes in steps 53 to 56 are automatically executed in accordance with the setting of the reproduction mode and the reproduction is started. However, the invention is not limited to such a method. The start of the reproducing operation can be also controlled at an arbitrary timing by providing the step of detecting the turn-on of the release switch 21B in 95 and the step of detecting the reproduction mode by the switch 29B in 97 as shown by broken lines in the diagram.

When erasing, the switch 27B to set the recording mode has been used as a switch to set the erasing mode. Further, the switch 21B has been used as a switch to actually execute the erasing process. Therefore, the embodiment further has an advantage such that a plurality of complicated functions can be realized without increasing the number of switch operating members.

An explanation will now be provided with respect to the operation in the recording and reproducing apparatus of the embodiment in the case where the signal which is input from the image forming apparatus to an interface circuit 50 is received as an interruption signal.

Figure 39:
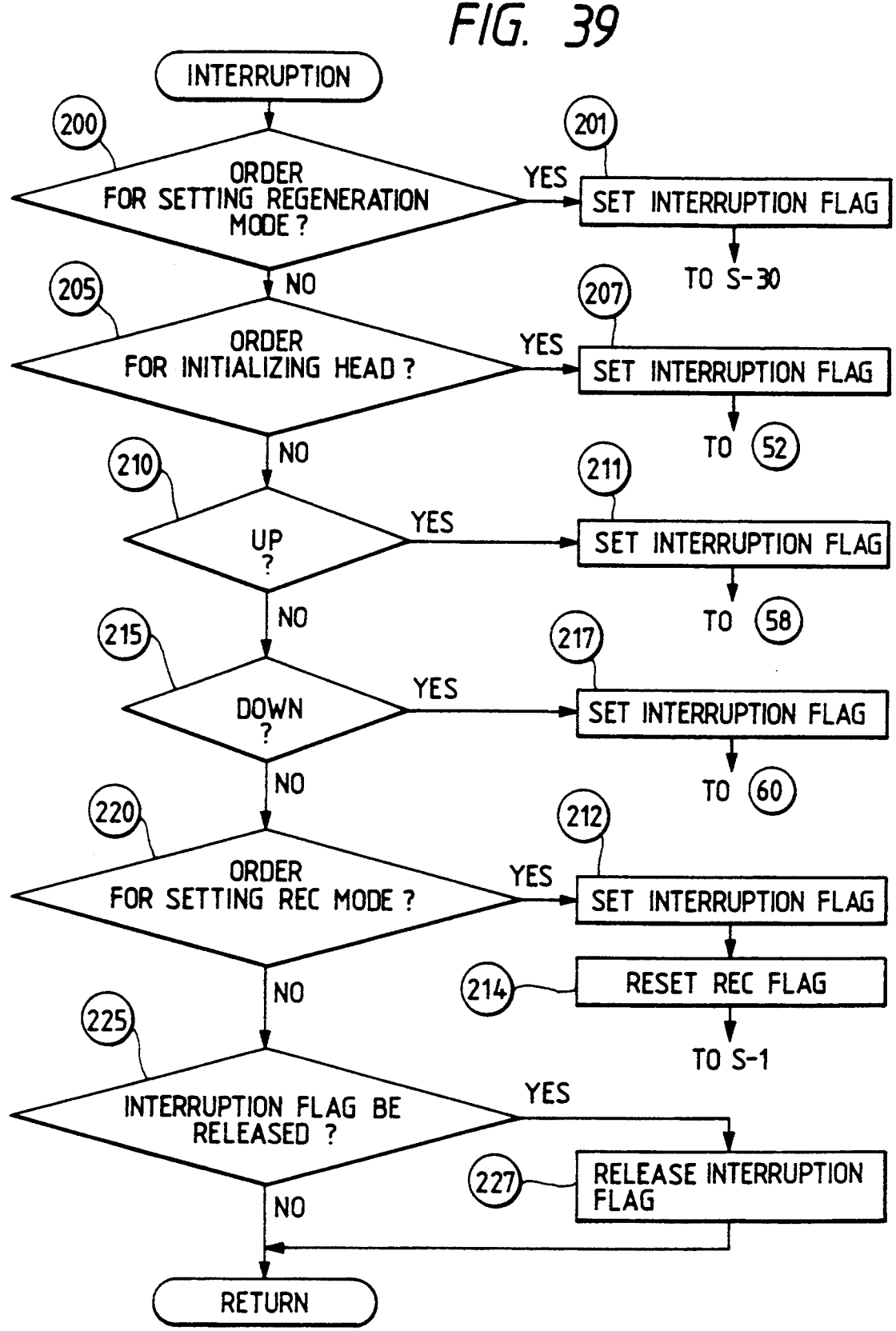

When the interruption signal is input from the image forming apparatus to the interface circuit 50, the system control circuit 10B executes a flowchart shown in FIG. 39.

The operation when the interruption signal is obtained will now be described hereinbelow with reference to FIG. 39.

When the interruption is made by the image forming apparatus side, a check is made to see if a command which is input together with the interruption is a reproduction mode setting command or not in 200. If YES, the interruption flag is set in 201. The processing routine advances to step S-30 in FIG. 34-1. Thus, the processes in steps S-30 to S-32 shown in FIG. 34-1 are executed and the reproduction mode of the apparatus is set (the switch SW is switched to the B side) and the head 2B is shifted out by one track (the head 2B is shifted to the track which has already been recorded by the head 2B and the signal of the track which was just previously recorded is reproduced).

On the other hand, if it is determined that the command which is input together with the interruption is an initialization command of the head in 205, the interruption flag is set in 207 similarly to the case of step 201. The flow is branched to 52 in FIG. 38. The processes in steps 52 to 55 are executed in a manner similar to those mentioned above. The initialization for the reproducing operation is executed, that is, the head 2B is shifted to the unrecorded outermost track on the disk 1B.

If the command which is input together with the interruption is an UP command in 210, the interruption flag is set in 211. The flow is branched to 58 in FIG. 38 and the head 2B is shifted to the inner track on the disk 1B by one track.

If the command which is input together with the interruption is a DOWN command in 215, the interruption flag is set in 217. The flow is branched to 60 in FIG. 38. The head 2B is shifted to the outer track on the disk 1B by one track.

If the command which is input together with the interruption is a REC mode set command in 220, the interruption flag is reset in 212. Further, the REC flag is reset in 214. Due to this, the processing routine in ③ and subsequent steps shown in FIG. 34-2 are executed. The head 2B is located to the unrecorded area on the disk 1B.

If the command which is input together with the interruption is an interruption flag release command in 225, the interruption flag is released in 227. The operation in the recording and reproducing apparatus in the embodiment can be controlled independently of the image forming apparatus.

In the embodiment, although the still video system has been shown as an example, the invention is not limited to such a system but can be also obviously applied to other various recording or reproducing apparatuses as mentioned above.

The memory means is not limited to the disk shown in the embodiment but a tape-shaped memory, an optical disk, a solid state memory, or the like can be also used as memory means.

As described above, according to the embodiment, a plurality of images recorded on the recording medium can be preferably formed.

What is claimed is:

1. A color image processing system comprising:
   an image pickup apparatus comprising:
      image pickup means for converting an object optical image into an image signal and for recording the image signal onto an exchangeable storage medium; and
      reproducing output means for reading out the image signal recorded on the exchangeable storage medium by said image pickup means and for outputting the recorded image signal to an external terminal; and
   a color image forming apparatus that is separated from said image pickup apparatus, comprising:
      indicating means for outputting a reproduction indicating signal to said image pickup apparatus to indicate the reproduction of the image signal recorded on the exchangeable storage medium by said reproducing output means;
      storage means for storing the recorded image signal from the external terminal read out by said reproducing output means in response to the indication of said indicating means; and
      applying means for reading the image signal stored in said storage means and for applying the read image signal to color image forming means.

2. A system according to claim 1, wherein said color image pickup apparatus further includes optical means for forming said object optical image.

3. A system according to claim 1, wherein said color image pickup apparatus further has:
   an input terminal to input the reproduction indicating signal from said indicating means; and
   control means for controlling the operation of said reproducing output means in accordance with the reproduction indicating signal which was input from said input terminal.

4. A system according to claim 1, wherein said reproducing output means includes:
   reproducing means for reproducing the image signal recorded on the medium; and
   output means for outputting the image signal reproduced by said reproducing means to said external output terminal.

5. A system according to claim 1, wherein said indicating means includes;
   a switch which is manually operated; and
   means for outputting the reproduction indicating signal in response to the operation of said switch.

6. A system according to claim 1, wherein said color image pickup apparatus is a portable image pickup apparatus.

7. A color image processing system according to claim 1, wherein images of plural planes of the image signal are recorded on the exchangeable storage medium.

8. An image processing system comprising:
   a reproducing apparatus for reading out a plurality of image signals recorded on an exchangeable storage medium; and
   an image forming apparatus having an image memory for storing said plurality of image signals read out by said reproducing apparatus,
   wherein said reproducing apparatus and said image forming apparatus are separated and process said plurality of image signals by communicating with each other; and
   wherein said reproducing apparatus reads out said plurality of image signals recorded on the exchangeable storage medium on the basis of an instruction communicated from said image forming apparatus to the reproducing apparatus and outputs the plurality of reproduced image signals to said image forming apparatus.

9. A system according to claim 8, wherein said reproducing apparatus and said image forming apparatus are separately constructed.

10. A system according to claim 8, wherein said reproducing apparatus and said image forming apparatus communicate with each other via a wire.

11. A system according to claim 8, wherein said plurality of image signals are image signals of a plurality of picture planes, and said communication includes an indicating command to change said picture planes.

12. A color image processing system according to claim 8, wherein images of plural planes are recorded on the exchangeable storage medium.

13. An image processing system comprising:
   portable color image pickup means for recording a picked up color image on an exchangeable storage medium and for outputting a reproduced color image signal;
   converting means, which is separated from said portable color image pickup means, for converting the color image signal reproduced by said portable color image pickup means into color image data; and electrophotographic processing means forming the color image onto a recording sheet in accordance with the color image data;

wherein said electrophotographic processing means outputs a control signal to said portable color image pickup means for recording the picked up color image on the exchangeable storage medium and outputting the reproduced color signal.

14. An image processing system according to claim 13, wherein said portable color image pickup means is an electrical still video camera.

15. An image processing system according to claim 13, wherein said electrophotographic processing means is a copying machine.

16. An image processing system according to claim 13, wherein the exchangeable storage medium is disc type medium.

17. An image processing system according to claim 13, wherein said converting means has a memory capable of storing the image signal of plural picture planes.

18. An image processing system according to claim 13, wherein said portable color image pickup means, said electrophotographic processing means, and said converting means are separately constructed.

19. An image processing system according to claim 13, wherein said converting means mutually communicates with said portable color image pickup means.

20. A color image processing system according to claim 13, wherein images of plural planes are recorded on the exchangeable storage medium.

* * * * *

UNITED STATES PATENT AND TRADEMARK OFFICE
CERTIFICATE OF CORRECTION

PATENT NO. : 5,333,068
DATED : July 26, 1994
INVENTOR(S) : Sakai, et al.

It is certified that error appears in the above-identified patent and that said Letters Patent is hereby corrected as shown below:

On the title page:

Under [56] References Cited,
"4,668,986  5/1987  Stansfield et al." should read
--4,668,980  5/1987  Stansfield et al.--; and Under [56] References Cited,
"4,655,577  4/1987  Ikota" should read
--4,655,577  4/1987  Ikuta--.

IN THE DRAWINGS

Figure 2B:
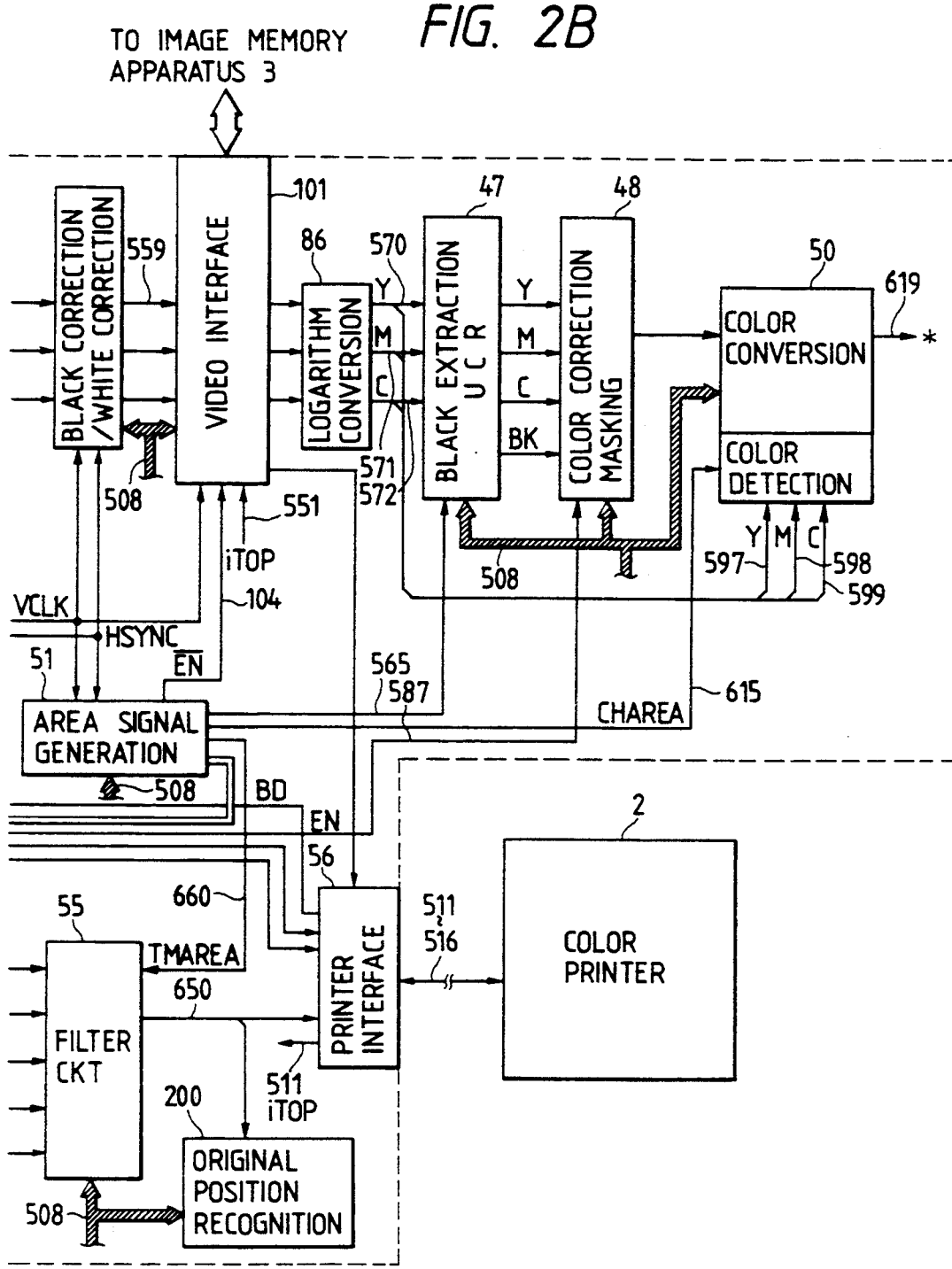
FIG. 2 is a detailed block diagram of a color reader 1 in the embodiment.

Figure 2A, "GAMMER" should read --GAMMA-; and
Figure 34-1A, "PLAG" (both occurrences) should
read --FLAG--.

COLUMN 3

Line 42, "for is read every" should read --is read for every--.

COLUMN 6

Line 31, "20G," should read --9420G--.

COLUMN 10

Line 35, "butters." should read --buffers.--.

UNITED STATES PATENT AND TRADEMARK OFFICE
CERTIFICATE OF CORRECTION

PATENT NO. : 5,333,068
DATED : July 26, 1994
INVENTOR(S) : Sakai, et al.

It is certified that error appears in the above-identified patent and that said Letters Patent is hereby corrected as shown below:

COLUMN 11

Line 66, "a total" should read --a total of--.

COLUMN 13

Line 34, "the" (first occurrence) should be deleted.

COLUMN 16

Line 65, "glipper," should read --gripper,--.

COLUMN 17

Line 56, "will" (second occurrence) should read --with--.

COLUMN 25

Line 50, "OO" shown in." should read --"OO" as shown in--.

COLUMN 27

Line 35, "11" should read --⑪--;
    Line 44, "32" should read --㉜--;
    Line 46, "33" should read --㉝--;
    Line 47, "34" should read --㉞--;

UNITED STATES PATENT AND TRADEMARK OFFICE
CERTIFICATE OF CORRECTION

PATENT NO. : 5,333,068
DATED : July 26, 1994
INVENTOR(S) : Sakai, et al.

It is certified that error appears in the above-identified patent and that said Letters Patent is hereby corrected as shown below:

COLUMN 27 (Cont.)

Line 49, "100" should read --(100)--;
    Line 51, "35" should read --(35)--;
    Line 52, "36 and 37," should read --(36) and (37)--;
    Line 54, "34 to 37" should read --(34) to (37)--;
    Line 56, "34 to 37" should read --(34) to (37)--;
    Line 58, "38. Instep 38," should read --(38). In step (38),--;
    Line 61, "40" should read --(40)--;
    Line 63, "39" should read --(39)--;
    Line 67, "37 to 34." should read --(37) to (34).--; and
    Line 68, "32" should read --(32)--.

COLUMN 28

Line 3, "34" should read --(34)--;
    Line 10, "turend" should read --turned--;
    Line 11, "(41)" should read --( (41) )--;
    Line 15, "43" should read --(43)--;
    Line 16, "44" should read --(44)--;
    Line 21, "45" should read --(45)--;
    Line 22, "46" should read --(46)--;
    Line 25, "47" should read --(47)--;
    Line 31, "43" should read --(43)--;
    Line 39, "51," should read --(51),--;
    Line 45, "10" should read --(10)--;
    Line 48, "51," should read --(51),--;
    Line 51, "52" should read --(52)--;
    Line 53, "53" should read --(53)--;

UNITED STATES PATENT AND TRADEMARK OFFICE
CERTIFICATE OF CORRECTION

PATENT NO. : 5,333,068
DATED : July 26, 1994
INVENTOR(S) : Sakai, et al.

It is certified that error appears in the above-identified patent and that said Letters Patent is hereby corrected as shown below:

COLUMN 28 (Cont.)

Line 53, "54" should read -- (54) --;
    Line 56, "55" should read -- (55) --;
    Line 59, "54, step 55" should read -- (54), step (55) --; and
    Line 63, "51 to 54" should read -- (51) to (54) --.

COLUMN 29

Line 5, "51 to 55" should read -- (51) to (55) --;
    Line 18, "52," should read -- (52) ,--;
    Line 19, "130" should read -- (130) --;
    Line 24, "57," should read -- (57) ,--;
    Line 25, "58." should read -- (58) .--;
    Line 26, "59," should read -- (59) ,--;
    Line 27, "60," should read -- (60) .--;
    Line 28, "58 and 60," should read -- (58) and (60) ,--;
    Line 31, "140 and 150," should read -- (140) and (150) ,--;
    Line 34, "59," should read -- (59) ,--;
    Line 36, "100." should read -- (100) .--;
    Line 36, "100," should read -- (100) ,--;
    Line 38, "65." should read -- (65) .--;
    Line 40, "61." should read -- (61) .--;
    Line 40, "61," should read -- (61) ,--;
    Line 47, "64" should read -- (64) --;
    Line 49, "65," should read -- (65) ,--;
    Line 52, "65," should read -- (65) --;
    Line 56, "90." should read -- (90) .--;
    Line 56, "90," should read -- (90) ,--;

UNITED STATES PATENT AND TRADEMARK OFFICE
CERTIFICATE OF CORRECTION

PATENT NO. : 5,333,068
DATED : July 26, 1994
INVENTOR(S) : Sakai, et al.

It is certified that error appears in the above-identified patent and that said Letters Patent is hereby corrected as shown below:

COLUMN 29 (Cont.)

Line 57, "91." should read -- (91). --;
    Line 63, "92" should read -- (92) --;
    Line 65, "56" should read -- (56) --; and
    Line 67, "93" should read -- (93) --.

COLUMN 30

Line 1, "65." should read -- (65). --;
    Line 2, "92." should read -- (92). --;
    Line 19, "53" should read -- (53) --;
    Line 26, "95" should read -- (95) --;
    Line 27, "97" should read -- (97) --;
    Line 51, "200." should read -- (200). --;
    Line 52, "201." should read -- (201). --;
    Line 56, "56" should read -- (56) --;
    Line 63, "205," should read -- (205), --;
    Line 64, "207" should read -- (207) --;
    Line 65, "201." should read -- (201). --;
    Line 65, "52" should read -- (52) --; and
    Line 66, "52 to 55" should read -- (52) to (55) --.

COLUMN 31

Line 4, "210," should read -- (210), --;
    Line 5, "211." should read -- (211). --;
    Line 5, "58" should read -- (58) --;
    Line 9, "215," should read -- (215), --;
    Line 10, "217." should read -- (217). --;

UNITED STATES PATENT AND TRADEMARK OFFICE
CERTIFICATE OF CORRECTION

PATENT NO. : 5,333,068
DATED : July 26, 1994
INVENTOR(S) : Sakai, et al.

It is certified that error appears in the above-identified patent and that said Letters Patent is hereby corrected as shown below:

COLUMN 31 (Cont.)

Line 10, "60" should read -- (60) --;
Line 14, "220," should read -- (220) ,--;
Line 15, "212." should read -- (212) .--;
Line 16, "214." should read -- (214) .--;
Line 22, "225," should read -- (225) ,--; and
Line 22, "227." should read -- (227) .--.

Signed and Sealed this

Twenty-fourth Day of January, 1995

Attest:

BRUCE LEHMAN

Attesting Officer    Commissioner of Patents and Trademarks